United States Patent
Reed, II et al.

(10) Patent No.: US 9,835,302 B1
(45) Date of Patent: Dec. 5, 2017

(54) SUN/ELECTRIC HYBRID LIGHTING SYSTEM (SEHLS)

(71) Applicants: Henry Vernon Reed, II, Hawthorne, CA (US); Nancy Suzanne Hardon, Hutchinson, KS (US)

(72) Inventors: Henry Vernon Reed, II, Hawthorne, CA (US); Nancy Suzanne Hardon, Hutchinson, KS (US)

( * ) Notice: Subject to any disclaimer, the term of this patent is extended or adjusted under 35 U.S.C. 154(b) by 0 days.

(21) Appl. No.: 14/998,351

(22) Filed: Dec. 28, 2015

Related U.S. Application Data

(60) Provisional application No. 62/124,083, filed on Dec. 8, 2014.

(51) Int. Cl.
*F21S 11/00* (2006.01)
*F21S 19/00* (2006.01)
*G02B 19/00* (2006.01)

(52) U.S. Cl.
CPC ........... *F21S 11/007* (2013.01); *F21S 11/002* (2013.01); *F21S 19/005* (2013.01); *G02B 19/0019* (2013.01); *G02B 19/0042* (2013.01)

(58) Field of Classification Search
CPC ...... F21S 11/002; F21S 11/007; F21S 19/005; G02B 6/00; G02B 6/0096; G02B 19/0047
USPC ........................................................ 359/591
See application file for complete search history.

(56) References Cited

U.S. PATENT DOCUMENTS

| | | | | |
|---|---|---|---|---|
| 4,389,085 A | * | 6/1983 | Mori | F21S 11/00 359/591 |
| 4,394,860 A | * | 7/1983 | Smith | F24J 2/06 126/680 |
| 4,669,817 A | * | 6/1987 | Mori | A01G 7/045 359/591 |
| 4,740,048 A | * | 4/1988 | Mori | A01G 7/045 359/592 |
| 6,341,041 B1 | * | 1/2002 | Carlson | F21S 11/00 359/591 |
| 6,691,701 B1 | * | 2/2004 | Roth | F24J 2/18 126/600 |
| 6,840,645 B2 | * | 1/2005 | Eisenman | F21S 11/00 359/591 |
| 2006/0007549 A1 | * | 1/2006 | Zincone | E04D 13/033 359/591 |
| 2008/0266664 A1 | * | 10/2008 | Winston | F21S 11/00 359/592 |

(Continued)

OTHER PUBLICATIONS

SOLATUBE brochure 2012.*

*Primary Examiner* — Christopher Mahoney
(74) *Attorney, Agent, or Firm* — Los Angeles Patent Group; Arman Katiraei

(57) ABSTRACT

The Sun Sky/Electric Hybrid Lighting System (SEHLS) is the fully integrated sun lighting system that can be connected through out multiple rooms to bring natural sun stereophonic lighting into a home or office. SEHLS is a dual capable system that was designed for energy savings with both sun power and low energy lighting. The SEHLS system has four major lighting systems that fit any room's needs. Each unit has been designed with the same common usage and capability. In this Patent, the Sun Sky/Electric Reflective Lite System (SERLS) will be Patented as an example. The SERLS is a dual usage system that can be placed in medium-spaced room such as a bedroom, hallway or office to provide sun light luminance capability.

10 Claims, 80 Drawing Sheets

(56) References Cited

U.S. PATENT DOCUMENTS

2011/0226311 A1* 9/2011 Sun .................. F21S 11/002
              136/247

* cited by examiner

Perspective View

Sun Luminance Collector System (SLCS)

Perspective View

Sun Luminance Collector System (SLCS)

Side Perspective View

Sun Luminance Collector System (SLCS)

Side Perspective View

Sun Luminance Collector System (SLCS)

Side Perspective View 26   14

Sun Luminance Collector System (SLCS)

Top Perspective View

Sun Luminance Collector System (SLCS)

Top Perspective View

Sun Luminance Collector System (SLCS)

Right Perspective View

Sun Luminance Collector System (SLCS)

Angle Top View Illustrating

Sun Luminance Collector System - Over Sized (SLCS-OS)

Angle Back Perspective View

Sun Luminance Collector System - Over Sized (SLCS-OS)

Perspective View

Sun Luminance Collector System - Over Sized (SLCS-OS)

Top Perspective View

Sun Luminance Collector System - Over Sized (SLCS-OS)

Angle Perspective View

Sun Luminance Collector System - Over Sized (SLCS-OS)

Angle Perspective View

Sun Luminance Collector System - Over Sized (SLCS-OS)

Bottom Angle View

Sun Electric Reflective Lite System (SERLS)

Side Perspective View

Sun Electric Reflective Lite System (SERLS)

Bottom Up Perspective View

Sun Electric Reflective Lite System (SERLS)

Side Perspective View

Sun Electric Reflective Lite System (SERLS)

Angle Top Perspective View

Sun Electric Reflective Lite System (SERLS)

Top Perspective View

Sun Electric Reflective Lite System (SERLS)

Side Perspective View

Bypass Unit (Component)

Side Exploded View

Bypass Unit (Component)

Bottom Up Perspective View

Bypass Unit (Component)

Bottom Up Perspective View

Sun Electric Reflective Lite System (SERLS)

Side Perspective View

Sun Electric Reflective Lite System (SERLS)

Angle Side Perspective View

Sun Electric Fluorescent Lite System (SEFLS)

Side Perspective View

Sun Electric Fluorescent Lite System (SEFLS)

Side Perspective View

Sun Electric Fluorescent Lite System (SEFLS)

Bottom Up Perspective View

Sun Electric Fluorescent Lite System (SEFLS)

Angle Top Perspective View

Sun Electric Fluorescent Lite System (SEFLS)

Top Perspective View

Sun Electric Fluorescent Lite System (SEFLS)

Bottom Up Perspective View

Sun Electric Fluorescent Lite System (SEFLS)

Side Perspective View 48   62

Sun Electric Fluorescent Lite System (SEFLS)

Side Perspective View

Sun Dual Intake System (SDIS)

Perspective View

Sun Dual Intake System (SDIS)

Bottom Up Perspective View

Sun Dual Intake System (SDIS)

Top Perspective View

Sun Dual Intake System (SDIS)

Side Perspective View

Sun Dual Intake System (SDIS)

Figure 43
Perspective View
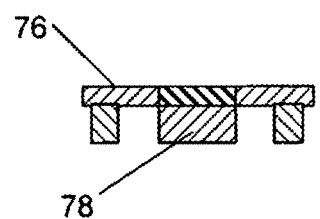
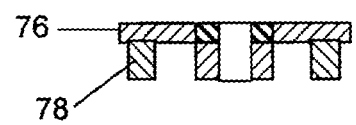
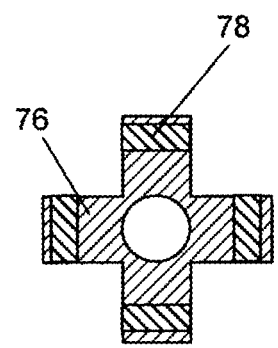
Lite Mount System

Inside Perspective View

Sun Dual Intake System (SDIS)

Side Perspective View

Sun Dual Intake System (SDIS)

Side Perspective View

Sun Dual Intake System

Side Perspective View

Light Emitting Diode (LED)

Angle Perspective View

Splitter "T" Reflector Box System (STRBS)

Side Perspective View

Splitter "T" Reflector Box System (STRBS)

Front Perspective View

Splitter "T" Reflector Box System (STRBS)

Perspective View

Splitter "T" Reflector Box System (STRBS)

Angle Perspective View

Large Reflective Elbow

Side Exploded View

Small Reflective Elbow

Side Perspective View

Small Reflective Elbow

Front Perspective View

Small Reflective Elbow

Angle Perspective View

Small Reflective Elbow

Side Perspective View

Sun Luminance Reflective Elbow System - Oversized (SLRESOS)

Side Exploded View

Sun Luminance Reflective Elbow System - Oversized (SLRES-OS)

Front Perspective View

Sun Luminance Reflective Elbow System - Oversized (SLRES-OS)

Side Perspective View

Sun Electric Chandelier Lite System (SECLS)

Bottom Up Perspective View

Sun Electric Chandelier Lite System (SECLS)

Top Perspective View

Sun Electric Chandelier Lite System (SECLS)

Side Perspective View

Sun Electric Chandelier Lite System (SECLS)

Bottom Up Perspective View

Sun Electric Chandelier Lite System (SECLS)

Side Perspective View

Sun Electric Chandelier Lite System (SECLS)

Angle Perspective View

Sun Electric Luminance Lite System (SELLS)

Side Perspective View

Sun Electric Luminance Lite System (SELLS)

Top Angle Perspective View

Sun Electric Luminance Lite System (SELLS)

Side Perspective View

Sun Electric Luminance Lite System (SELLS)

Bottom Up Perspective View

Sun Electric Luminance Lite System (SELLS)

Top Perspective View

Sun Electric Luminance Lite System (SELLS)

Bottom Up Perspective View

Sun Electric Luminance Lite System (SELLS)

Side Perspective View

Sun Electric Luminance Lite System (SELLS)

Top Perspective View

Sun Luminance Reflective Tube System (SLRTS)

Side Perspective View

Sun Luminance Reflective Tube System (SLRTS)

Top Perspective View

Sun Luminance Reflective Tube System (SLRTS)

Side Perspective View

Sun Luminance Reflective Tube System (SLRTS)

Figure 79
Perspective View
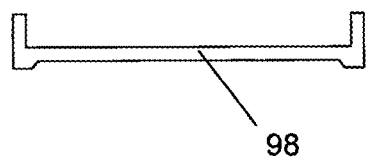
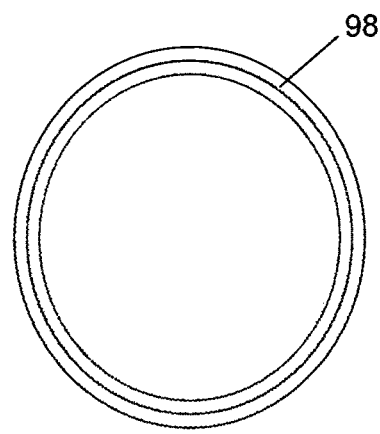

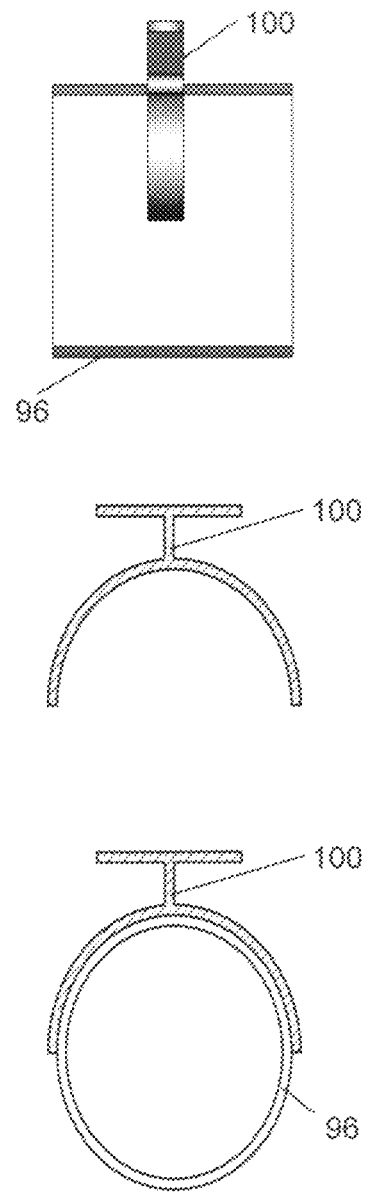

SUN/ELECTRIC HYBRID LIGHTING SYSTEM (SEHLS)

FIELD OF THE INVENTION

This invention relates to a sun luminance, alternative lighting system that can be used in the home or office. More importantly, it can be used as an energy alternative for lighting components to aid in reducing electrical consumption, ultimately saving utility costs.

BACKGROUND OF THE INVENTION

Over the last twenty years, electric utility costs have risen to prices not seen previously in our lifetime. If we continue on this path of non-conservation and product substitution, we will be unable to afford future utility fees. Products are being introduced into today's markets that claim to reduce energy prices, but have not yet been implemented in home and office settings, reducing energy consumption and our carbon footprint. The Global Power Generation Trends forecasts 9.6% growth in energy, becoming problematic for home owners and small business proprietors.

Homeowners have begun to implement solar panels, small wind turbines and solar sky lighting systems to offset energy costs. There are a few natural sun light products on the market today that offer energy reduction; they can only be used to power one room only and in the long run these energy costs will continue to rise. Other homeowners have gone to solar energy, which is a major investment and undependable in bad weather.

SUMMARY OF THE INVENTION

The Sun Sky/Electric Hybrid Light System (SEHLS) is a fully integratable system that can be connected through out multiple rooms to bring natural sun, stereophonic lighting into a home or office setting. SEHLS is a dually capable designed system that offers energy savings with both sun power and low energy lighting. The SEHLS system has four major lighting systems that fit the needs of any room, of any size. Each unit has been designed with the same usage capability. The advantages would be to provide a complete, dual lighting system that will provide utility cost savings and to brighten a home or office during the day and the use of low energy lighting at night.

This invention offers a product that is made from recycled materials, will be reused in lowering energy costs and is an investment for the general public.

BRIEF DESCRIPTION OF THE DRAWINGS

A complete understanding of the present invention may be obtained by reference to the accompanying drawings, when considered in conjunction with the subsequent, detailed description in which:

FIG. 43 is a perspective view illustrating the Sun Dual Intake System (SDIS) with an Intake Light Mount internal view, to be constructed in accordance with the present invention.

FIG. 79 is a perspective view illustrating the Cover Lens Cap constructed in accordance with the present invention.

FIG. 80 is a perspective view illustrating the Tube Bridge constructed in accordance with the present invention.

For purposes of clarity and brevity, like elements and components will bear the same designations and numbering throughout the Figures.

DESCRIPTION OF THE PREFERRED EMBODIMENT

Figure 1:
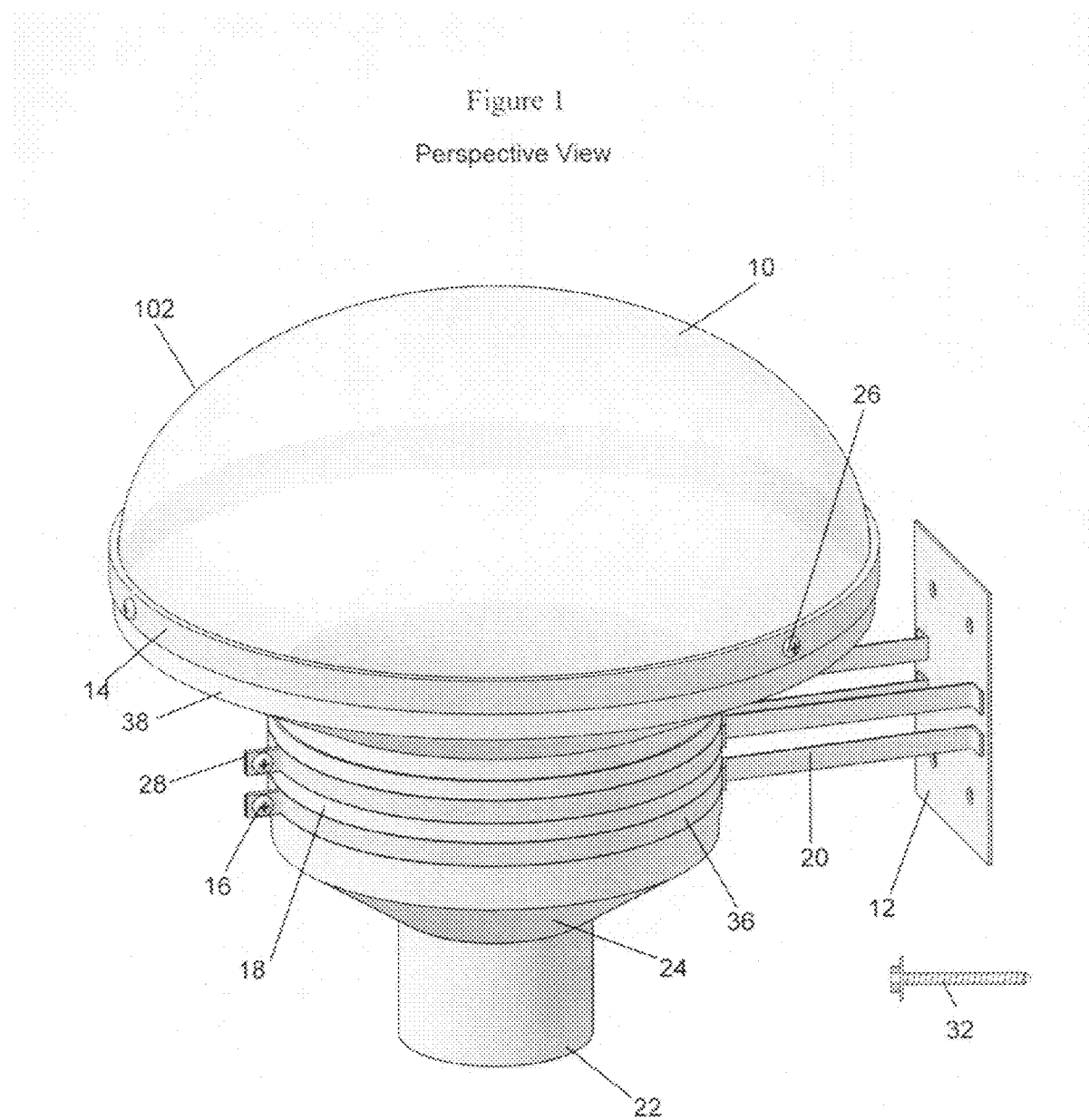
FIG. 1 is a drawing illustrating the Sun Lite Luminance Collector System, designed to collect sunlight and it reflects it through a single collector.

FIGS. 1 through 80, all are illustrated drawings and views, which have been constructed in accordance with the present invention—the Sun/Electric Hybrid Lighting System (SE-HLS).

FIG. 1 is a drawing illustrating the Sun Lite Luminance Collector System (SLCS) (102). Designed to collect sunlight, it reflects it through a single collector by condensing and reflecting the sunlight off internal mirrors down through the 6" Plastic Tube with a Female Opening (22). The sunlight passes through and into SLCS system made of recycled weather resistant plastic. The Metal Collector Mating Band (14) secures the Collector Cover Dome (10) with the use of Metal Structural Mounting Screws (26) that help the sunlight project down through the "V" Collector Funnel Body (24), to protect the internal components area from harsh weather and the elements. The SLCS is secured in place by a Mount Bracket Band System (36) that is held in place through the Housing Mounting Grooves (18), mounted on the side of the home structure with Mounting Bolts (32) through the Base Mount Cross Bridge Plate (12). The Metal Extension Arms (20) provide a safe distance for the SLCS to be mounted from the exterior of the home structure, in order for the SLCS Connectors (28) to be secured into place with the Front Side Frame Mounting Screws (16).

Figure 2:
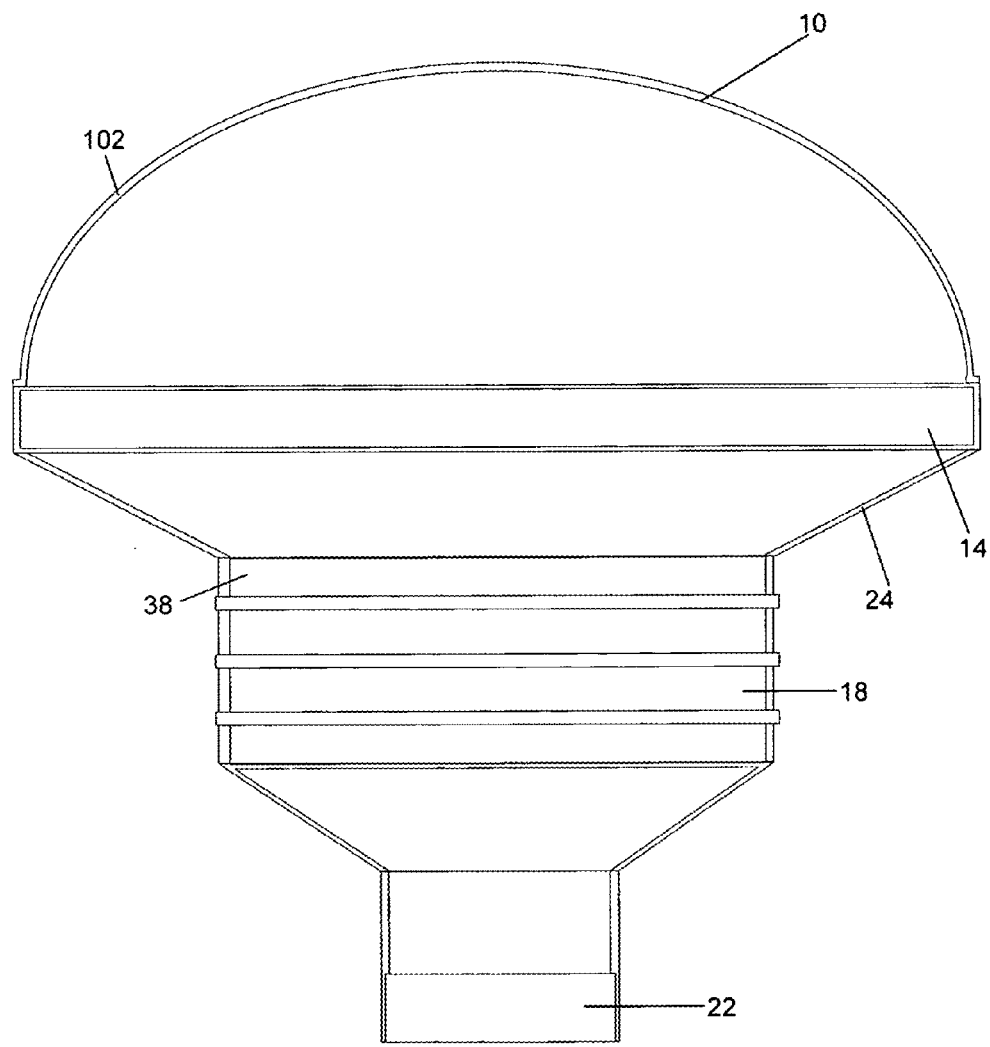
FIG. 2 is a perspective view of a schematic drawing illustrating the Sun Lite Luminance Collector System (SLCS) constructed in accordance with the present invention.

FIG. 2 is a perspective view of a schematic drawing illustrating the Sun Lite Luminance Collector System (SLCS) (102) constructed in accordance with the present invention. The SLCS Collector Cover Dome (10) is made of clear weather resistant plastic that is black on the exterior, painted and coated internally with "Glass Paint" to help provide better luminance capability from the rays of sunlight off internal mirrors. It is secured together with the Collector Mating Band (14). The stream of light moves through the 6" Plastic Tube with a Female Opening (22). The Mounting Grooves (18) are pre-molded into the "V" Collector Funnel Body (24) to support the Mounting Bracket Band System (36) in securing the SLCS to the outer housing structure that is connected to the Base Housing Body (38).

Figure 3:
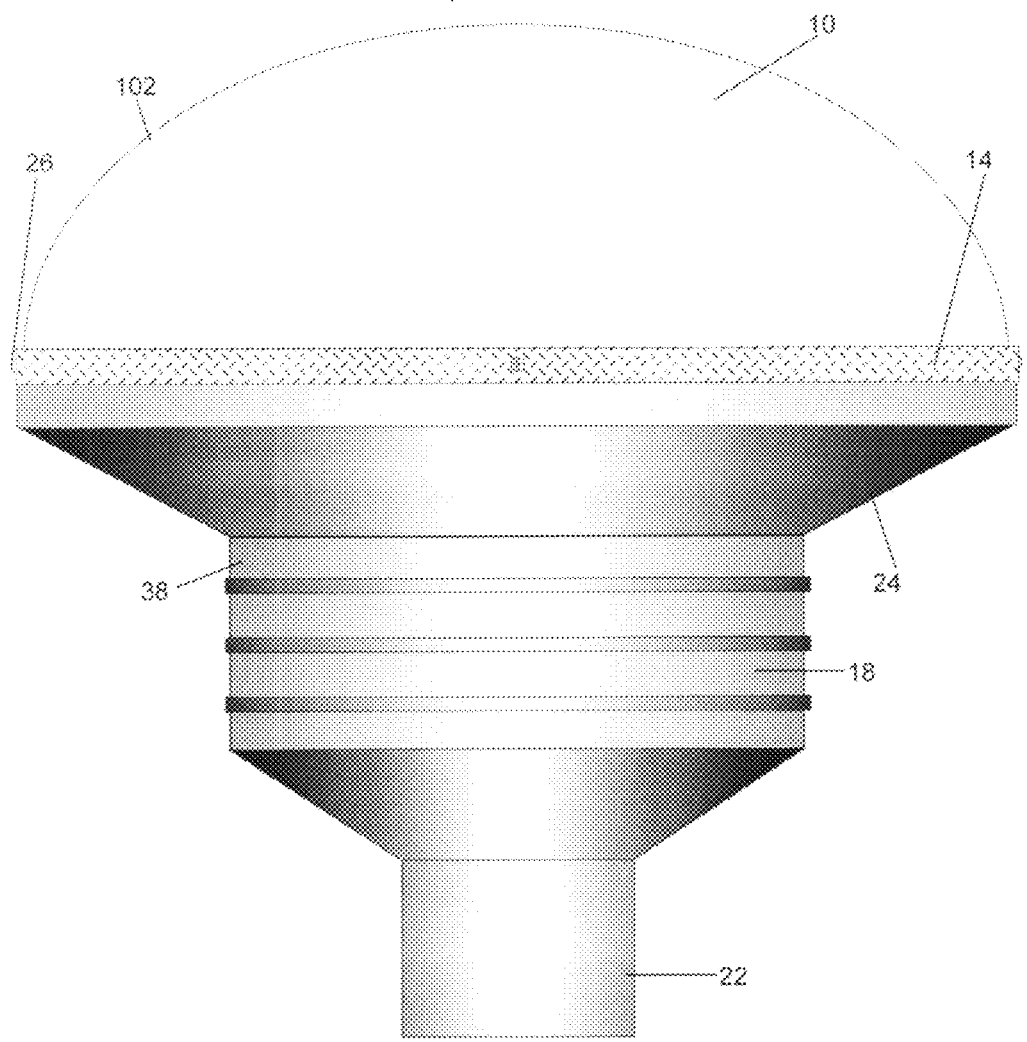
FIG. 3 is a perspective view illustrating the Sun Lite Luminance Collector System constructed in accordance with the present invention.

FIG. 3 is a perspective view illustrating the Sun Lite Luminance Collector System (SLCS) (102) constructed in accordance with the present invention. It is designed to support the directional sunrise and sun set capability. The internal surface of the SLCS Collector Cover Dome (10) is able to support 33.38° of freedom from east to west luminance. The Mounting Grooves (18) on the "V" Collector Funnel Body (24) secures the SLCS to the outer housing structure and will not move or flex in high winds or harsh weather. The 6" Plastic Tube With A Female Opening (22) and Base Housing Body (38) are secured with the Metal Collector Mating Band (14) and Metal Structural Mounting Screws (26).

Figure 4:
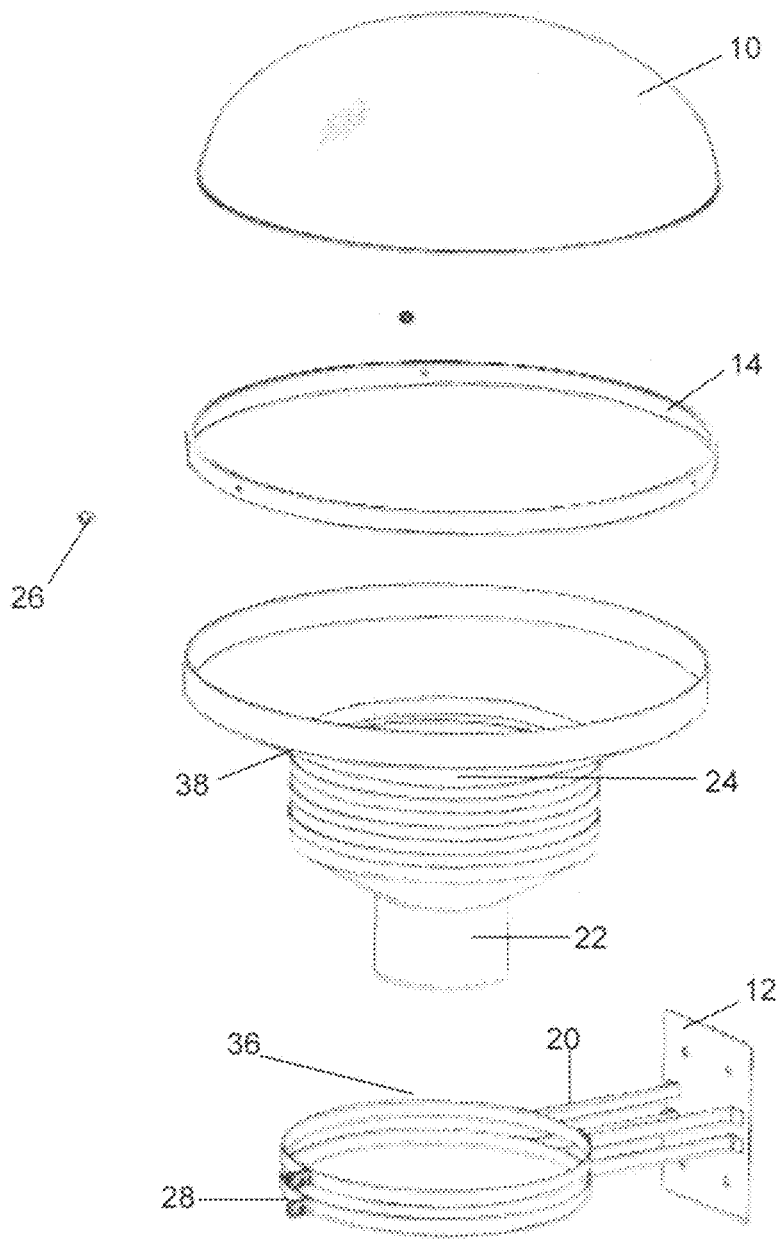
FIG. 4 is an exploded view illustrating the Sun Lite Luminance Collector System (SLCS) constructed in accordance with the present invention.

FIG. 4 is an exploded view illustrating the Sun Lite Luminance Collector System (SLCS) (102) constructed in accordance with the present invention. The Collector Cover Dome (10) is secured with the Metal Collector Mating Band (14). The "V" Collector Funnel Body (24), is connected to the Base Housing Body (38) and the 6" Plastic Tube with a Female Opening (22). The Mounting Bracket Band System (36) and the Metal Extension Arms (20) attach to the Base Mount Cross Bridge Plate (12) and are secured in place with the SLCS Connectors (28) and Metal Structural Mounting Screws (26).

Figure 5:
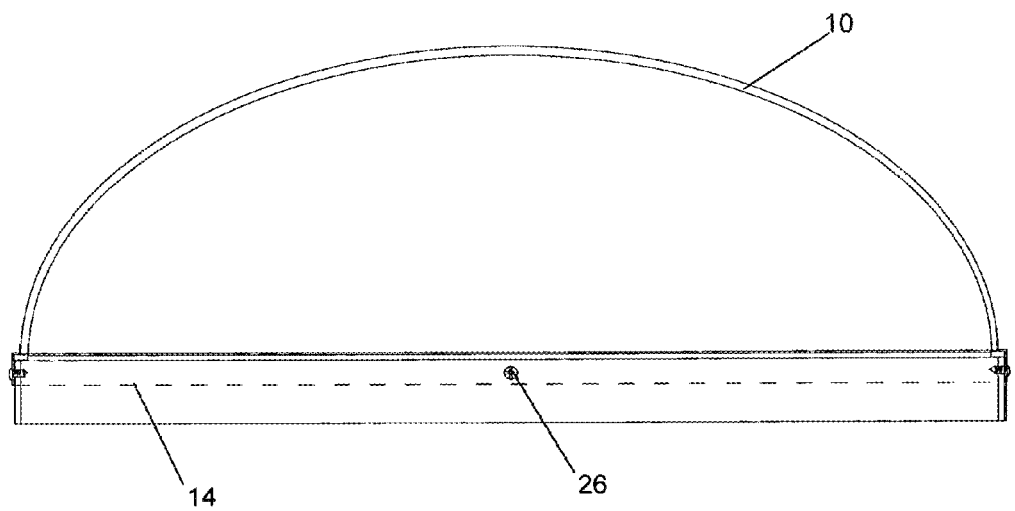
FIG. 5 is a side perspective view of a figure illustrating the Sun Lite Luminance Collector System (SLCS) Cover Dome and Collector Mating Band constructed in accordance with the present invention.

FIG. 5 is a side perspective view of a figure illustrating the Sun Lite Luminance Collector System (SLCS) (102) Cover Dome and Collector Mating Band (14) constructed in accordance with the present invention. The Collector Cover Dome (10) and metal mount band connects together with Metal Structural Mounting Screws (26) with the aid of the collector cover outer lip.

Figure 6:
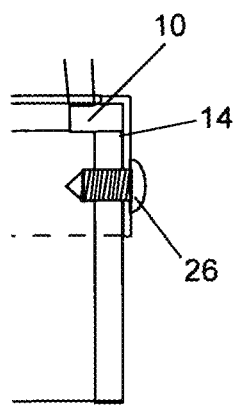
FIG. 6 is a side perspective view of a drawing illustrating the Sun Lite Luminance Collector System (SLCS) Cover Dome, Collector Mating Band and screw hardware constructed in accordance with the present invention.

FIG. 6 is a side perspective view of a drawing illustrating the Sun Lite Luminance Collector System (SLCS) (102) Cover Dome, Collector Mating Band (14) and screw hardware constructed in accordance with the present invention. The section is cut from a "road map" of the Collector Cover Dome (10), Collector Mating Band (14) and Metal Structural Mounting Screws (26) integrated together.

Figure 7:
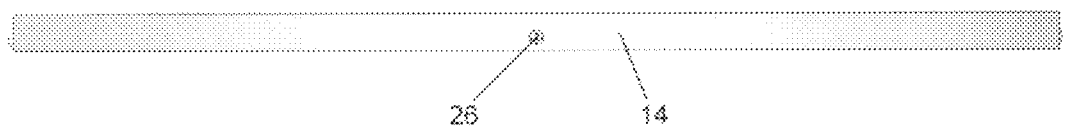
FIG. 7 is a side perspective view illustrating the Sun Lite Luminance Collector System (SLCS) Mating Band with Metal Structural Mounting Screws, constructed in accordance with the present invention.

FIG. 7 is a side perspective view illustrating the Sun Lite Luminance Collector System (SLCS) Mating Band (14) with Metal Structural Mounting Screws (26), constructed in accordance with the present invention.

Figure 8:
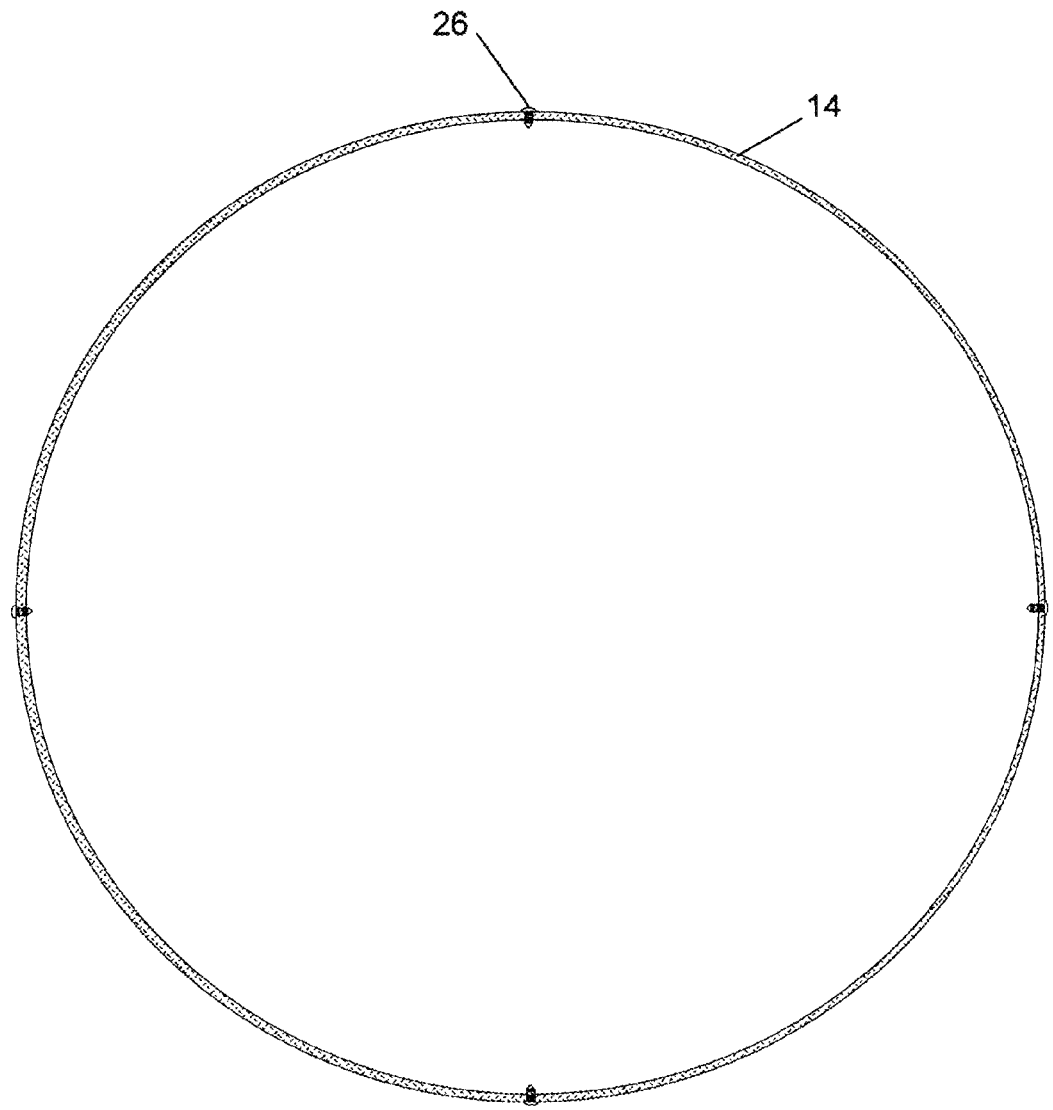
FIG. 8 is a top perspective view of a drawing illustrating the Sun Lite Luminance Collector System (SLCS) Mating Band with Metal Structural Mounting Screws, constructed in accordance with the present invention.

FIG. 8 is a top perspective view of a drawing illustrating the Sun Lite Luminance Collector System (SLCS) Mating Band (14) with Metal Structural Mounting Screws (26), constructed in accordance with the present invention.

Figure 9:
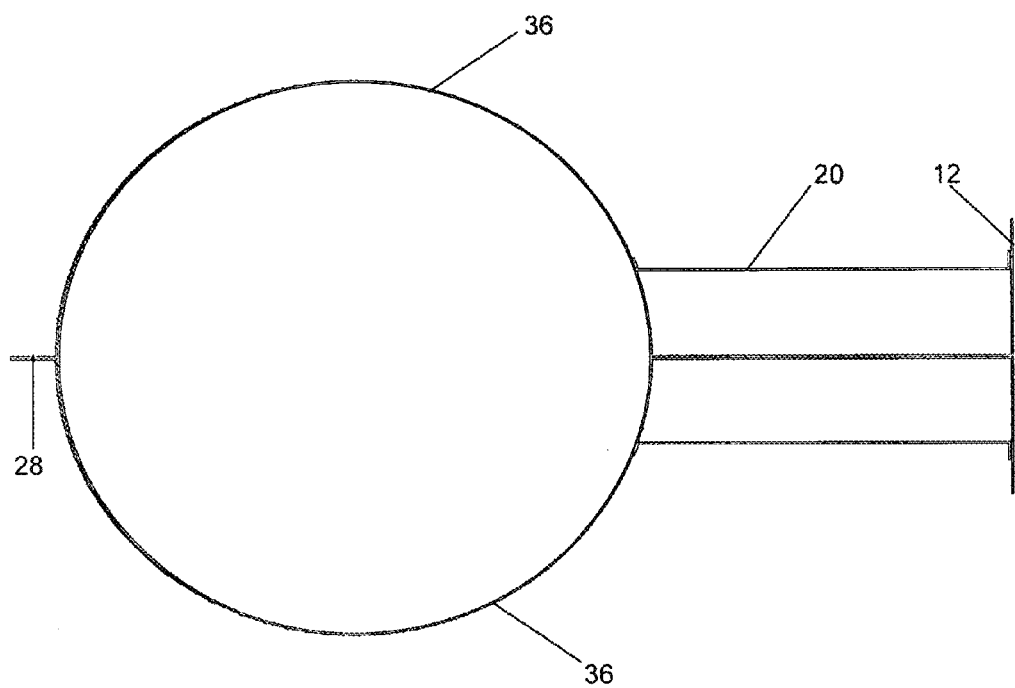
FIG. 9 is a top perspective view detailed drawing illustrating the Sun Lite Luminance Collector Mounting Bracket constructed in accordance with the present invention.

FIG. 9 is a top perspective view detailed drawing illustrating the Sun Lite Luminance Collector Mounting Bracket constructed in accordance with the present invention. The SLCS is secured in place by a Mount Bracket Band System (36) and SLCS connectors (28). Each mounting bracket is constructed with two outer Metal Extension Arms (20) and one Base Mount Cross Bridge Plate (12) to provide stability in supporting the SLCS unit.

Figure 10:
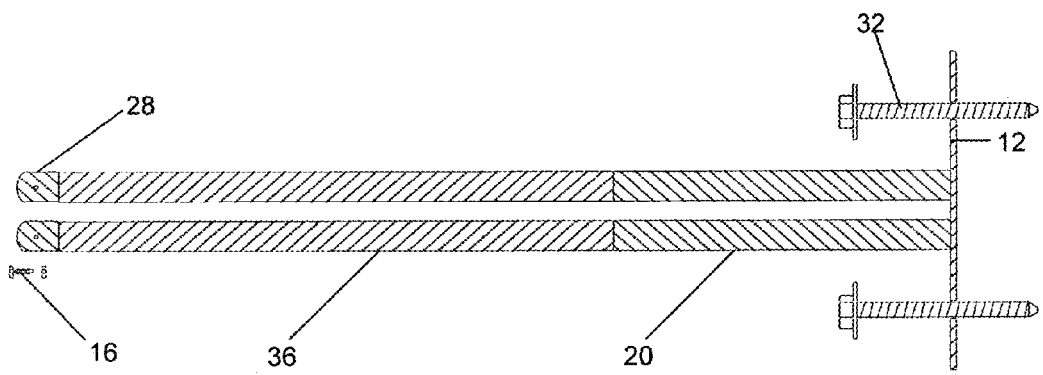
FIG. 10 is a right perspective view illustrating the Sun Lite Luminance Collector constructed in accordance with the present invention.

FIG. 10 is a right perspective view illustrating the Sun Lite Luminance Collector constructed in accordance with the present invention. The SLCS is secured in place with a Mounting Bracket Band System (36). Each mounting bracket is constructed with two outer Metal Extension Arms (20) attached to the Base Mount Cross Bridge Plate (12). The SLCS Connectors (28) secures to the structure with Front Side Frame Mounting Screws (16), and the base mount cross bridge plate attaches to the structure with Mounting Bolts (32).

Figure 11:
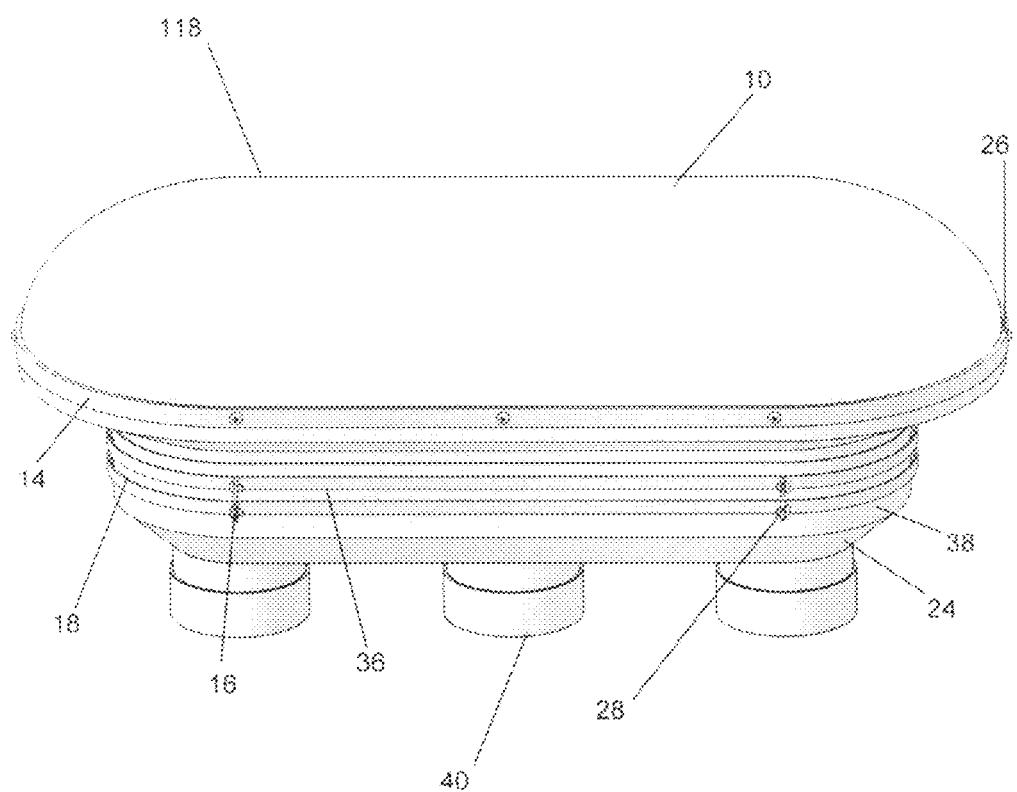
FIG. 11 is an angle top view illustrating the Sun Lite Luminance Collector System-Over Sized (SLCS-OS) angled top view, constructed in accordance with the present invention.

FIG. 11 is an angle top view illustrating the Sun Lite Luminance Collector System-Over Sized (SLCS-OS) (118) angled top view, constructed in accordance with the present invention. The SLCS-OS Collector Cover Dome (10) is half oval in design on top secured by the Metal Collector Mating Band (14) and Metal Structural Mounting Screws (26). The "V" Collector Funnel Body (24) collects greater sunlight and reflects it through a three-line collector system in the Base Housing Body (38). By condensing and reflecting the sunlight off the three internal reflector elbow mirrors through three 8⅝" Plastic Tube Female Openings (40), the SLCS is secured in place by a Mount Bracket Band System (36) through The Housing Mounting Grooves (18), the SLCS Connectors (28) and the Front Side Frame Mounting Screws (16).

Figure 12:
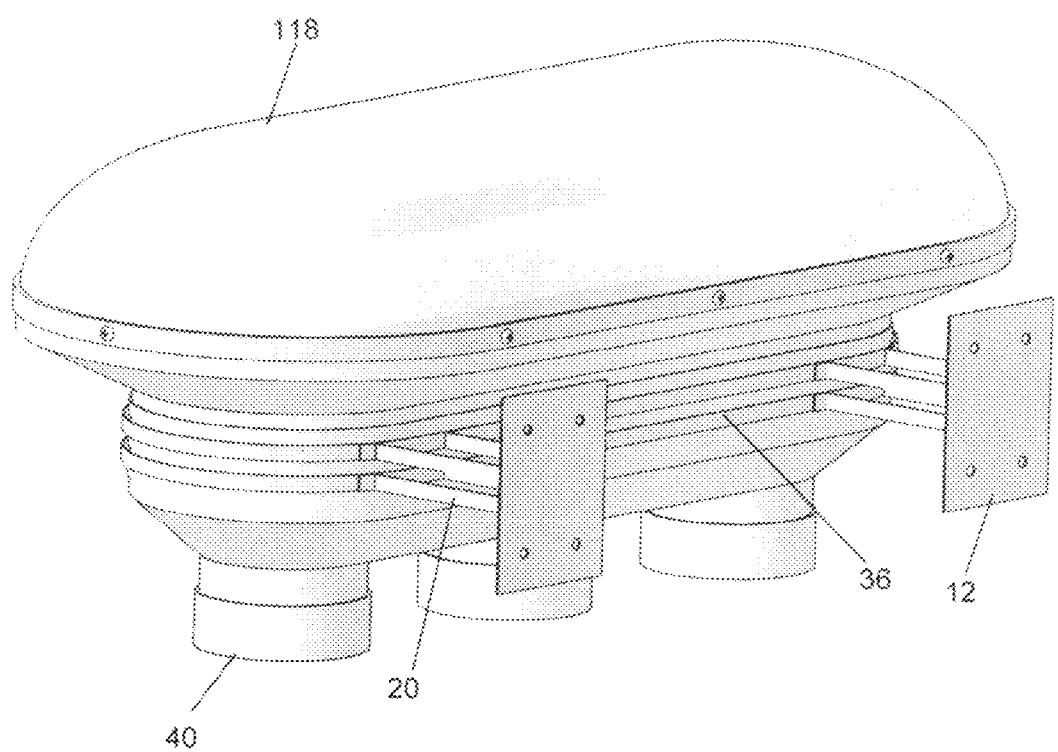
FIG. 12 is an angle back perspective illustrating the Sun Lite Luminance Collector System-Over Sized (SLCS-OS). Designed to collect sunlight, it reflects through a single collector and reflect through three 8⅝" Plastic Tube—Female Openings, constructed in accordance with the present invention.

FIG. 12 is an angle back perspective view of a drawing illustrating the Sun Lite Luminance Collector System— Over Sized (SLCS-OS) (118), with Mounting Bracket Band System (36), constructed in accordance with the present invention. Each SLCS-OS mounting bracket is constructed with two outer Metal Extension Arms (20), and one center arm to provide stability to support the SLCS-OS unit, and it is attached to the Base Mount Cross Bridge Plate (12).

Figure 13:
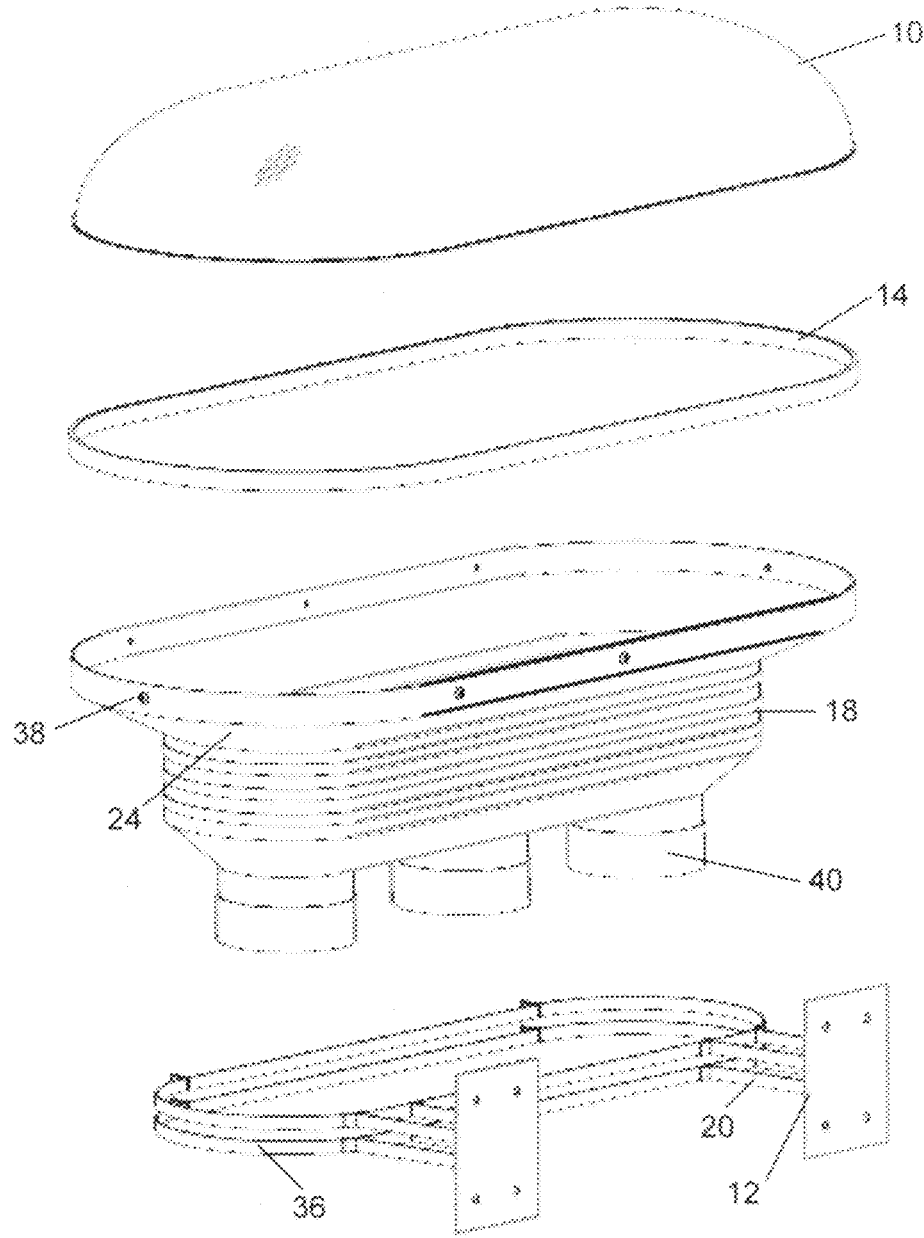
FIG. 13 is an exploded view of the Sun Lite Luminance Collector System-Over Sized (SLCS-OS) constructed in accordance with the present invention.

FIG. 13 is an exploded view of the Sun Lite Luminance Collector System-Over Sized (SLCS-OS) (118) constructed in accordance with the present invention. The outer shell of the SLCS-OS body is black and internally coated with "Glass Paint" to help provide better luminance capability. The SLCS-OS components incorporate a Plexiglas Collector Cover Dome (10) that protects the "V" Collector Funnel Body (24) that gather the rays of the sun. The metal Collector Mating Band (14) secures the dome cover to the Base Housing Body (38). The Housing Mounting Grooves (18) are molded on the unit consisting of three 8⅝" Plastic Tube—Female Openings (40). Each mounting bracket is constructed with two outer Metal Extension Arms (20) and the Base Mount Cross Bridge Plate (12). The SLCS-OS is secured in place by a Mount Bracket Band System (36).

Figure 14:
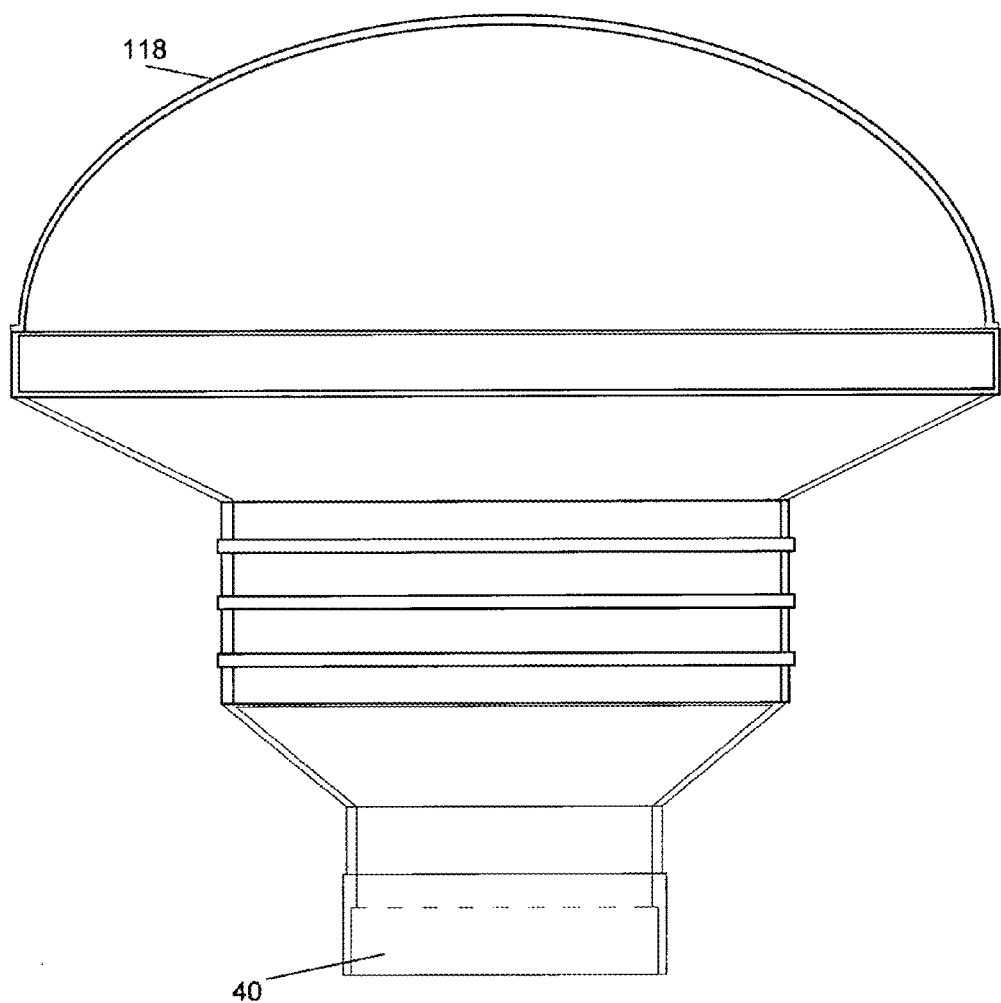
FIG. 14 is a schematic drawing perspective view illustrating the Sun Lite Luminance Collector System-Over Sized (SLCS-OS), side view, constructed in accordance with the present invention.

FIG. 14 is a schematic drawing perspective view illustrating the Sun Lite Luminance Collector System-Over Sized (SLCS-OS) (118), side view, constructed in accordance with the present invention. The SLCS-OS has three 8⅝" Plastic Tube Female Openings (40) to fit PVC (internal) Glass Paint coated pipes. Each PVC Glass Paint coated pipe is connected to an oversized sun luminance reflective elbow that will connect to an oversized female connector hole to support PVC (internal) glass paint coated pipe at one end and will reflect through the elbow to a large female connector reflector elbow box that is used to connect to the SEHLS system units.

Figure 15:
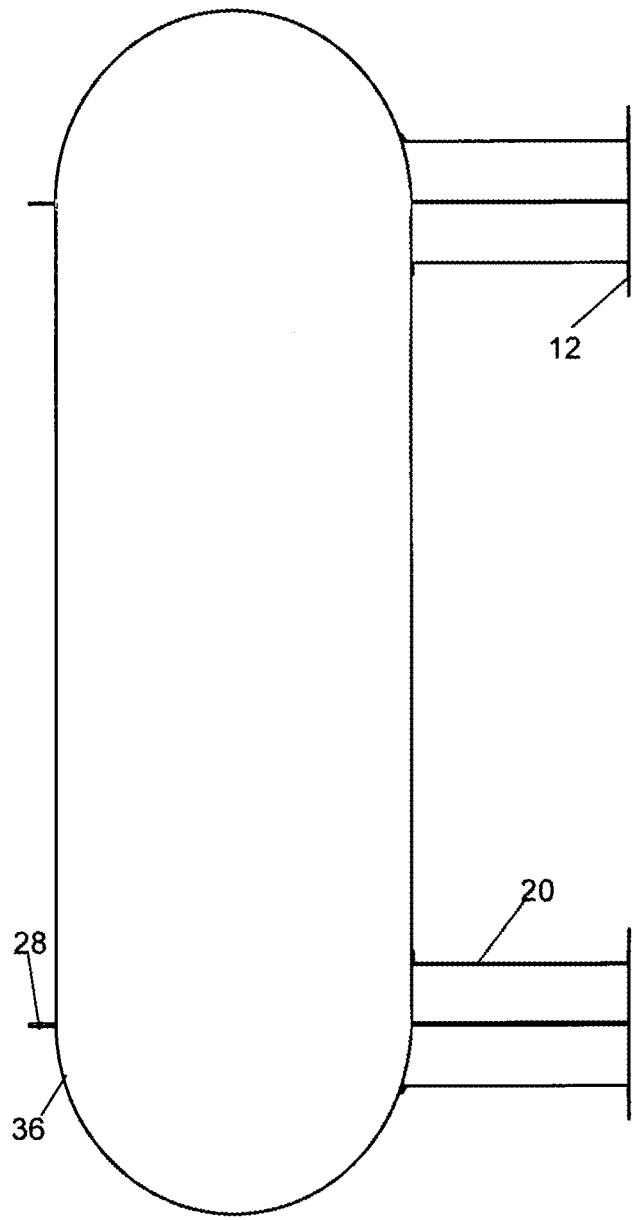
FIG. 15 is a top perspective view illustrating the Sun Lite Luminance Collector System-Over Sized (SLCS-OS) mounting bracket, top view, constructed in accordance with the present invention.

FIG. 15 is a top perspective view illustrating the Sun Lite Luminance Collector System-Over Sized (SLCS-OS) mounting bracket, top view, constructed in accordance with the present invention. The SLCS-OS is secured to the structure by a Mount Bracket Band System (36). Each mounting bracket is constructed with two outer Metal Extension Arms (20), a Base Mount Cross Bridge Plate (12) and SLCS-OS connectors (28).

Figure 16:
FIG. 16 is an angle perspective view of a drawing illustrating the Sun Lite Luminance Collector System-Over Sized (SLCS-OS) Mating Band, side view, constructed in accordance with the present invention.

FIG. 16 is an angle perspective view of a drawing illustrating the Sun Lite Luminance Collector System-Over Sized (SLCS-OS) Mating Band (14), side view, constructed in accordance with the present invention.

Figure 17:
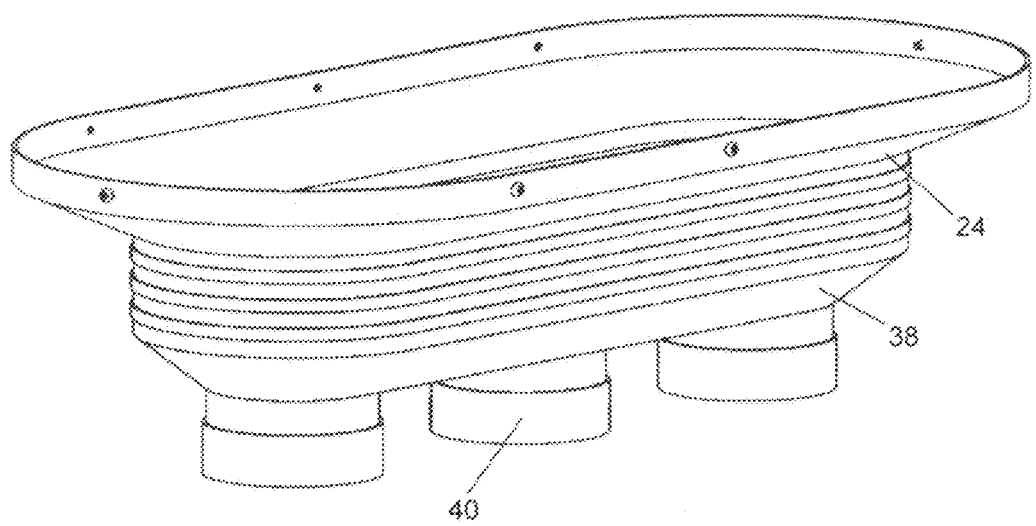
FIG. 17 is an angle perspective view of the Sun Lite Luminance Collector System-Over Sized (SLCS-OS) housing unit constructed in accordance with the present invention.

FIG. 17 is an angle perspective view of the Sun Lite Luminance Collector System-Over Sized (SLCS-OS) housing unit constructed in accordance with the present invention. The sunlight passes through the system and SLCS-OS cover, which is made of weather resistant Plexiglas. The Base Housing Body (38) is molded into the "V" Collector Funnel Body (24) and has three 8⅝" Plastic Tube—Female Openings (40).

Figure 18:
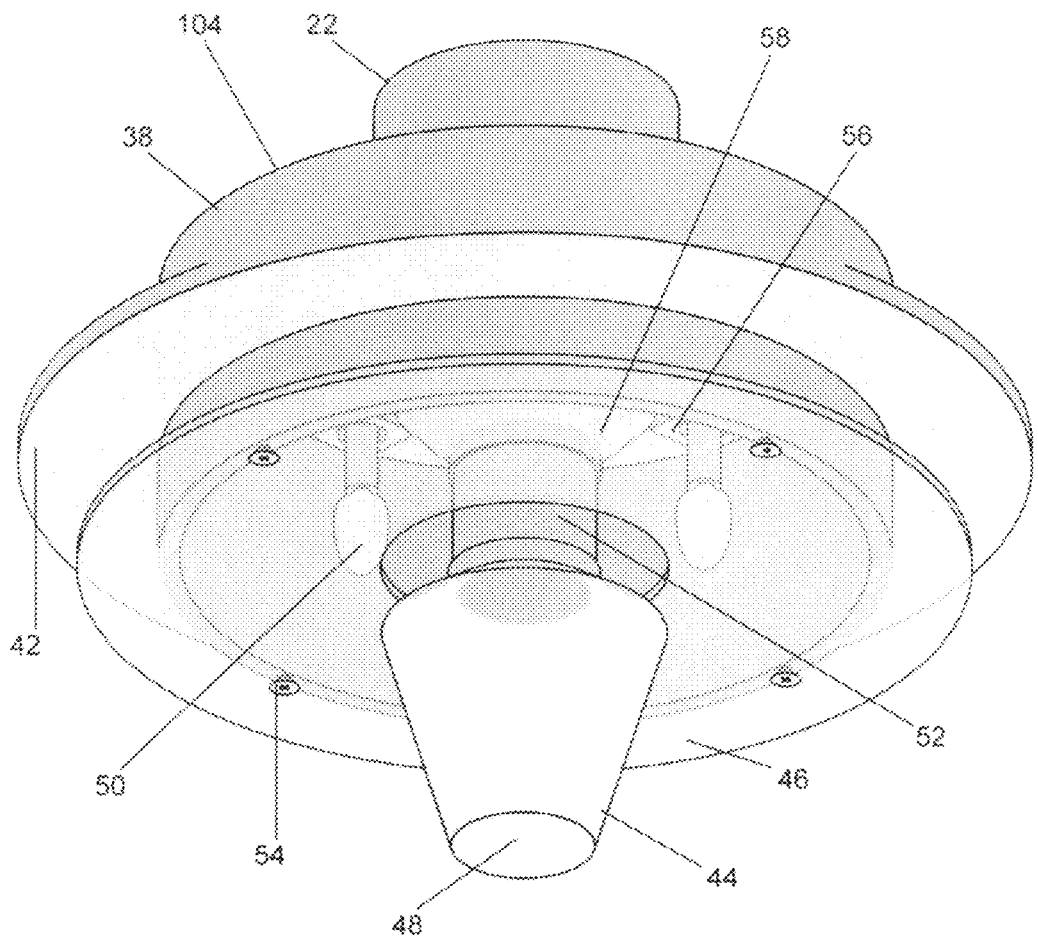
FIG. 18 is a bottom angle view of a drawing illustrating the Sun Electric Reflective Lite System (SERLS) and is constructed in accordance with the present invention.

FIG. 18 is a bottom angle view of a drawing illustrating the Sun Electric Reflective Lite System (SERLS) (104) and is constructed in accordance with the present invention. The SERLS (104) is a lite system of dual usage that is both sun driven and Light Emitting Diode (LED) (50) driven. It can be placed in medium-sized rooms to provide low energy cost saving luminance lighting, in areas such as the bedroom, hallway or office setting. The SERLS unit has one main line connector that is a 6" Plastic Tube with Female Opening (22), four Low Energy Diode (LED) (50) system units and Light Attachment Mounts (56) and Secure Mounting Lip (42). Four structural mounting holes are pre-drilled for the Screw Connections (54), that secure the unit. It also contains one Cover Light Plate (46) to protect the internal components of the SERLS unit. The SERLS is equipped with one Internal Bypass Funnel (58) unit that projects sunlight through the Opening (48) to the funnel into the Funnel Light Cover (44) and is connected to an Adapter Connector (52) that is mated to the Funnel Lite Cover (44) that directs sunlight into a beam of light through the SERLS unit.

Figure 19:
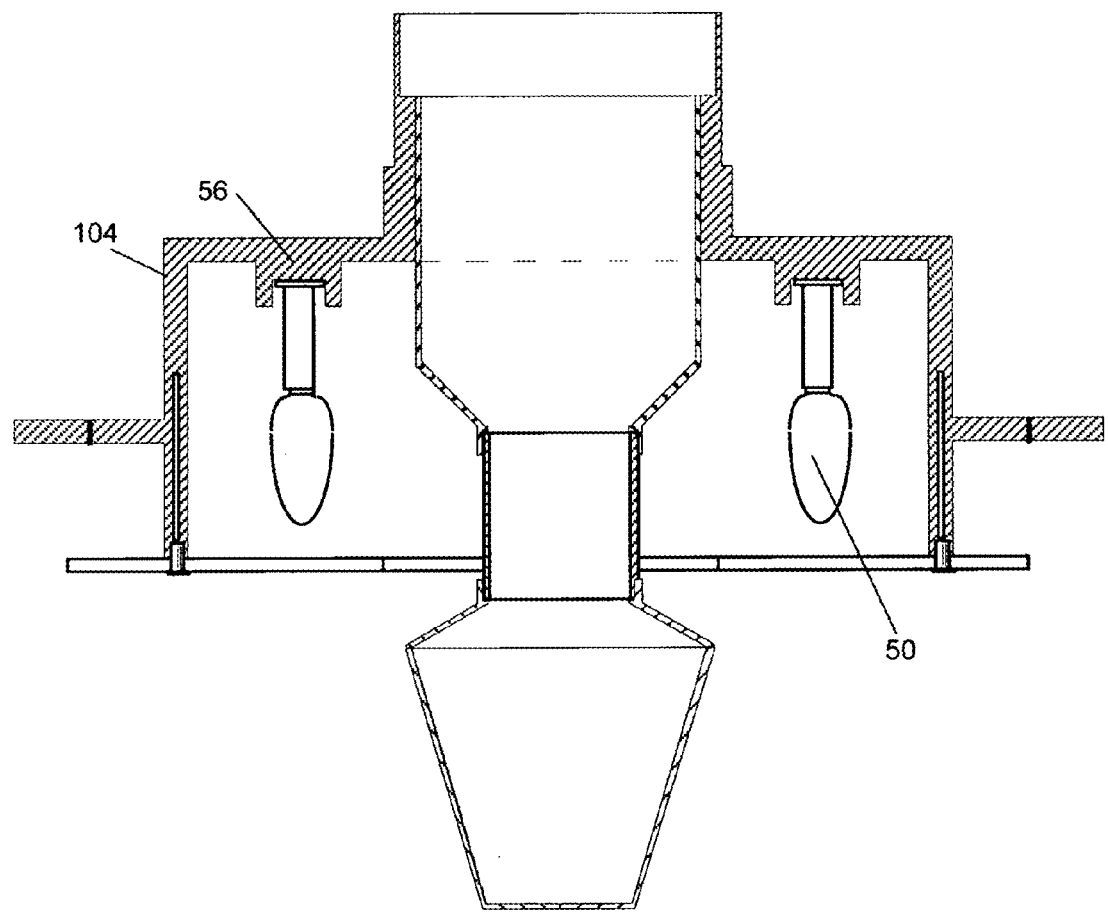
FIG. 19 is a side perspective view illustrating the Sun Electric Reflective Lite System (SERLS), constructed in accordance with the present invention.

FIG. 19 is a side perspective view illustrating the Sun Electric Reflective Lite System (SERLS) (104), constructed in accordance with the present invention. The SERLS unit is equipped with a heat resistant plastic Base Housing Body (38) that is equipped with light attachment mounts (56) that are used to mate all Light-Emitting Diode (LED) (50) lighting system into the SERLS unit.

Figure 20:
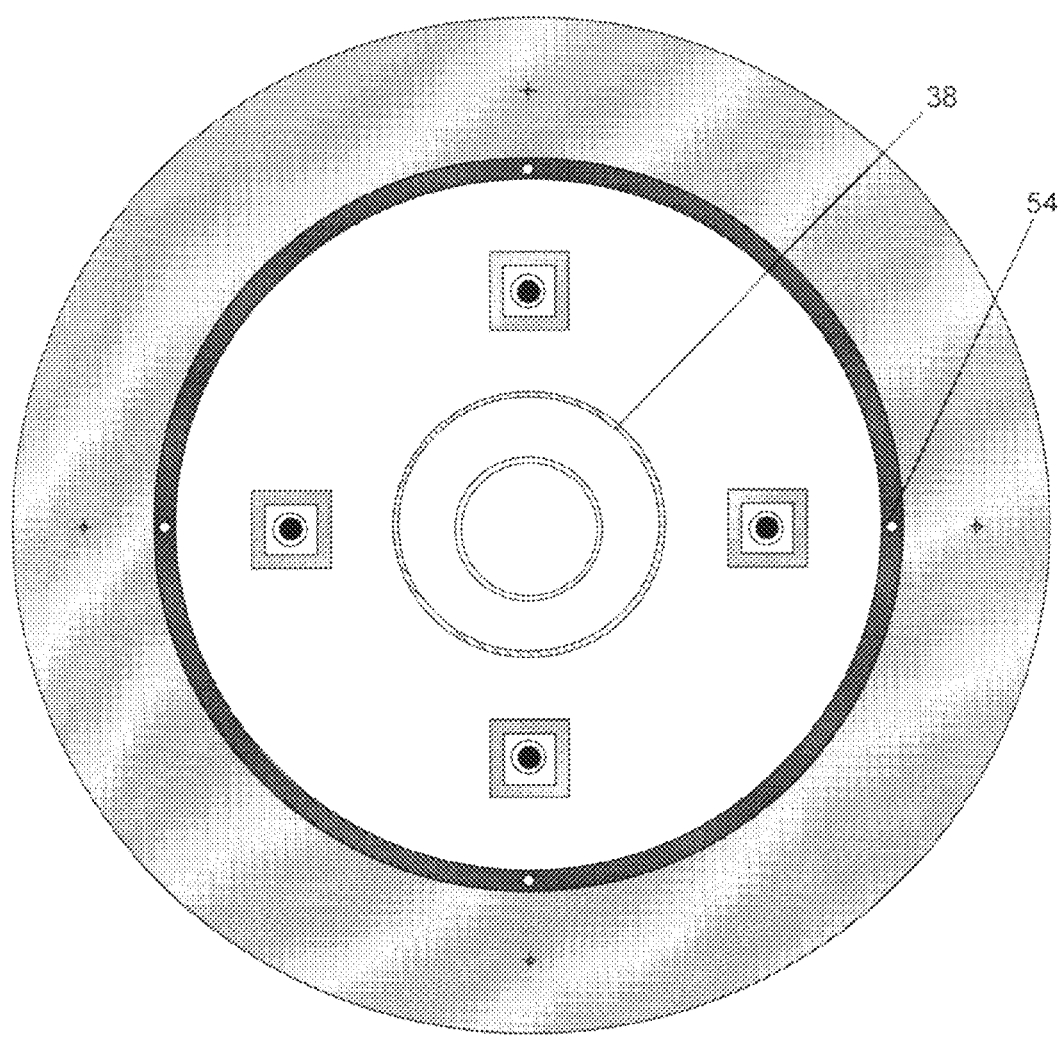
FIG. 20 is a bottom up perspective illustrating the Sun Electric Reflective Lite System (SERLS) constructed in accordance with the present invention.

FIG. 20 is a bottom up perspective illustrating the Sun Electric Reflective Lite System (SERLS) constructed in accordance with the present invention. The SERLS Screw Connections (54) and the Base Housing Body (38) are connected with screws.

Figure 21:
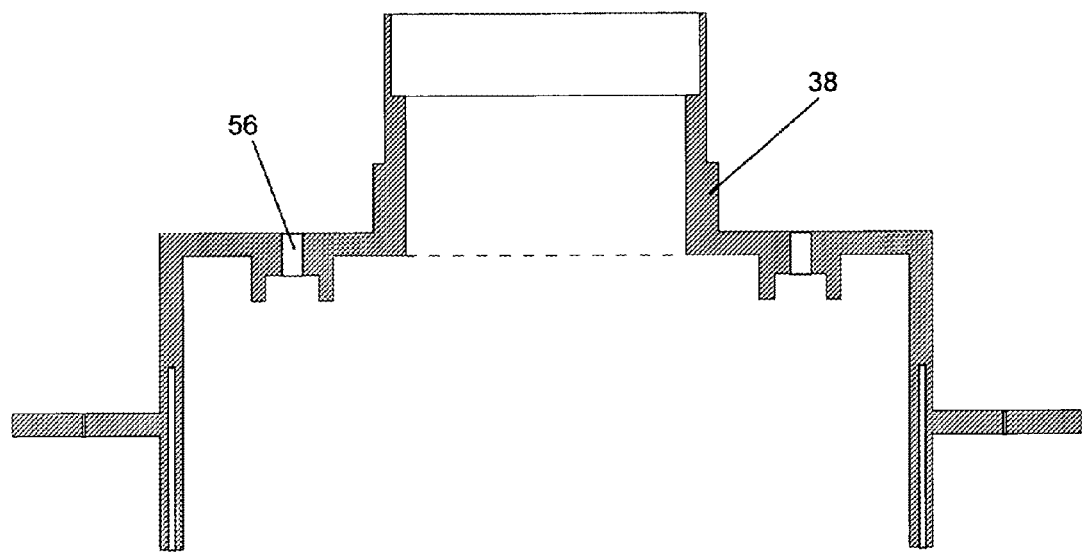
FIG. 21 is a side perspective view illustrating the Sun Electric Reflective Lite System (SERLS) constructed in accordance with the present invention.

FIG. 21 is a side perspective view illustrating the Sun Electric Reflective Lite System (SERLS) constructed in accordance with the present invention. The SERLS Base Housing Body (38) is able to with stand heat from the Light Attachment Mounts (56) and will not melt or cause damage.

Figure 22:
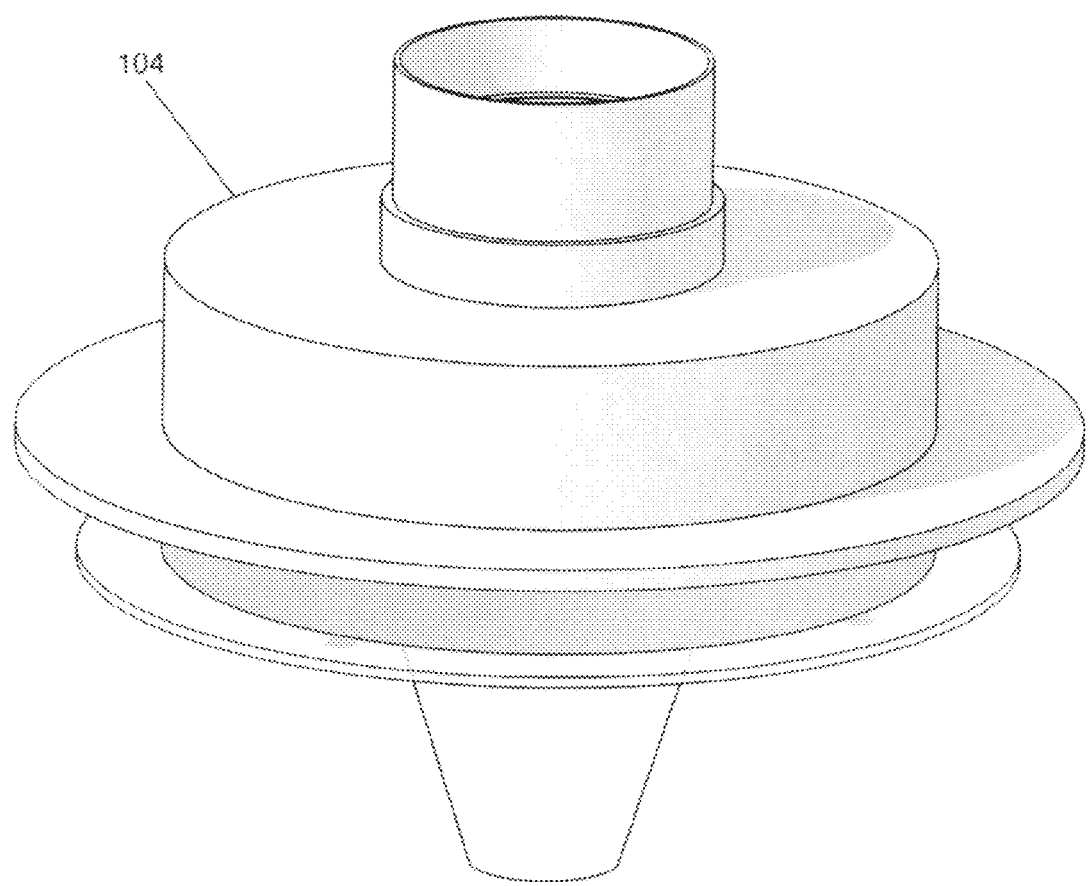
FIG. 22 is an angle top perspective view illustrating the Sun Electric Reflective Lite System (SERLS) housing constructed in accordance with the present invention.

FIG. 22 is an angle top perspective view illustrating the Sun Electric Reflective Lite System (SERLS) (104) housing constructed in accordance with the present invention. The SERLS bypass funnel is made of plastic and the interior is coated with "Glass Paint" to help provide brighter luminance capability.

Figure 23:
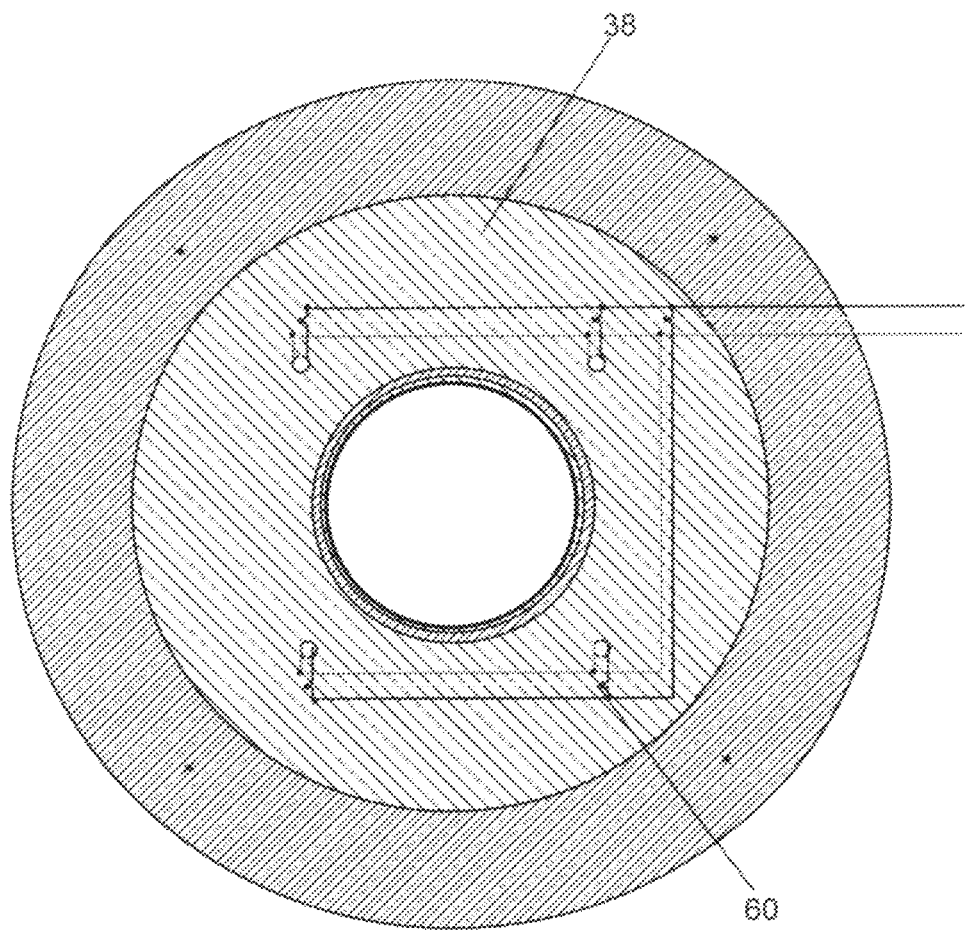
FIG. 23 is a top perspective view illustrating the Sun Electric Reflective Lite System (SERLS) constructed in accordance with the present invention.

FIG. 23 is a top perspective view illustrating the Sun Electric Reflective Lite System (SERLS) constructed in accordance with the present invention. The SERLS Basic Electrical Wiring (60) connected from the internal Light Emitting Diode (LED) is connected through the internal Base Housing Body (38) and bundled together and placed on the outer top side for solder in electrical continuity usage.

Figure 24:
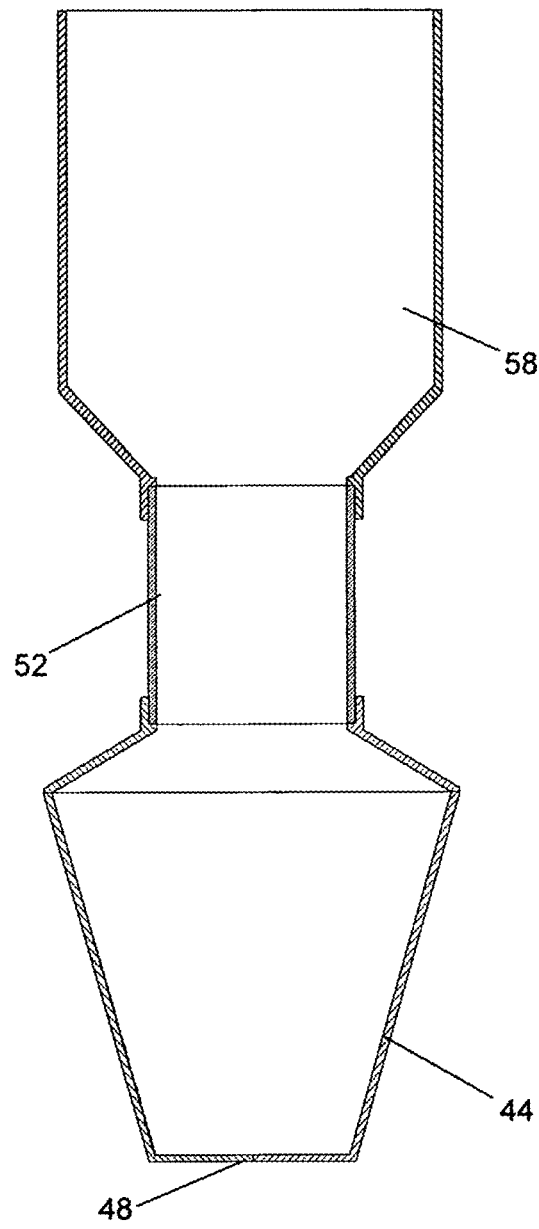
FIG. 24 is a side perspective view of a drawing illustrating the Sun Electric Reflective Lite System (SERLS) bypass component constructed in accordance with the present invention.

FIG. 24 is a side perspective view of a drawing illustrating the Sun Electric Reflective Lite System (SERLS) bypass component constructed in accordance with the present invention. The SERLS Adapter Connector (52) is made of plastic and connects to the Bypass Funnel (58) without the use of glues or adhesives.

Figure 25:
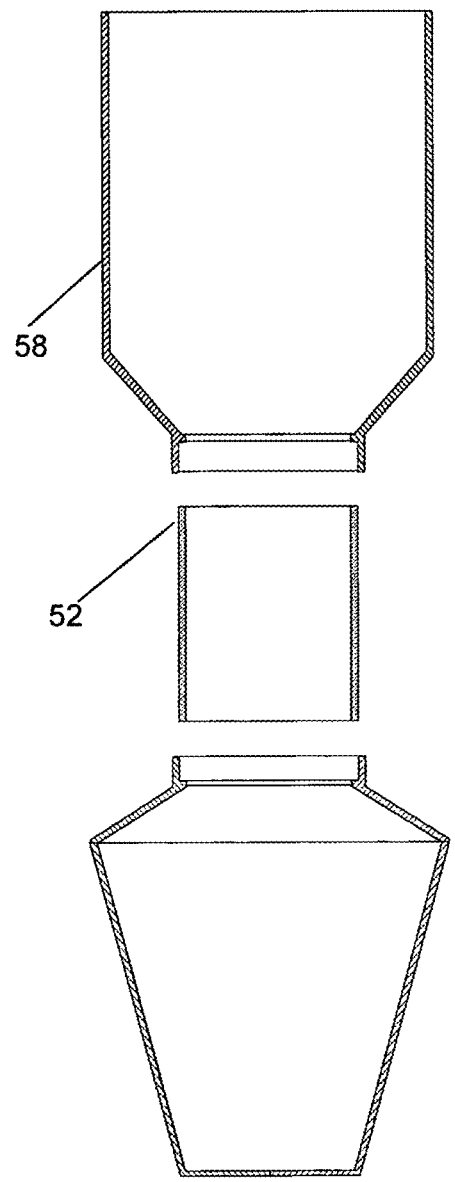
FIG. 25 is a side exploded view of a drawing illustrating the Sun Electric Reflective Lite System (SERLS) bypass component constructed in accordance with the present invention.

FIG. 25 is a side exploded view of a drawing illustrating the Sun Electric Reflective Lite System (SERLS) bypass component constructed in accordance with the present invention. The SERLS Adapter Connector (52) is made of plastic and connects to the Bypass Funnel (58) without the use of glues or adhesives.

Figure 26:
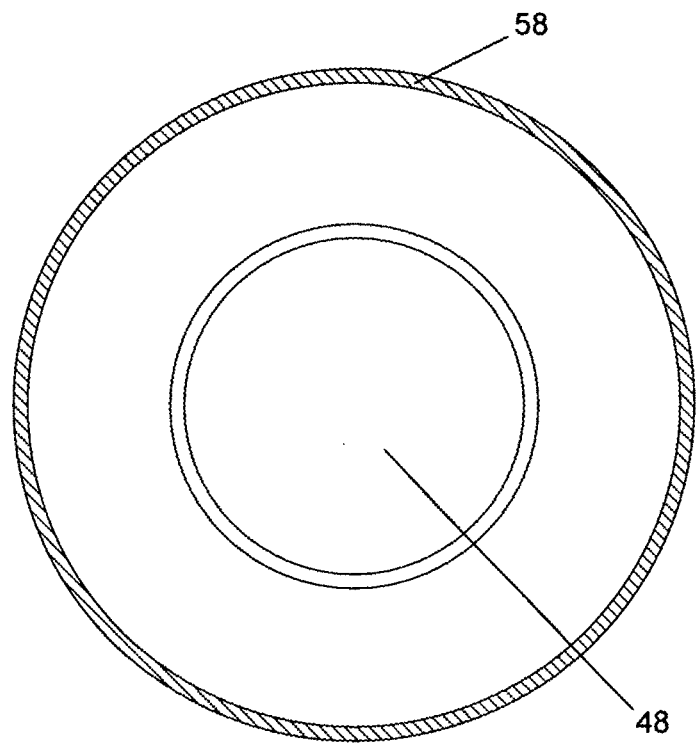
FIG. 26 is a bottom up perspective view of a drawing illustrating the Sun Electric Reflective Lite System (SERLS) Internal Bypass Funnel constructed in accordance with the present invention.

FIG. 26 is a bottom up perspective view of a drawing illustrating the Sun Electric Reflective Lite System (SERLS) Internal Bypass Funnel (58) constructed in accordance with the present invention. The SERLS Opening (48) to the funnel hole is used to connect the funnel lite cover to the adapter connector without the use of glues or adhesives.

Figure 27:
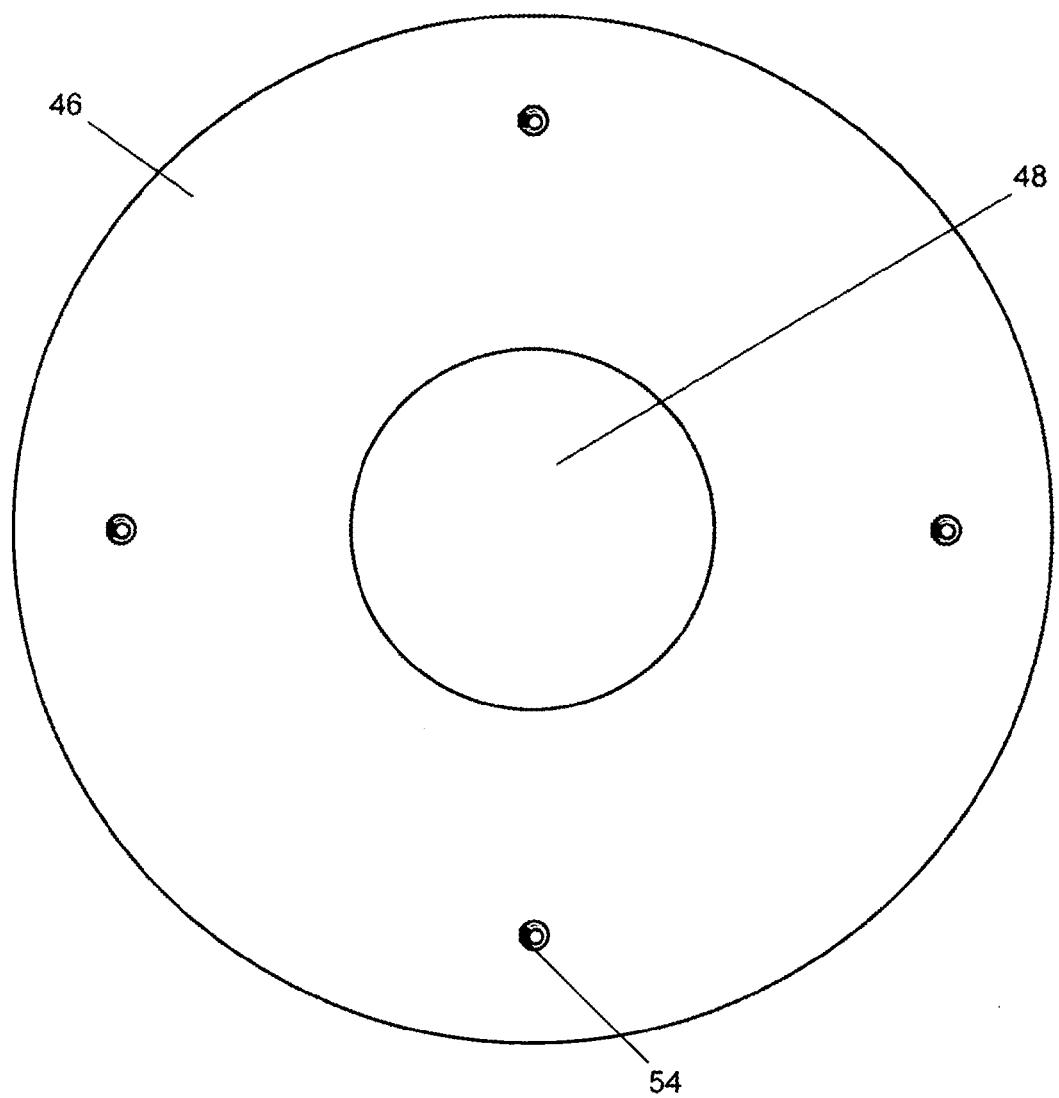
FIG. 27 is a bottom up perspective view of a drawing illustrating the Sun Electric Reflective Lite System (SERLS) Cover Light Plate constructed in accordance with the present invention.

FIG. 27 is a bottom up perspective view of a drawing illustrating the Sun Electric Reflective Lite System (SERLS) Cover Light Plate (46) constructed in accordance with the present invention. The SERLS Cover Light Plate (46) protects the internal components and is tinted light blue for decorative purposes. The SERLS Screw Connection (54) holes are strategically placed to match the base housing body holes.

Figure 28:
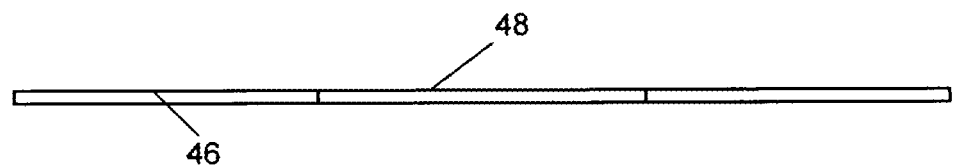
FIG. 28 is a side perspective view of a drawing illustrating the Sun Electric Reflective Lite System (SERLS) flat view of the cover plate, constructed in accordance with the present invention.

FIG. 28 is a side perspective view of a drawing illustrating the Sun Electric Reflective Lite System (SERLS) flat view of the cover plate, constructed in accordance with the present invention. The SERLS Cover Light Plate (46) protects the internal components and is tinted light blue for decoration. The SERLS screw holes are strategically placed to match the base housing body and Opening (48).

Figure 29:
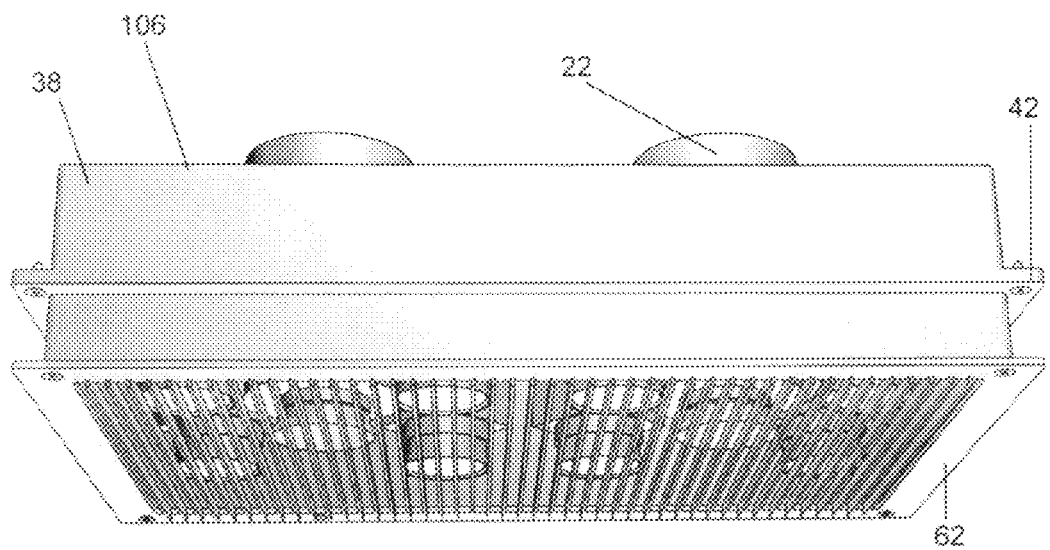
FIG. 29 is an angle side perspective view drawing illustrating the Sun Electric Fluorescent Lite System (SEFLS) constructed in accordance with the present invention.

FIG. 29 is an angle side perspective view drawing illustrating the Sun Electric Fluorescent Lite System (SEFLS) (106) constructed in accordance with the present invention. The SEFLS is a dual usage system that is placed in large rooms to project lighting throughout rooms such as the Living Room and Kitchen. The SEFLS unit is equipped with a heat resistant Plastic Base Housing Body (38) equipped with light attachment mounts that are used to mate all Light Emitting Diode (LED) in the SEFLS unit, and has two 6" Plastic Tube with Female Opening (22). The SEFLS unit has a Secure Mounting Lip (42) that is used to mount SEFLS unit to the ceiling, and is protected by the Fluorescent Light Cover (62).

Figure 30:
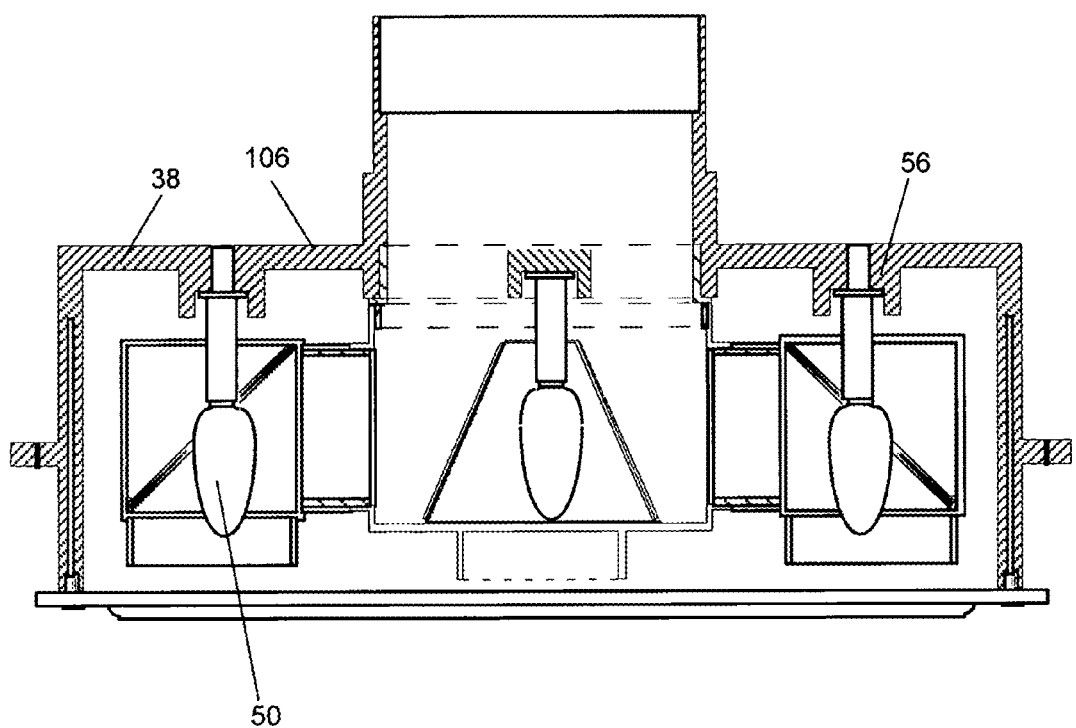
FIG. 30 is a side perspective view illustrating the Sun Electric Fluorescent Lite System (SEFLS) constructed in accordance with the present invention.

FIG. 30 is a side perspective view illustrating the Sun Electric Fluorescent Lite System (SEFLS) (106) constructed in accordance with the present invention. The SEFLS is a dual usage system that is placed in large rooms to project lighting throughout rooms, such as the Living Room and Kitchen. The SEFLS unit is equipped with a heat resistant plastic Base Housing Body (38) equipped with Light Attachment Mounts (56) that are used to mate all Light-Emitting Diode (LED) (50) into the SEFLS unit. All electrical wiring connected from internal Light-Emitting Diode (LED) (50) are considered basic wiring and will be connected through the internal Base Housing Body (38) and bundled together, placed on the outer top side for solder, to produce electrical continuity.

Figure 31:
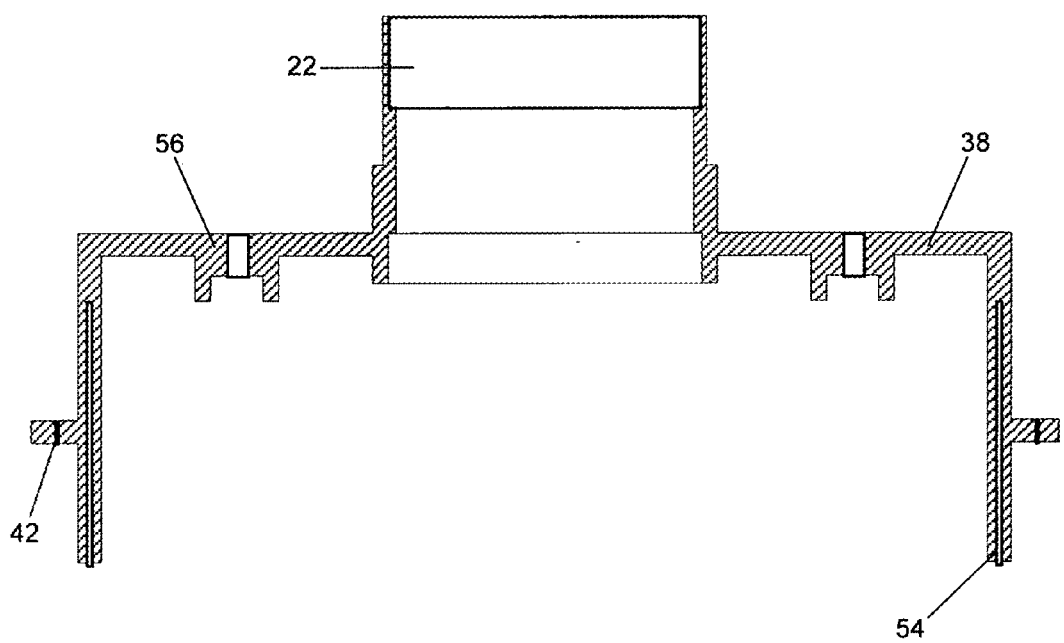
FIG. 31 is a side perspective view illustrating Sun Electric Fluorescent Lite System (SEFLS), inside view, constructed in accordance with the present invention.

FIG. 31 is a side perspective view illustrating Sun Electric Fluorescent Lite System (SEFLS), inside view, constructed in accordance with the present invention. The SEFLS unit has a main line connector that is a PVC tube, Light-Emitting Diode (LED) system unit and Light Attachment Mounts (56), Secure Mounting Lip (42), pre-drilled structural mounting holes, Screw Connections (54) to secure the fluorescent light cover that protects the internal components of the SEFLS unit. The SEFLS is equipped with two Sun Dual Intake Systems that project sunlight through the reflective chambers and connect to the small reflector elbow box and also through the open holes.

Figure 32:
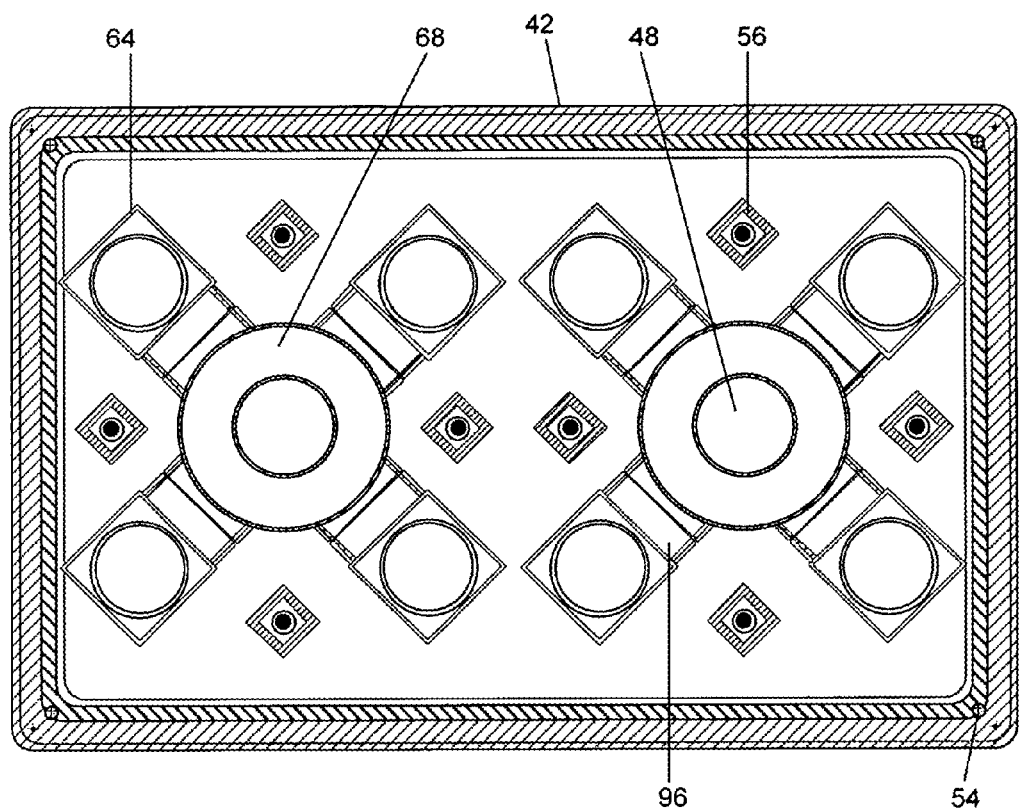
FIG. 32 is a bottom up perspective illustrating the Sun Electric Fluorescent Lite System (SEFLS) housing unit constructed in accordance with the present invention.

FIG. 32 is a bottom up perspective illustrating the Sun Electric Fluorescent Lite System (SEFLS) housing unit constructed in accordance with the present invention. The SEFLS unit is made of heat resistant, durable plastic. The SEFLS unit has eight Small Reflector Boxes (64), the two Top Intake Cover Ring (68), Secure Mounting Lip (42), the two Openings (48), and 3" Sun Lite Reflective Tube System (96).

Figure 33:
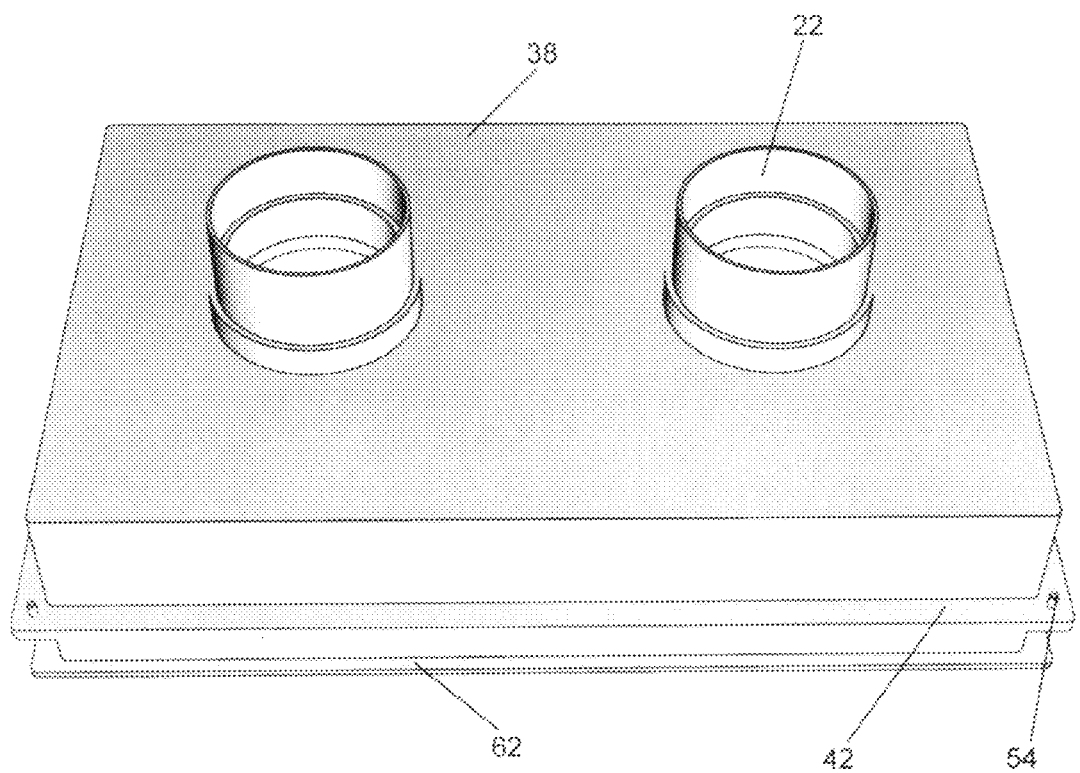
FIG. 33 is an angle top perspective view of a drawing illustrating the Sun Electric Fluorescent Lite System (SEFLS), constructed in accordance with the present invention.

FIG. 33 is an angle top perspective view of a drawing illustrating the Sun Electric Fluorescent Lite System (SEFLS) (106), constructed in accordance with the present invention. The SEFLS internal lighting system is a Light-Emitting Diode (LED) (50) and sun reflection system only. The Base Housing Body (38), SEFLS Fluorescent Light Cover (62), Secure Mounting Lip (42), Screw Connections (54) aid in securing the unit to the ceiling.

Figure 34:
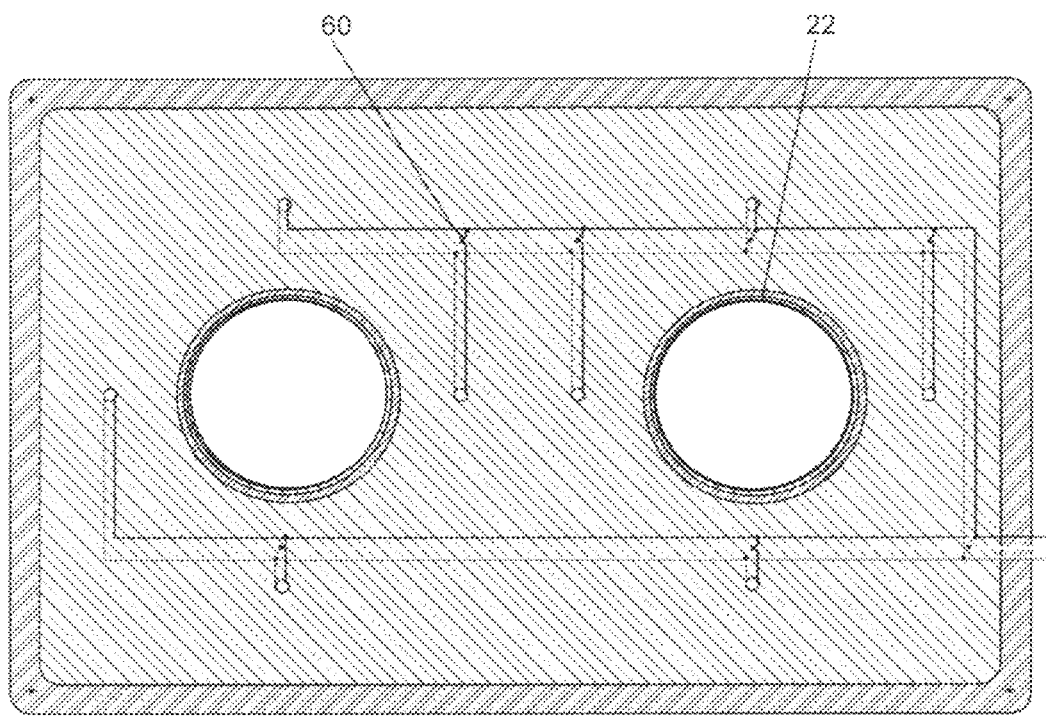
FIG. 34 is a top perspective view of the Sun Electric Fluorescent Lite System (SEFLS) Basic Electrical Wiring diagram, constructed in accordance with the present invention.

FIG. 34 is a top perspective view of the Sun Electric Fluorescent Lite System (SEFLS) (106) Basic Electrical Wiring (60) diagram, constructed in accordance with the present invention. SEFLS has two 6" Plastic Tubes with Female Openings (22) that are connected to separate Sun Dual Intake System that project sunlight in eight directions.

Figure 35:
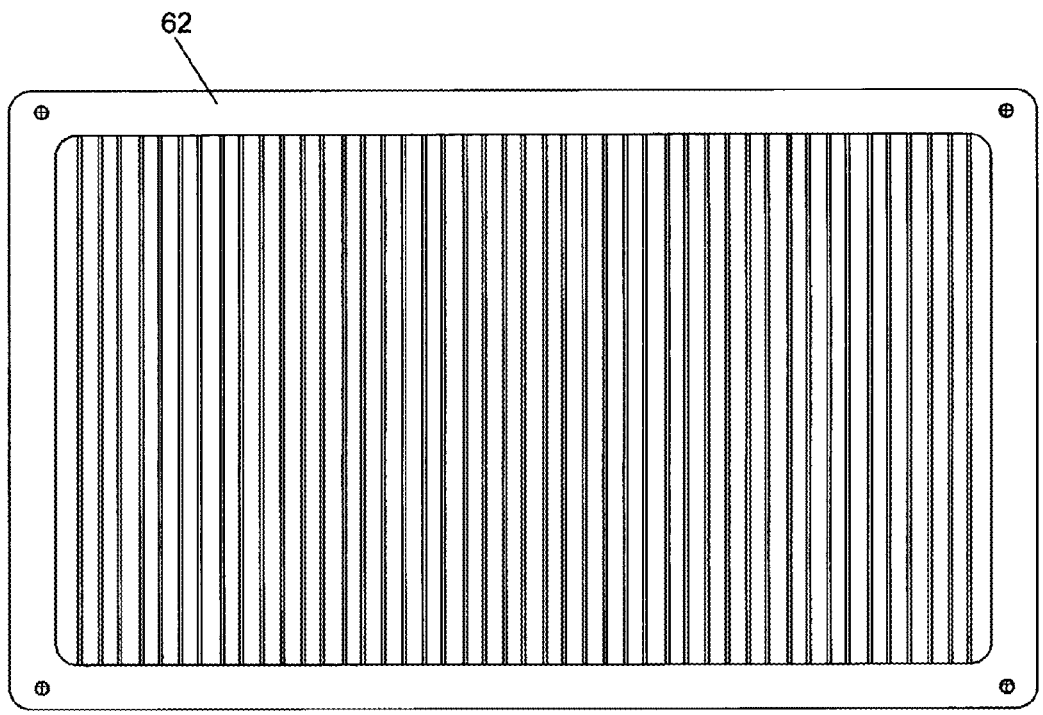
FIG. 35 is a bottom up perspective illustrating the Sun Electric Fluorescent Lite System (SEFLS) cover unit constructed in accordance with the present invention.

FIG. 35 is a bottom up perspective illustrating the Sun Electric Fluorescent Lite System (SEFLS) cover unit constructed in accordance with the present invention. The SEFLS Fluorescent Light Cover (62) plate was designed as a fluorescent configuration only. The cut stationary louvers within the fluorescent light cover projects the internal light as a fluorescent light.

Figure 36:
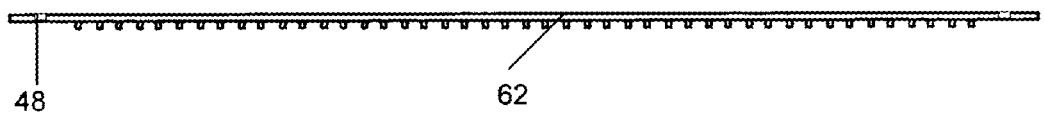
FIG. 36 is a side perspective view illustrating the Sun Electric Fluorescent Lite System (SEFLS) cover unit constructed in accordance with the present invention.

FIG. 36 is a side perspective view illustrating the Sun Electric Fluorescent Lite System (SEFLS) cover unit constructed in accordance with the present invention. The SEFLS Fluorescent Light Cover (62) was designed as fluorescent configuration only. The cut stationary louvers within the fluorescent light cover projects the internal light as a fluorescent light.

Figure 37:
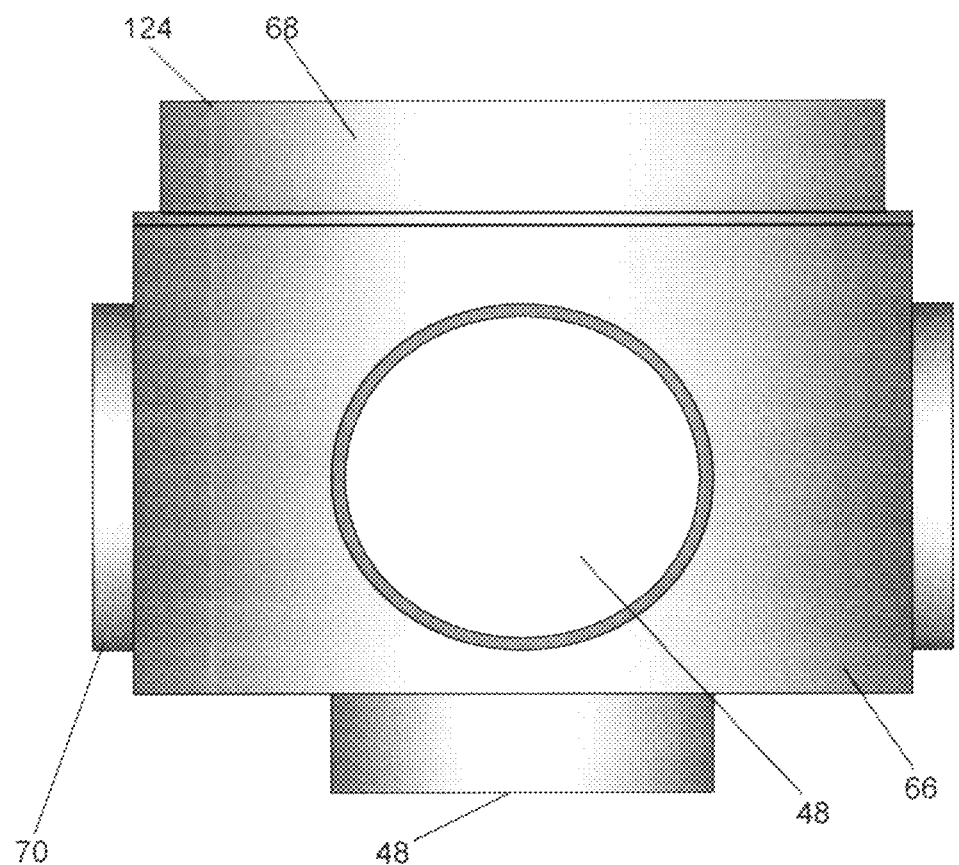
FIG. 37 is a side perspective view illustrating the Sun Dual Intake System (SDIS) constructed in accordance with the present invention.

FIG. 37 is a side perspective view illustrating the Sun Dual Intake System (SDIS) (124) constructed in accordance with the present invention. The SDIS Dual Intake Body (66) is a dual quad projection system that reflects sunlight through the dual quad openings. The top intake cover ring (68) secures the internal components so that the dual Opening (48) can filter sun light through the base Opening (48). After manufacturing, the Sun Dual Intake System will be incorporated with the Sun Lite Reflective Tube System (SLRTS) that are internally coated with glass reflective paint and integrated into the small reflector elbow box system to project natural sunlight through the Sun Dual Intake System.

Figure 38:
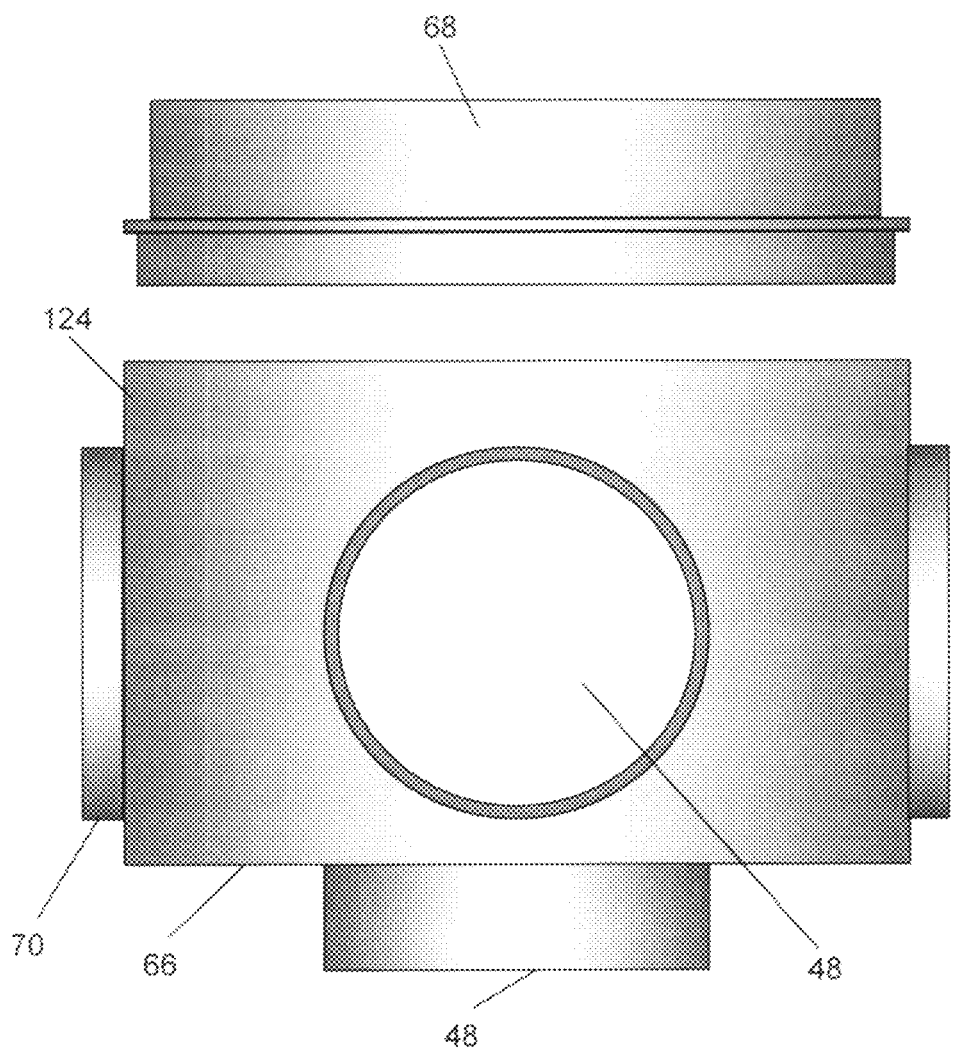
FIG. 38 is a side perspective view illustrating the Sun Dual Intake System (SDIS) constructed in accordance with the present invention.

FIG. 38 is a side perspective view illustrating the Sun Dual Intake System (SDIS) (124) constructed in accordance with the present invention. The SDIS is a dual quad projection system that reflects sunlight through the dual quad openings. The Top Intake Cover Ring (68) secures the internal components so that the Dual Intake Body (66) and the Opening (48) can filter sun light through the base Opening (48). After manufacturing, the Sun Dual Intake System will be incorporated with the Sun Lite Reflective Tube System (SLRTS) that is internally coated with glass reflective paint and integrated into the small reflector elbow box system to project natural sunlight through the Sun Dual Intake System (124).

Figure 39:
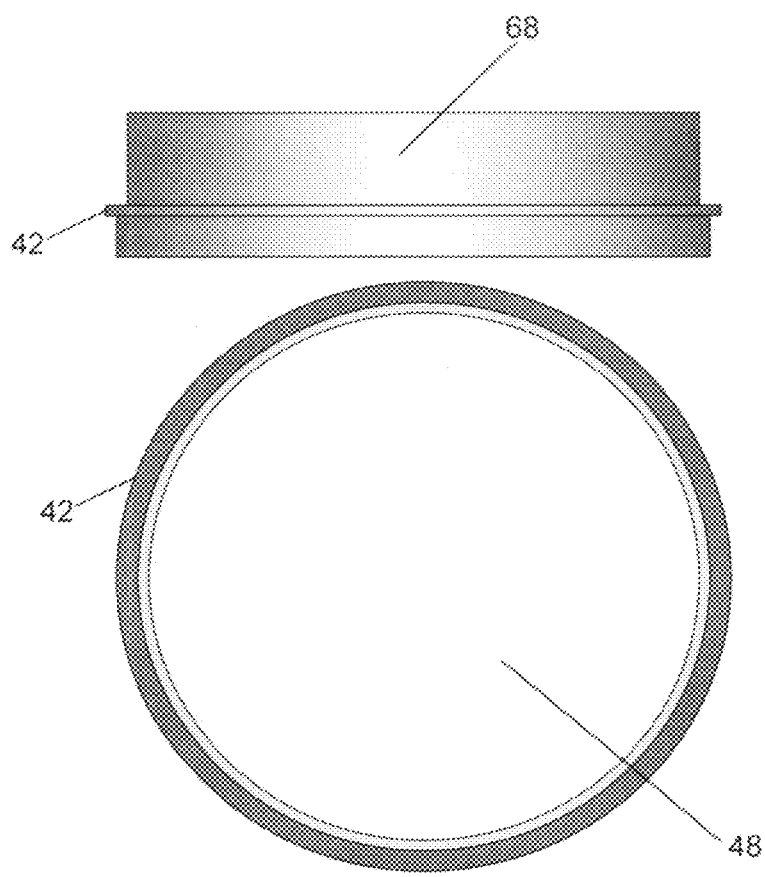
FIG. 39 is a perspective view illustrating Sun Dual Intake System (SDIS) internal ring gasket to be constructed in accordance with the present invention.

FIG. 39 is a perspective view illustrating Sun Dual Intake System (SDIS) internal ring gasket to be constructed in accordance with the present invention. The Intake Cover Ring (68) secures the Sun Dual Intake Housing and the SDIS Secure Mount Lip (42) fixes it to the housing and projects sun lite luminance through the Opening (48).

Figure 40:
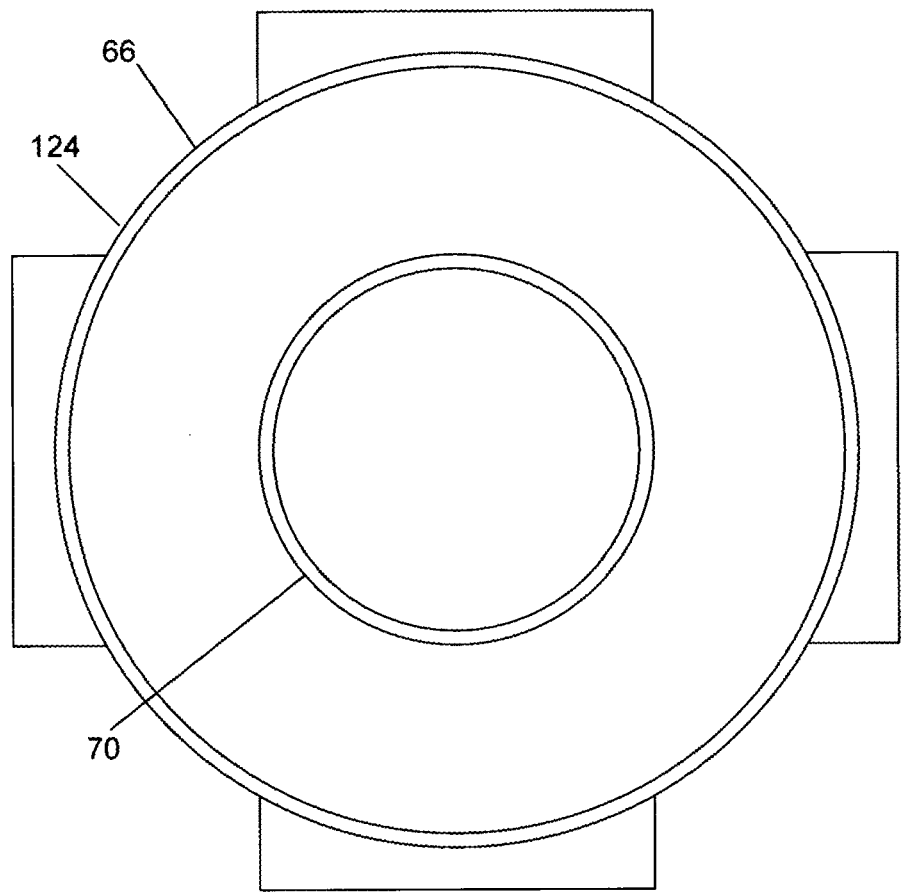
FIG. 40 is a bottom up perspective illustrating the Sun Dual Intake System (SDIS), constructed in accordance with the present invention.

FIG. 40 is a bottom up perspective illustrating the Sun Dual Intake System (SDIS) (124), constructed in accordance with the present invention. The Sun Dual Intake System Dual Intake Body (66) outer housing is designed to be heat resistant and to incorporate a plastic intake mount system that has reflective glass mirrors connected to the 3" Plastic Tube—Female Opening (70).

Figure 41:
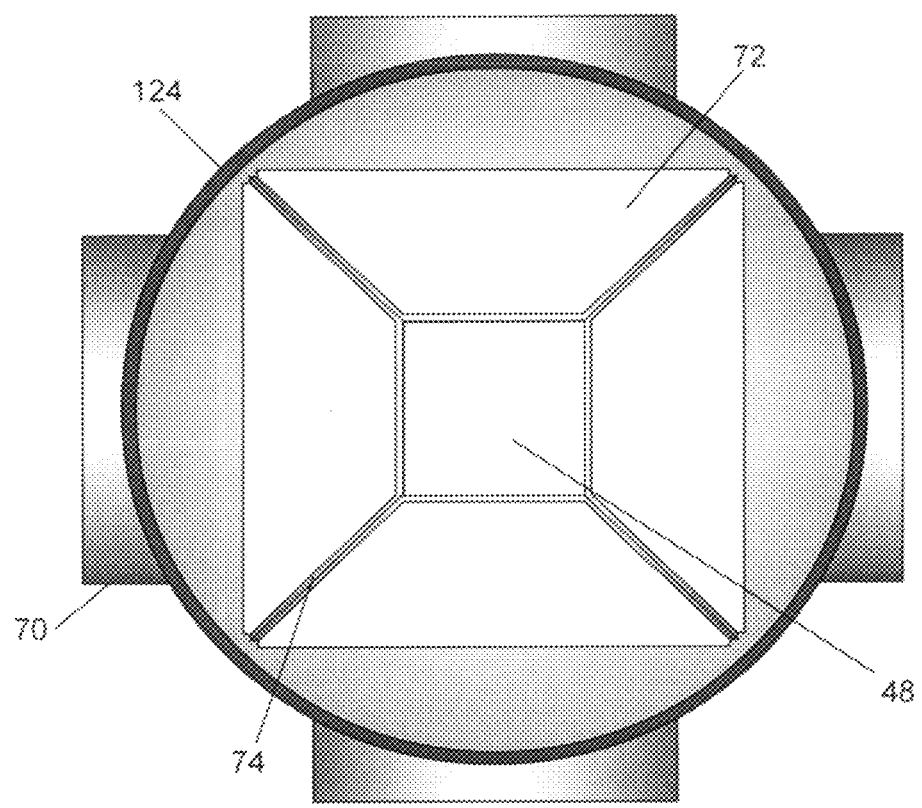
FIG. 41 is a top perspective view illustrating the Sun Dual Intake System (SDIS) with mirrors, internal view, to be constructed in accordance with the present invention.

FIG. 41 is a top perspective view illustrating the Sun Dual Intake System (SDIS) (124) with mirrors, internal view, to be constructed in accordance with the present invention. The Sun Dual Intake System has an Intake Mirror Mount (74) System that Reflective Glass Mirrors (72) are secured to with adhesive. The Sun Dual Intake System has an Opening (48) that projects the sunlight through the center of the squared Opening (48) and has four 3" Plastic Tube—Female Opening (70).

Figure 42:
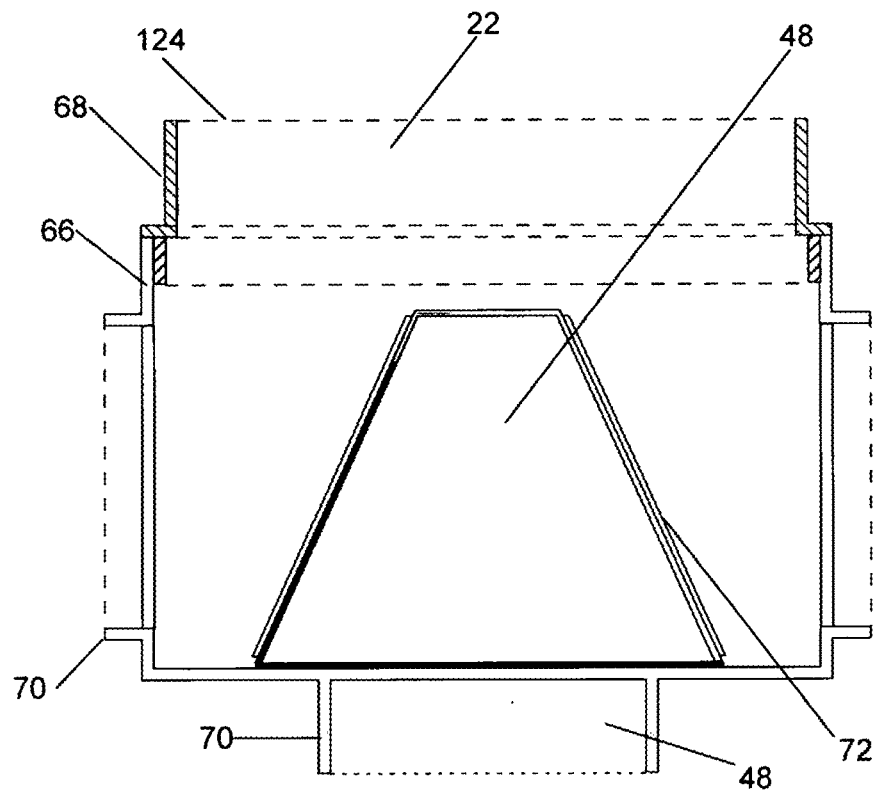
FIG. 42 is a side perspective view illustrating the Sun Dual Intake System (SDIS) with mirrors, internal view, to be constructed in accordance with the present invention.

FIG. 42 is a side perspective view illustrating the Sun Dual Intake System (SDIS) (124) with mirrors, internal view, to be constructed in accordance with the present invention. The Sun Dual Intake System has an Intake Mount System that reflective mirrors are secured by adhesive. The Sun Dual Intake System has a plastic tube with female Opening (48) that reflects the sunlight off the internal Reflective Glass Mirrors (72) that go through the plastic tube female Opening (48). The SDIS (124) Top Intake Cover Ring (68) is connected to the Dual Intake Body (66) consisting of four 3" Plastic Tube—Female Opening (70) and one 6" Plastic Tube with Female Opening (22).

FIG. 43 is a perspective view illustrating the Sun Dual Intake System (SDIS) with an Intake Light Mount (76) internal view, to be constructed in accordance with the present invention. The SDIS Intake Light Mount (76) is used to mount an internal long stem Light-Emitting Diode (LED) system to the SEHLS unit. The Intake Light Mount (76) was designed to have an Intake Light Mount Lip (78) to stabilize the Light-Emitting Diode (LED) system in place.

Figure 44:
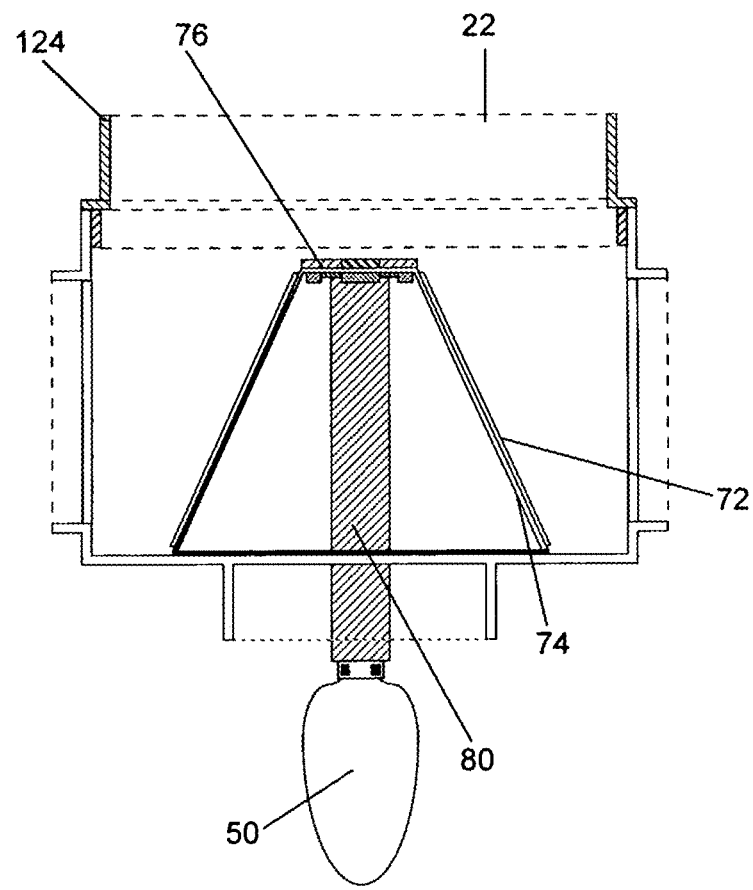
FIG. 44 is an inside perspective view of a figure illustrating Sun Dual Intake System Light Mirror Mount internal view, constructed in accordance with the present invention.

FIG. 44 is an inside perspective view of a figure illustrating Sun Dual Intake System Light Mirror Mount (74) internal view, constructed in accordance with the present invention. The SDIS Intake Light Mount (76) is used to mount an internal long stem Light-Emitting Diode (LED) (50) system to the SDIS component unit surrounded by Reflective Glass Mirrors (72). The Intake Light Mount (76) was designed to have an Intake Light Mount Lip (78) to stabilize the Light Stem and Body (80) in place.

Figure 45:
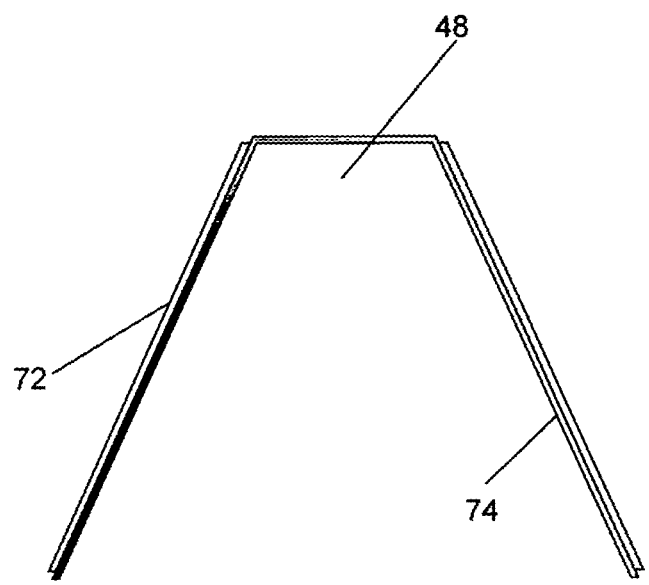
FIG. 45 is a side perspective view illustrating the Sun Dual Intake System (SDIS) with light mount and lighting unit internal view to be constructed in accordance with the present invention.

FIG. 45 is a side perspective view illustrating the Sun Dual Intake System (SDIS) with light mount and lighting unit internal view to be constructed in accordance with the present invention. The Sun Dual Intake System Intake Mirror Mount (74) is made of plastic and the Reflective Glass Mirrors (72) are adhered to connect the Light-Emitting Diode (LED) and through the base Opening (48) of the mounted unit.

Figure 46:
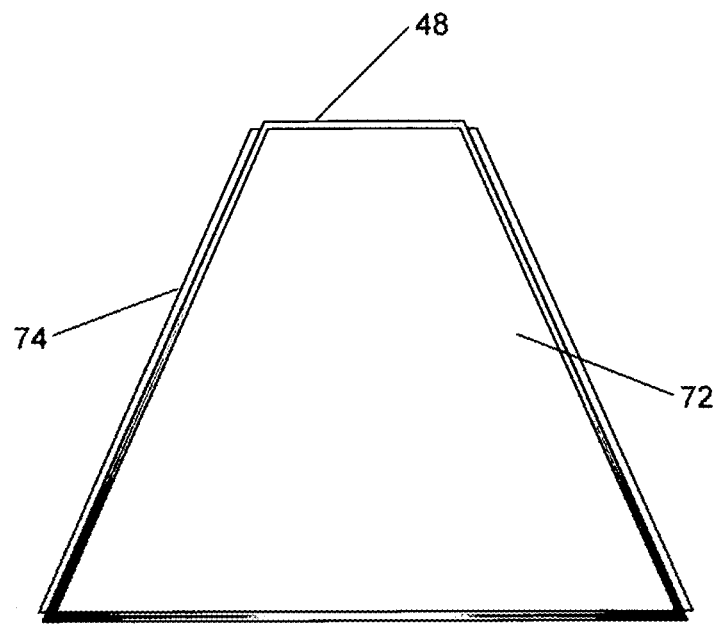
FIG. 46 is a side perspective view illustrating the Sun Dual Intake System (SDIS) internal hardware to be constructed in accordance with the present invention

FIG. 46 is a side perspective view illustrating the Sun Dual Intake System (SDIS) internal hardware to be constructed in accordance with the present invention. The Plastic Intake Mirror Mount (74) system is incorporated with angle Reflective Glass Mirrors (72) at the bottom, and adhered to the Plastic Intake Mount (74) system to reflect the luminance of the sun through the center Opening (48).

Figure 47:
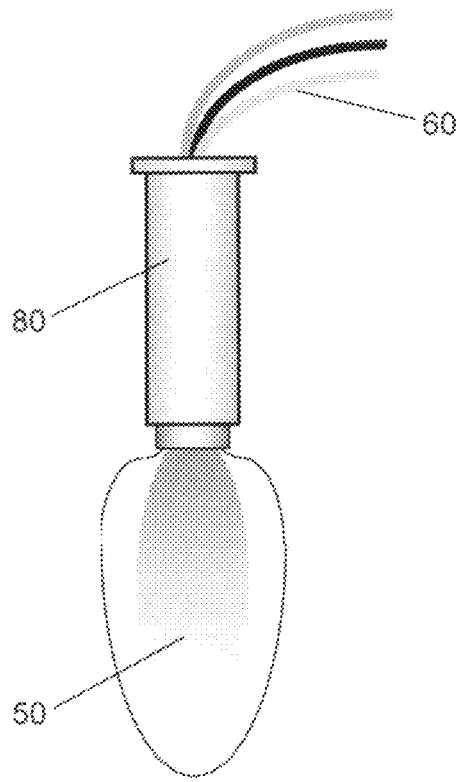
FIG. 47 is a side perspective view illustrating Light-Emitting Diode (LED) unit (commercial off the shelf) item constructed in accordance with the present invention.

FIG. 47 is a side perspective view illustrating Light-Emitting Diode (LED) (50) unit (commercial off the shelf) item constructed in accordance with the present invention. The LED is equipped with the Light Stem And Body (80) and Basic Electrical Wiring (60). The Sun/Electric Hybrid Lighting System (SEHLS) unit uses two different types of lighting products: short configuration and long configuration (commercial off the shelf or COTS) and can be purchased at any hardware store.

Figure 48:
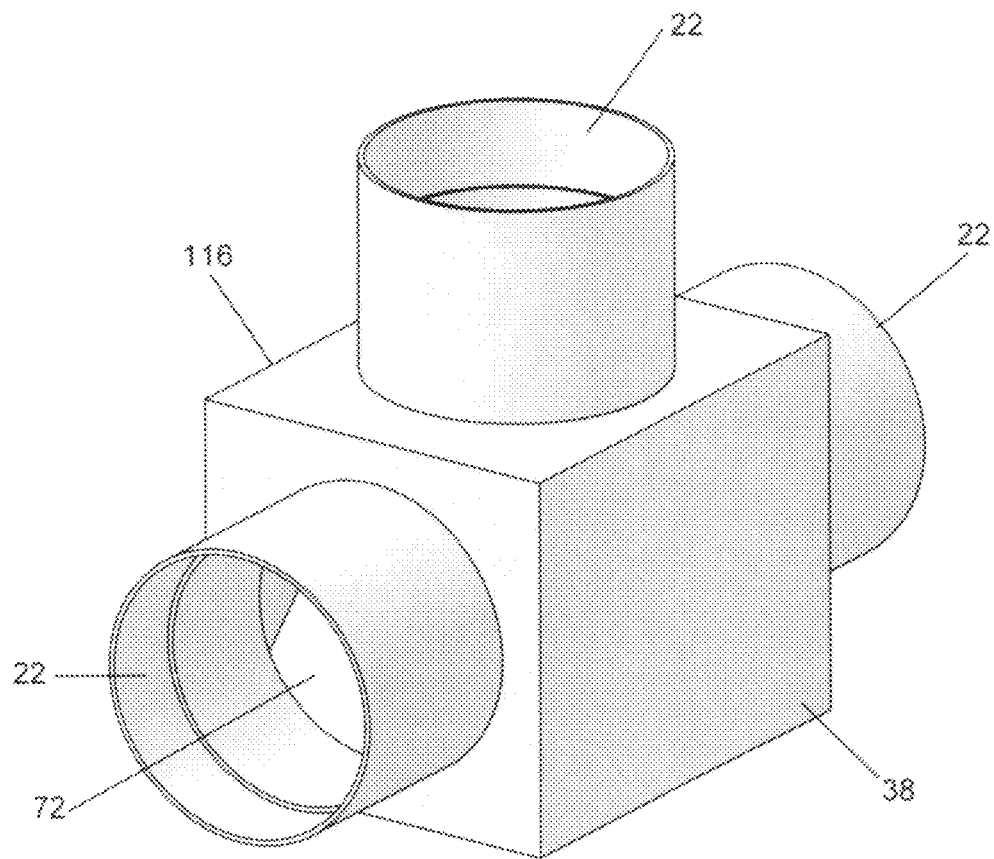
FIG. 48 is an angle perspective view illustrating the Splitter "T" Reflector Box System (STRBS) to be constructed in accordance with the present invention.

FIG. 48 is an angle perspective view illustrating the Splitter "T" Reflector Box System (STRBS) (116) to be constructed in accordance with the present invention. The STRBS System reflects sun light from one main line into the STRBS System into multiple reflective PVC lines into the Sun/Electric Hybrid Lighting System (SEHLS) unit for usage. The STRBS System is designed equipped with "I" Mirror Mount Stem to secure the two Reflective Glass Mirrors (72). Each STRBS System has one outside cover plate so that the internal components can be integrated together and secured for completion. The STRBS (116) comprises of three 6" Plastic Tube with Female Openings (22) in the Base Housing Body (38).

Figure 49:
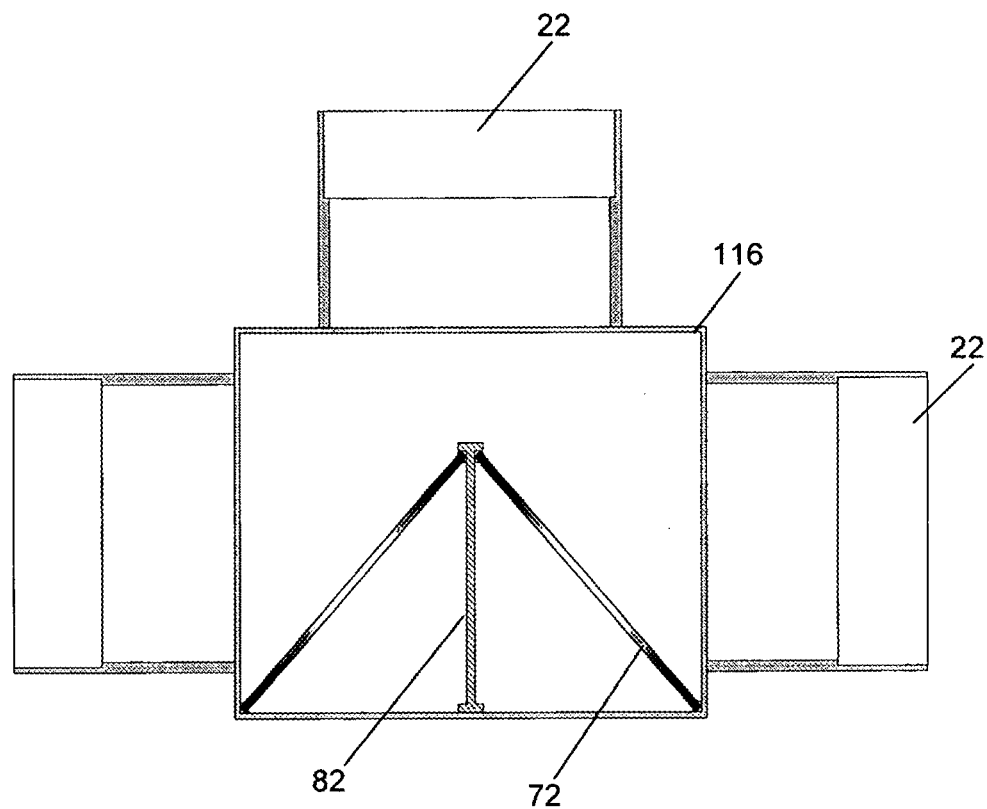
FIG. 49 is a side perspective view of the Splitter "T" Reflector Box System (STRBS) internal view, to be constructed in accordance with the present invention.

FIG. 49 is a side perspective view of the Splitter "T" Reflector Box System (STRBS) (116) internal view, to be constructed in accordance with the present invention. The STRBS System is a 6" PVC Pipe With Female Opening (22) unit that is integrated with an "I" Mirror Mount Stem (82). It is secured to the internal base of the STRBS System and the two internal Reflective Glass Mirrors (72) are secured at an angle for better reflection of the sun light luminance projection. After all internal components have been integrated, the side cover plate is then heat sealed for completion.

Figure 50:
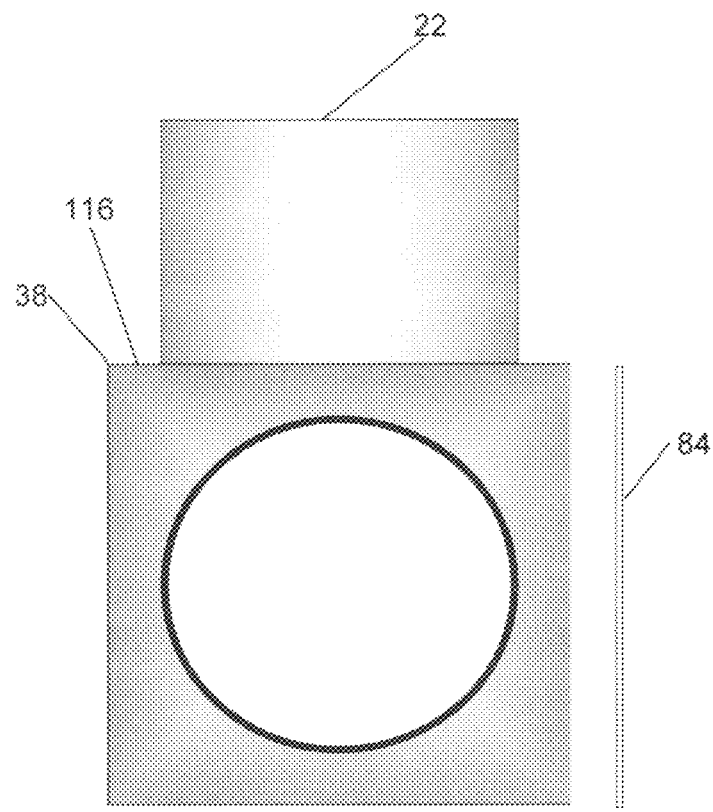
FIG. 50 is a front perspective view illustrating Splitter "T" Reflector Box System (STRBS) to be constructed in accordance with the present invention.

FIG. 50 is a front perspective view illustrating Splitter 'T' Reflector Box System (STRBS) (116) to be constructed in accordance with the present invention. The STRBS Side Cover Plate (84) is used to secure the internal components inside the Base Housing Body (38) unit.

Figure 51:
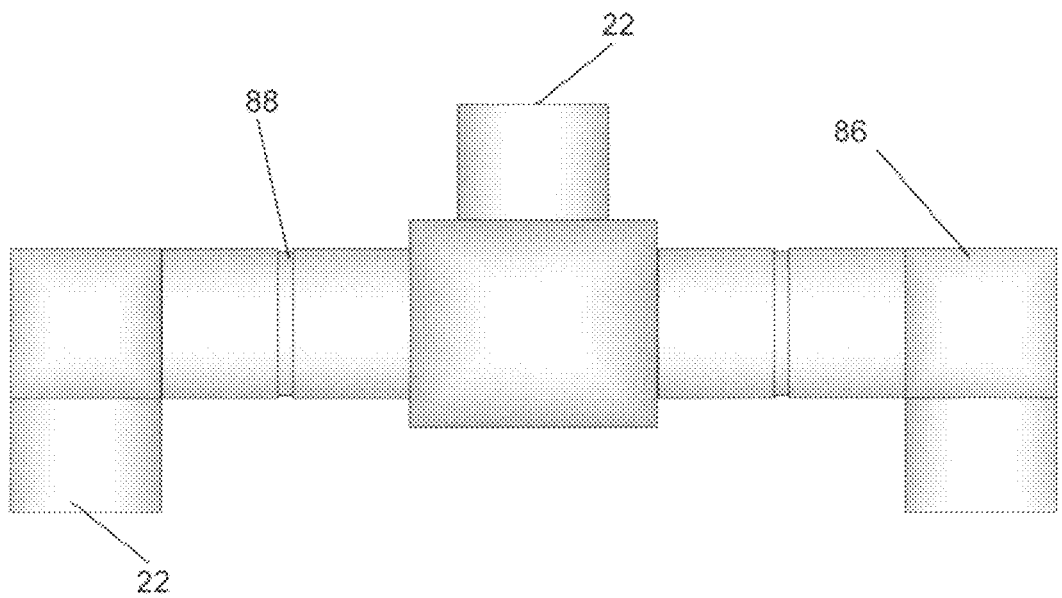
FIG. 51 is a perspective view of a figure illustrating the outside view of an integrated 6" Sun Lite Reflective Tube System line with the Splitter "T" Reflector Box System (STRBS) and Large Reflector Elbow Box, to be constructed in accordance with the present invention.

FIG. 51 is a perspective view of a figure illustrating the outside view of an integrated 6" Sun Lite Reflective Tube System (88) line with the Splitter "T" Reflector Box System (STRBS) and Large Reflector Elbow Box (86), to be constructed in accordance with the present invention. The STRBS is the main luminance connection line that incorporates PVC line and Large Reflector Elbow Box (86). This is an integrated line that shows the configurations of how the sun lite is projected through the 6" PVC Pipe With Female Openings (22).

Figure 52:
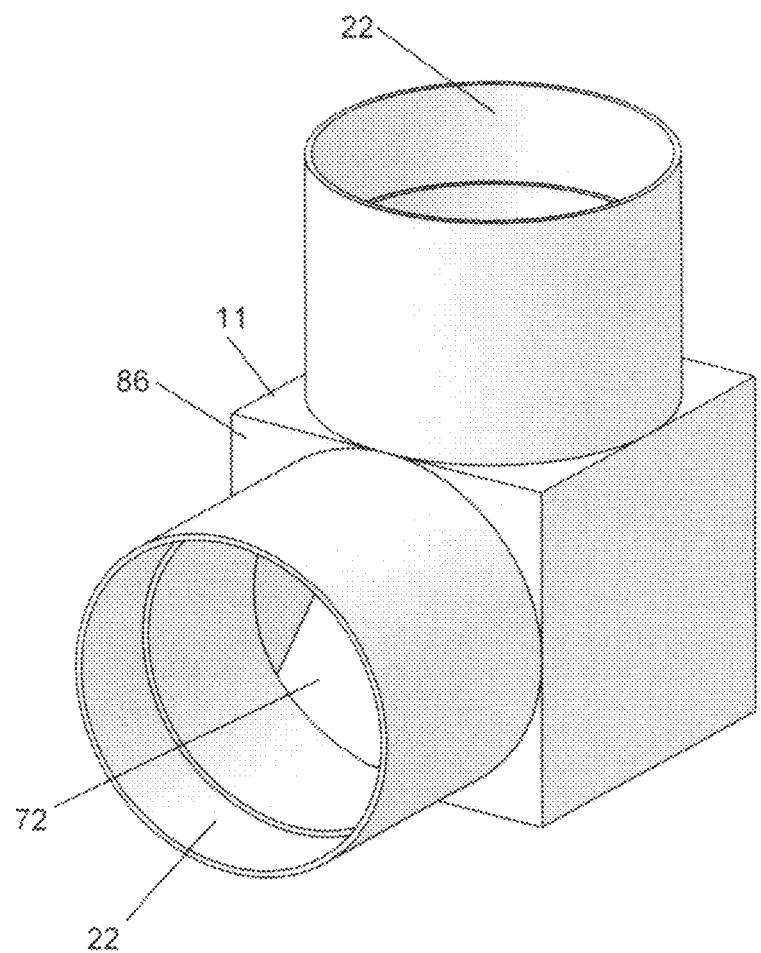
FIG. 52 is an angle perspective view illustrating the Sun Luminance Reflector Large Elbow Box System (SLR-LEBS), inside view, to be constructed in accordance with the present invention.

FIG. 52 is an angle perspective view illustrating the Sun Luminance Reflector Large Elbow Box System (SLRLEBS) (11), inside view, to be constructed in accordance with the present invention. The SLRLEBS System is used in the external component to support the luminance projection from the Sun Lite Luminance Collector System (SLCS). The SLRLEBS System contains two 6" Plastic Tube with Female Openings (22), and one Reflective Glass Mirror (72) within the Large Reflector Elbow Box (86).

Figure 53:
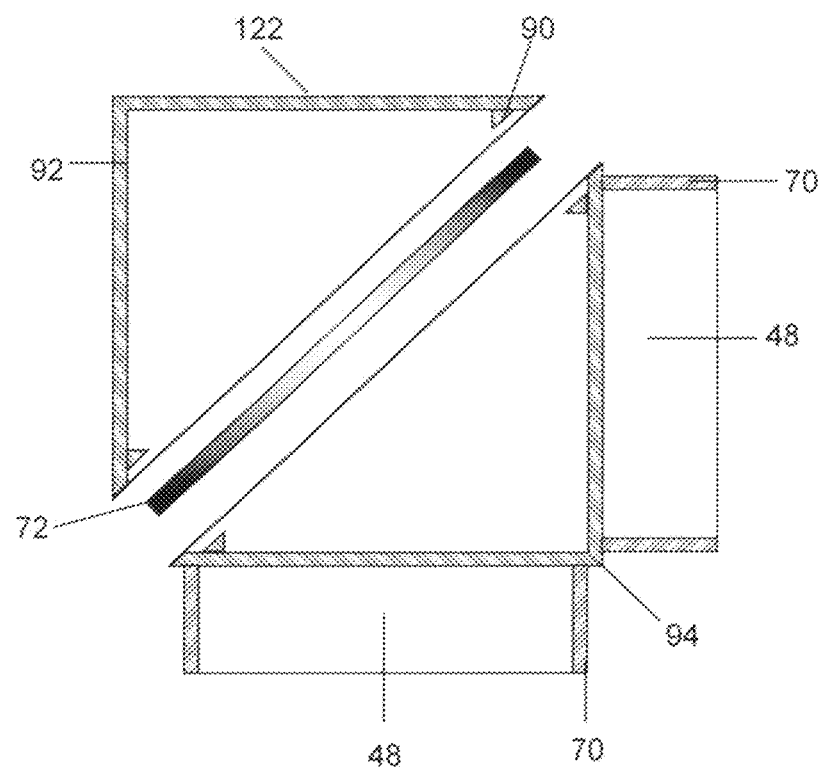
FIG. 53 is a side exploded perspective view illustrating the Sun Luminance Reflector Elbow Box System (SLREBS), inside view, to be constructed in accordance with the present invention.

FIG. 53 is a side exploded perspective view illustrating the Sun Luminance Reflector Elbow Box System (SLREBS) (122), inside view, to be constructed in accordance with the present invention. Each SLREBS System contains an internal Reflettive Glass Mirrors (72) within the 3" Plastic Tube with Female Opening (70) and Internal Reflector Box Secured Lip (90) that is positioned on the Reflector Elbow Box Back Plate (92) and on the Reflector Elbow Face Housing (94) to mate to the internal glass mirror which reflects the sun lite luminance through the Opening (48).

Figure 54:
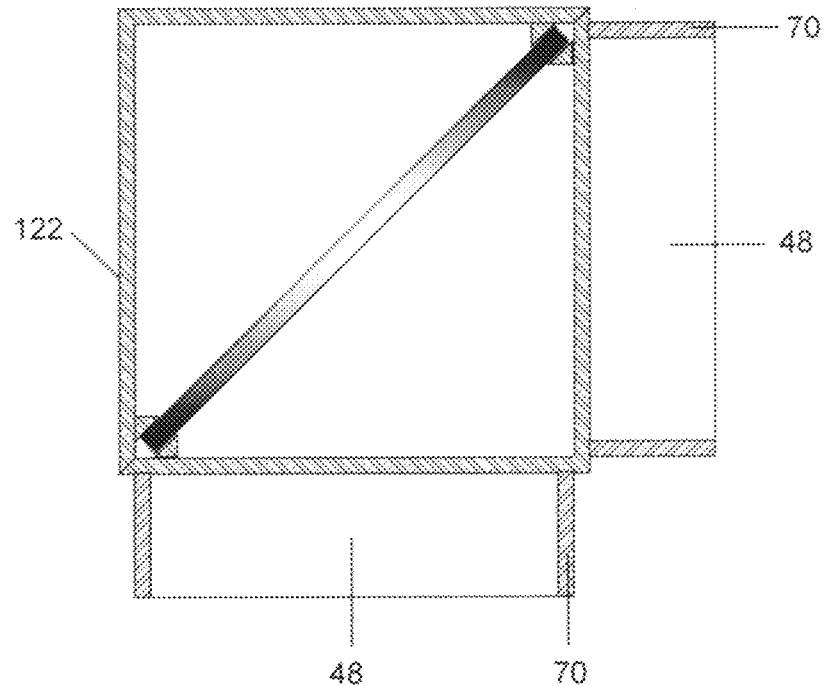
FIG. 54 is a right exploded perspective view illustrating the Sun Luminance Reflector Elbow Box System (SLREBS), inside view, to be constructed in accordance with the present invention.

FIG. 54 is a right exploded perspective view illustrating the Sun Luminance Reflector Elbow Box System (SLREBS) (122), inside view, to be constructed in accordance with the present invention. The small reflective elbow is used in the Sun/Electric Hybrid Lighting System (SEHLS) units and is connected to the 3" Plastic Tube with Female Opening (70) which reflects the sun lite luminance through the Opening (48).

Figure 55:
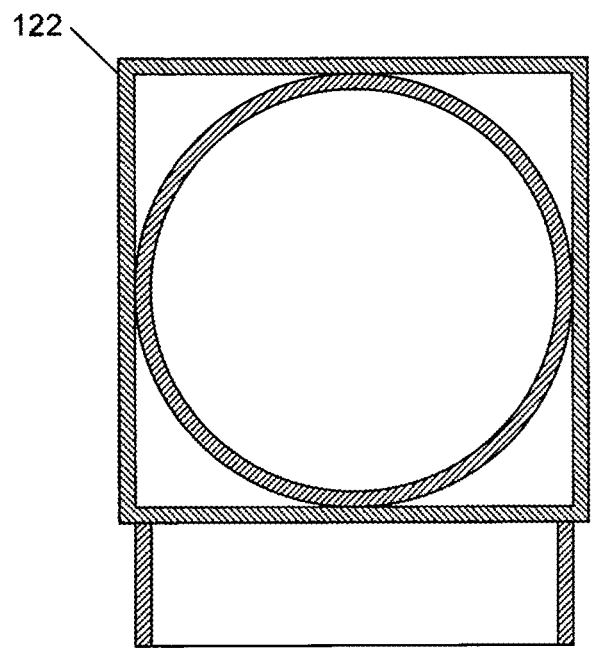
FIG. 55 is a front perspective view of a figure illustrating Sun Luminance Reflector Elbow Box System (SLREBS), to be constructed in accordance with the present invention.

FIG. 55 is a front perspective view of a figure illustrating Sun Luminance Reflector Elbow Box System (SLREBS) (122), to be constructed in accordance with the present invention. Each SLREBS System contains an opening to aid in reflecting the sunlight to the Sun/Electric Hybrid Lighting System (SEHLS) units.

Figure 56:
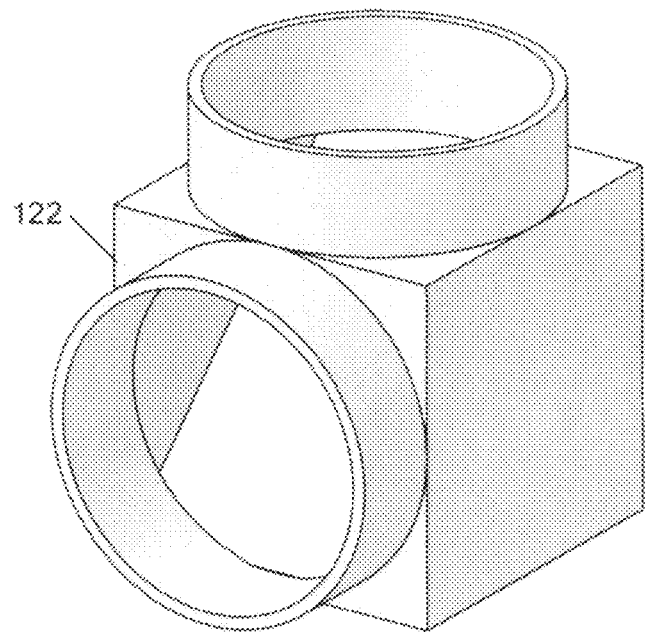
FIG. 56 is a angle perspective view of a figure illustrating Sun Luminance Reflector Elbow Box System (SLREBS), to be constructed in accordance with the present invention.

FIG. 56 is a angle perspective view of a figure illustrating Sun Luminance Reflector Elbow Box System (SLREBS) (122), to be constructed in accordance with the present invention. The SLREBS System after it is constructed will be sealed and able to reflect full natural sunlight without light leakage. The SLRSEBS is used in the external component to support the Sun/Electric Hybrid Lighting System (SEHLS) units.

Figure 57:
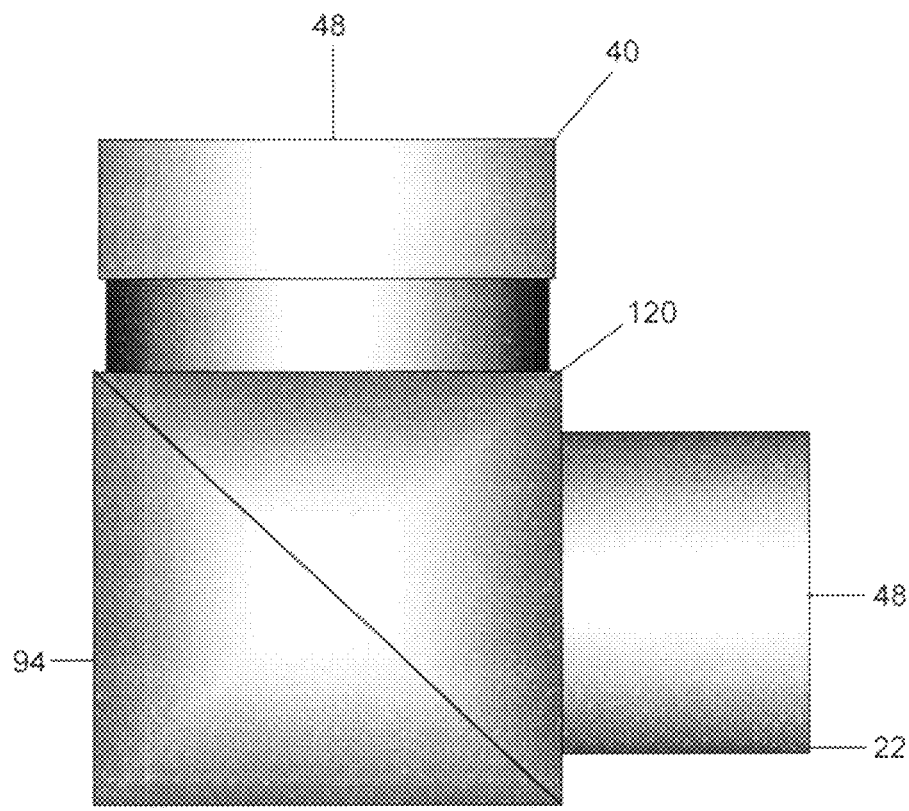
FIG. 57 is a side perspective view illustrating the Sun Luminance Reflector Box System-Oversized (SLRBS-OS), to be constructed in accordance with the present invention.

FIG. 57 is a side perspective view illustrating the Sun Luminance Reflector Box System-Oversized (SLRBS-OS) (120), to be constructed in accordance with the present invention. The SLROSBS has two different connection openings. One connects to 8⅝" PVC line, the other to a 6" PVC line used to support the internal luminance projection of the Sun/Electric Hybrid Lighting System (SEHLS) units. The SLRBS-OS is used to connect the Sun Lite Luminance Collector System-Over Size to the 8⅝" Plastic Tube Female Opening (40), SLRBS-OS box and adapts to the 6" Plastic Tube Female Opening (22) and Reflective Elbow Face Housing (94).

Figure 58:
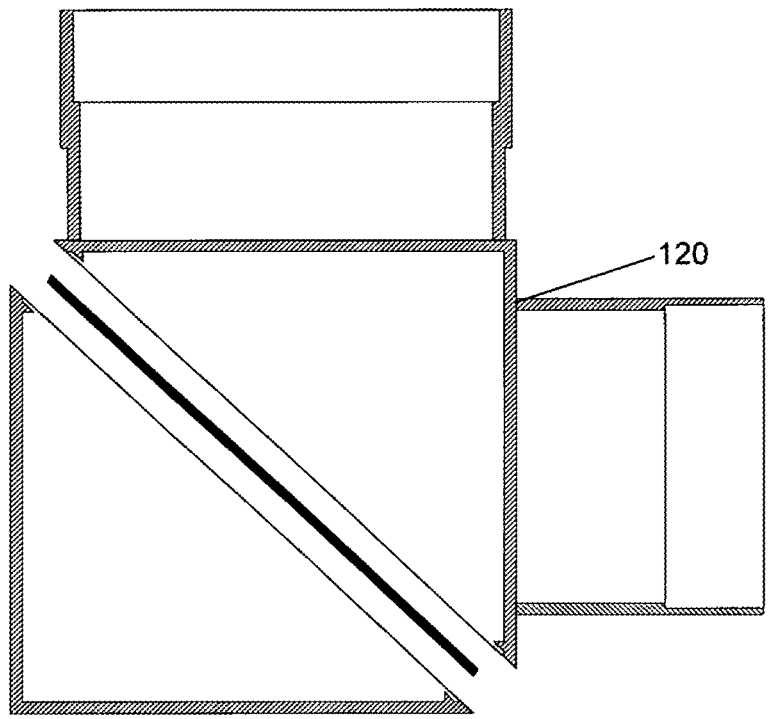
FIG. 58 is a side exploded perspective view illustrating Sun Luminance Reflector Box System-Oversized (SLRBS-OS), to be constructed in accordance with the present invention.

FIG. 58 is a side exploded perspective view illustrating Sun Luminance Reflector Box System-Oversized (SLRBS-OS) (120), to be constructed in accordance with the present invention. The SLRBS-OS contains an internal Reflective Glass Mirror and Internal Reflector Box Secure Lip that is positioned on the Reflector Elbow Box Back Plate and on the Reflector Elbow Face Housing to mate to the internal glass mirror.

Figure 59:
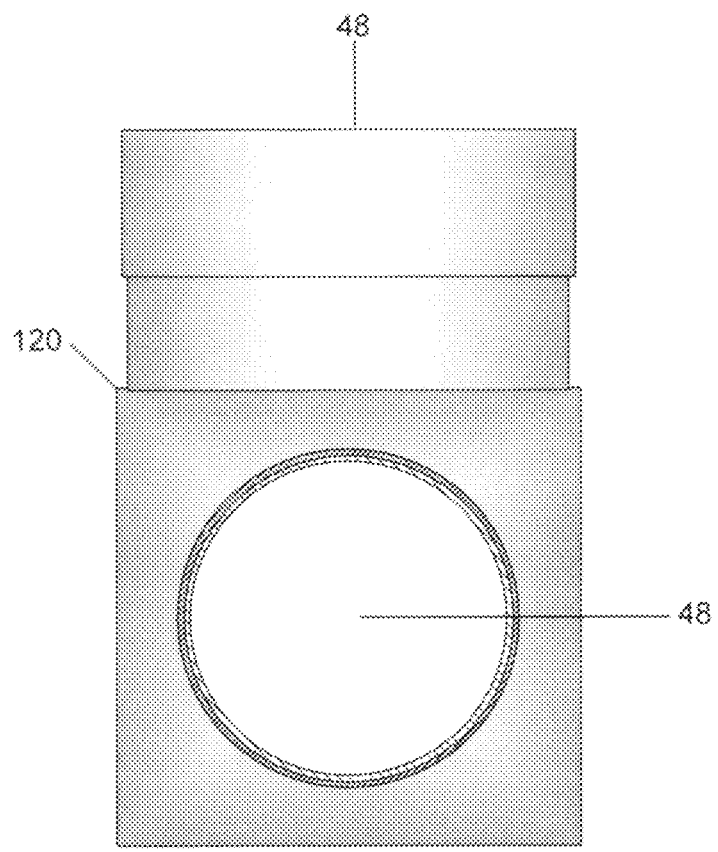
FIG. 59 is a front perspective view illustrating Sun Luminance Reflector Box System-Oversized (SLRBS-OS), constructed in accordance with the present invention.

FIG. 59 is a front perspective view illustrating Sun Luminance Reflector Box System-Oversized (SLRBS-OS) (120), constructed in accordance with the present invention. The oversize female Opening (48) supports the oversize PVC line from The Sun Lite Luminance Collector System-Over Sized (SLCS-OS) unit. The female Opening (48) supports the PVC lines to the internal luminance projection of the Sun/Electric Hybrid Lighting System (SEHLS) units.

Figure 60:
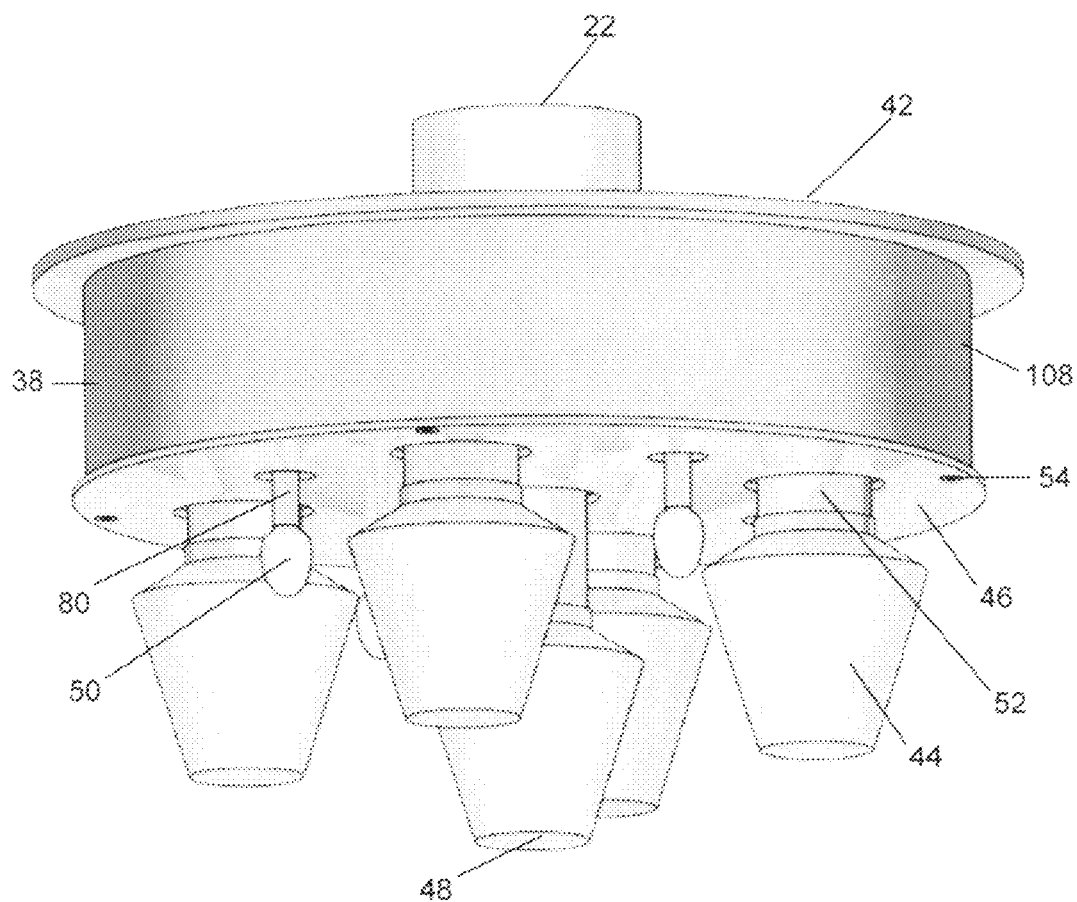
FIG. 60 is an angle perspective view illustrating the Sun Electric Chandelier Lite System (SECLS), to be constructed in accordance with the present invention.

FIG. 60 is an angle perspective view illustrating the Sun Electric Chandelier Lite System (SECLS) (108), to be constructed in accordance with the present invention. The SECLS is a formal lighting system that is used in dinning areas. The SECLS incorporates one 6" Plastic Tube Female Opening (22), one Sun Dual Intake System (SDIS), five sun luminance projection lines, five Funnel Light Covers (44) with Openings (48), four light mounts, four Light-Emitting Diode (LED) (50) systems, four Light Stem and Body (80), four Screw Connections (54), five Adapter Connector (52), and one pale blue tinted light cover and one Cover Light Plate (46). All electrical wiring connected from internal Light Emitting Diode (LED) (50) system is considered Basic Electric Wiring (60) and will be connected through the internal Base Housing Body (38), bundled together and placed on the outer, top side of the Base Housing Body (38) for solder for electrical continuity. The SECLS unit is fixed to the ceiling through the Secure Mounting Lip (42).

Figure 61:
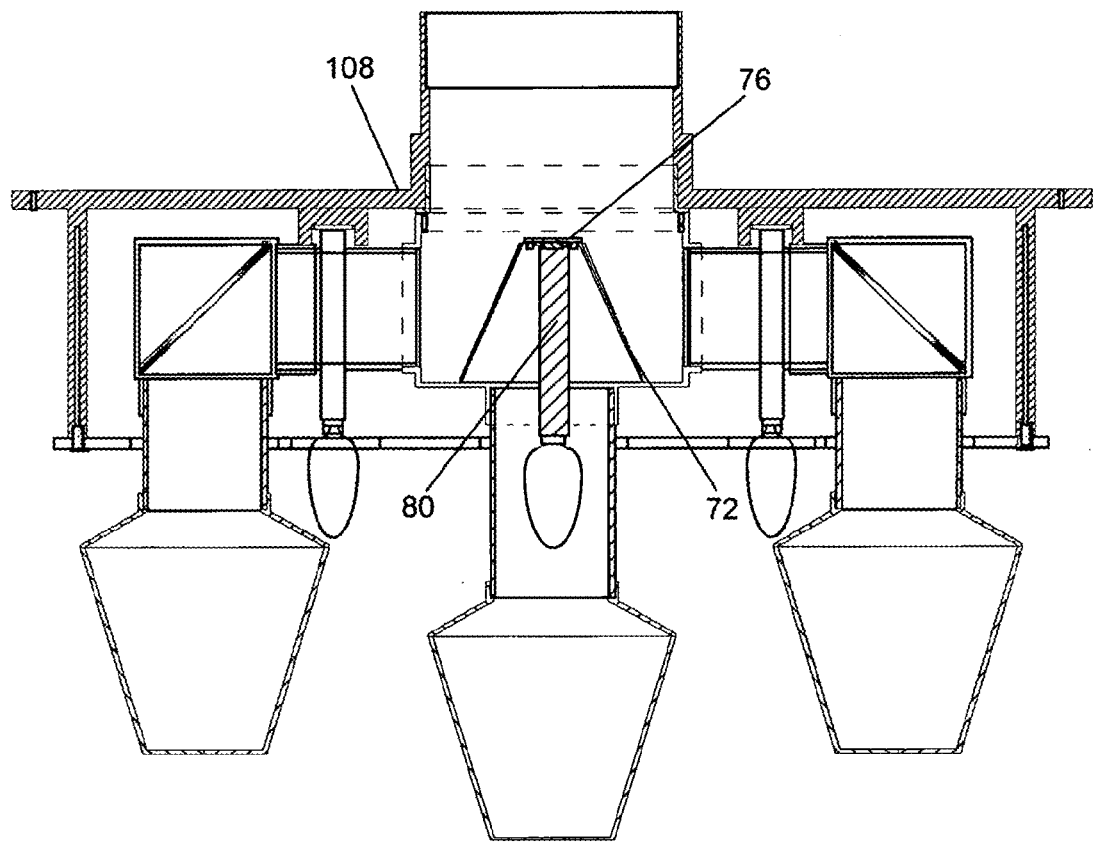
FIG. 61 is a side perspective view illustrating the Sun Electric Chandelier Lite System (SECLS) inside view, to be constructed in accordance with the present invention.

FIG. 61 is a side perspective view illustrating the Sun Electric Chandelier Lite System (SECLS) (108) inside view, to be constructed in accordance with the present invention. The SECLS is equipped with a Sun Dual Intake System that projects sunlight through a Small Reflector Elbow Box. The SECLS SDIS Intake Light Mount (76), is used to connect the Light Stem and Body (80). and also through the open hole. The Plastic Intake Mount system is incorporated with angle Reflective Glass Mirrors (72) at the bottom, and adhered to the Plastic Intake Mount system to reflect the luminance of the sun through the center opening.

Figure 62:
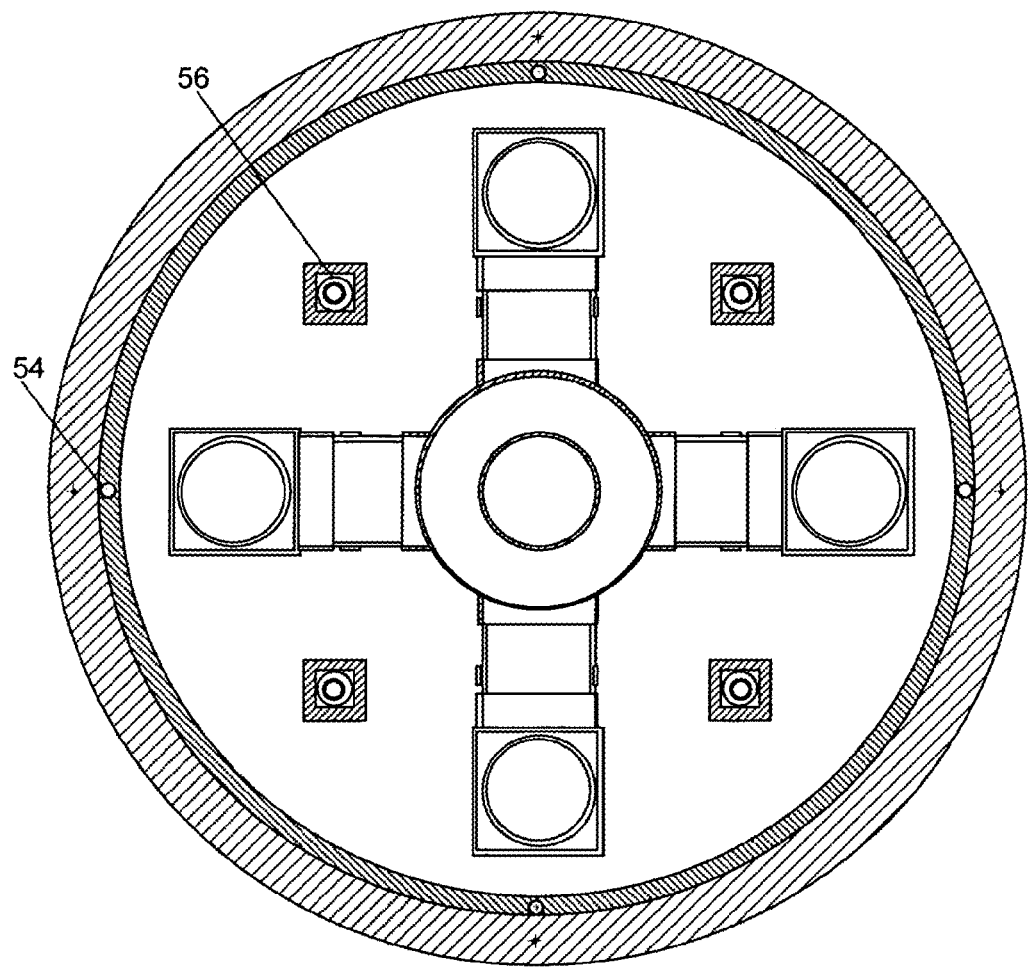
FIG. 62 is a bottom up perspective view illustrating Sun Electric Chandelier Lite System (SECLS), to be constructed in accordance with the present invention.

FIG. 62 is a bottom up perspective view illustrating Sun Electric Chandelier Lite System (SECLS), to be constructed in accordance with the present invention. The SECLS unit and base housing body are of heat resistant, durable plastic and has four Screw Connections (54) along with four Light Attachment Mounts (56).

Figure 63:
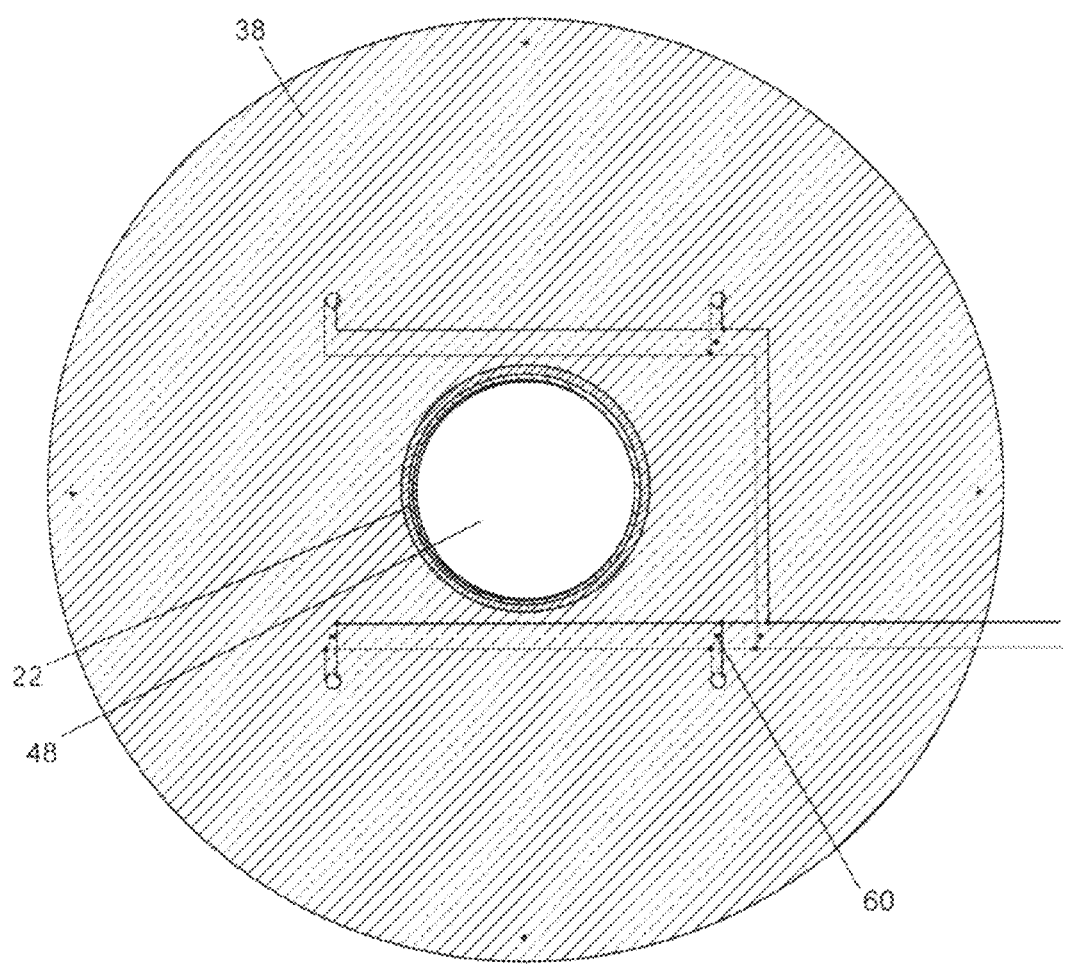
FIG. 63 is a top perspective view of the Sun Electric Chandelier Lite System (SECLS), Basic Electrical Wiring diagram.

FIG. 63 is a top perspective view of the Sun Electric Chandelier Lite System (SECLS), Basic Electrical Wiring (60) diagram. The SECLS Base Housing Body (38) is heat resistant Opening (48), and has one 6" Plastic Tube with Female Opening (22).

Figure 64:
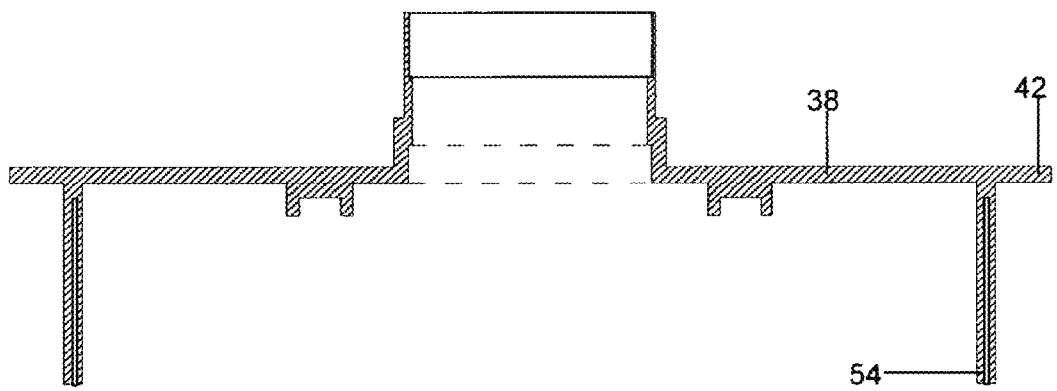
FIG. 64 is a side perspective view illustrating the Sun Electric Chandelier Lite System (SECLS) housing, to be constructed in accordance with the present invention.

FIG. 64 is a side perspective view illustrating the Sun Electric Chandelier Lite System (SECLS) housing, to be constructed in accordance with the present invention. The SECLS Base Housing Body (38) is able to with stand heat from the Light-Emitting Diode (LED) system and will not cause damage or melt. The SECLS Secure Mounting Lip (42) is used to fasten to the ceiling. It has four Screw Connections (54) to attach the light cover plate.

Figure 65:
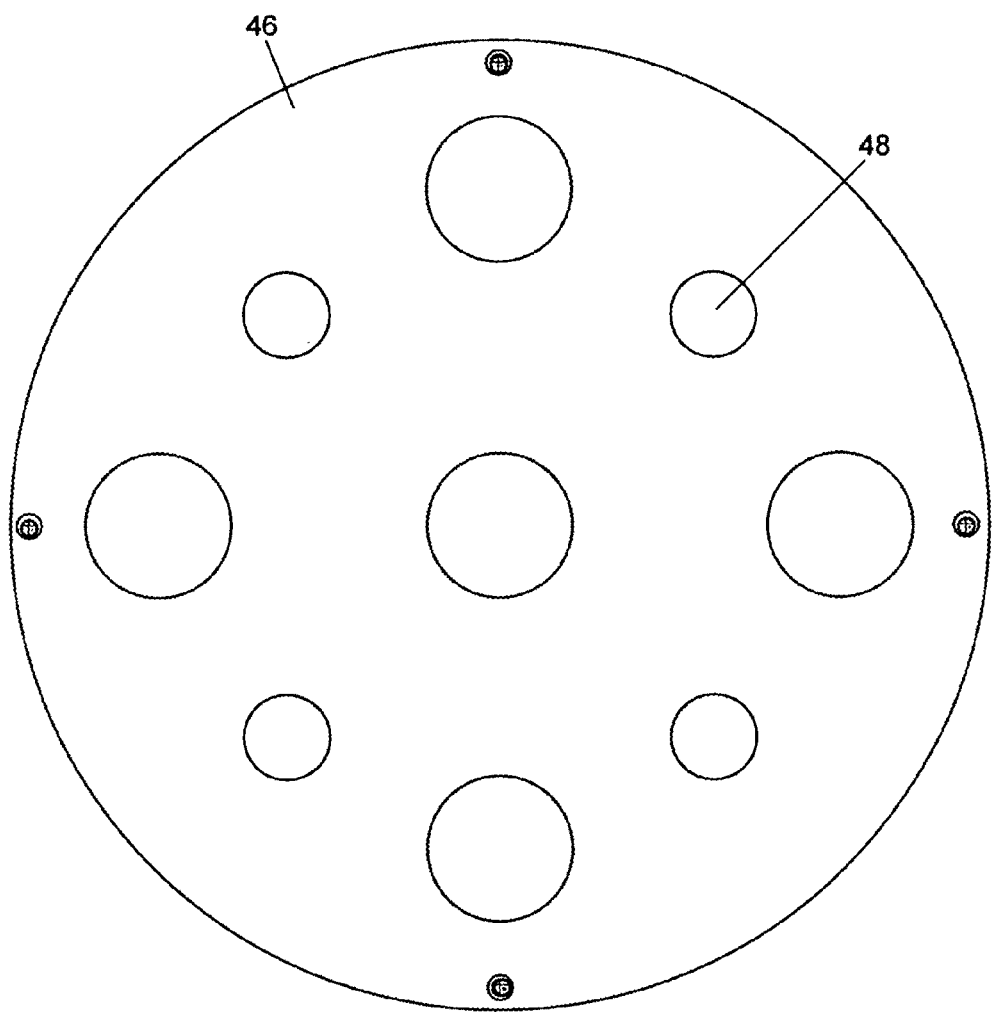
FIG. 65 is a bottom up perspective view illustrating the Sun Electric Chandelier Lite System (SECLS) light plate, to be constructed in accordance with the present invention.

FIG. 65 is a bottom up perspective view illustrating the Sun Electric Chandelier Lite System (SECLS) (108) light plate, to be constructed in accordance with the present invention. The SECLS Cover light plate (46) is heat resistant and made from durable plastic with nine Openings (48).

Figure 66:
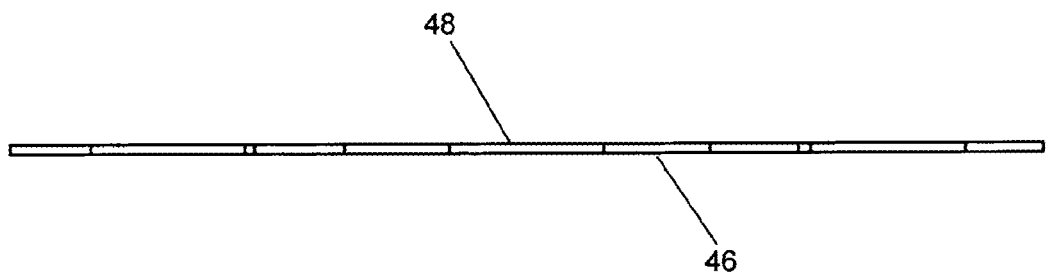
FIG. 66 is a side perspective view illustrating the Sun Electric Chandelier Lite System (SECLS) light plate, to be constructed in accordance with the present invention.

FIG. 66 is a side perspective view illustrating the Sun Electric Chandelier Lite System (SECLS) (108) light plate, to be constructed in accordance with the present invention. The SECLS Cover light plate (46) is heat resistant and made from durable plastic with a 6" Opening (48) and tinted light blue.

Figure 67:
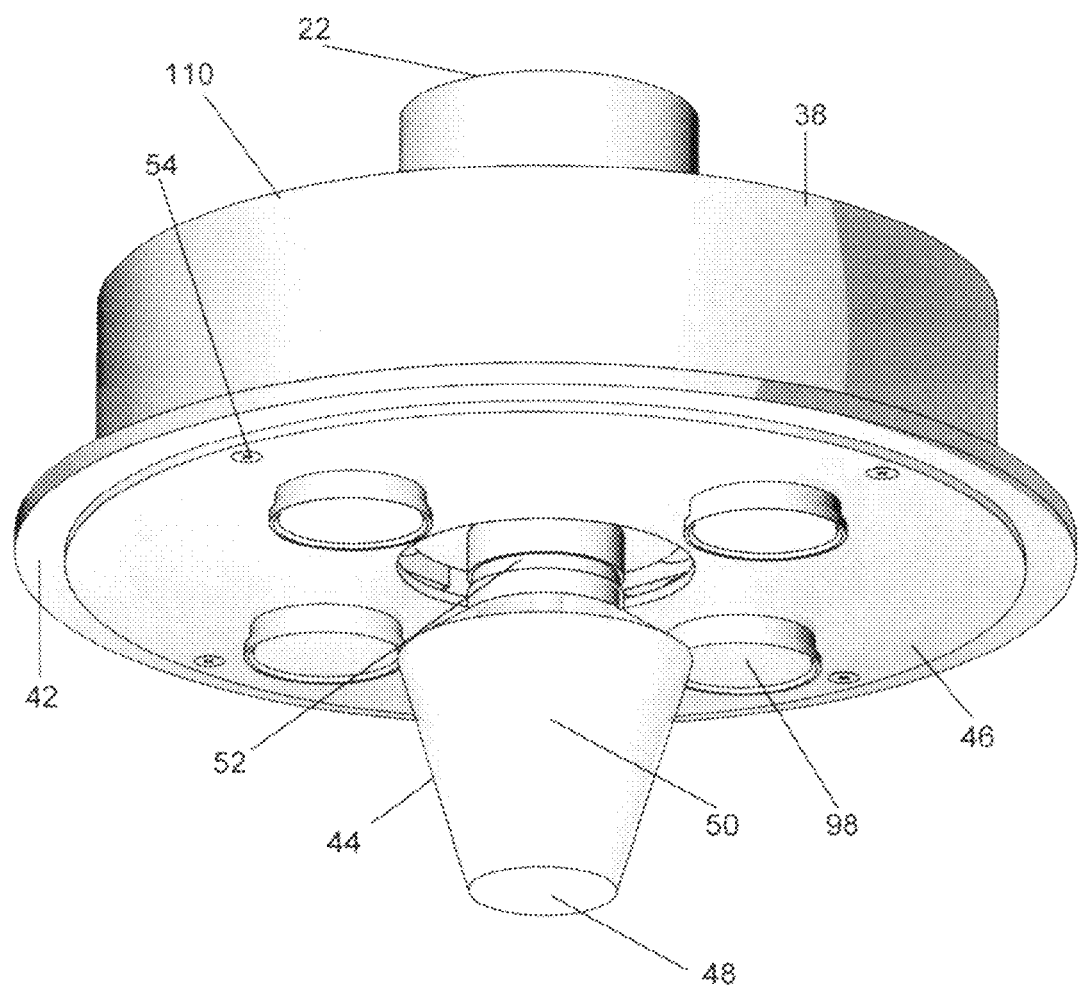
FIG. 67 is an angle perspective view illustrating the Sun Electric Luminance Lite System (SELLS), inside view, to be constructed in accordance with the present invention.

FIG. 67 is an angle perspective view illustrating the Sun Electric Luminance Lite System (SELLS) (110), inside view, to be constructed in accordance with the present invention. The SELLS is a dual usage system that is placed in confined spaces such as hallways and alcove areas. The SELLS incorporates one Sun Dual Intake System (SDIS), four sun luminance projection lines, one Cover Light Plate (46), four light blue tinted Cover Lens Cap (98), one Adapter connector (52), four Screw connections (54), one Funnel Light Cover (44), one 6" Plastic Tube Female Opening (22), one internal intake light mount, one Light-Emitting Diode (LED) (50) systems, basic electrical wiring and will be connected through the internal base housing body (38), bundled together and placed on the outer top side of the base housing body (38) for solder for electrical continuity usage. The SELLS has one main Opening (48), and the SELLS unit is fixed to the ceiling through the Secure Mounting Lip (42).

Figure 68:
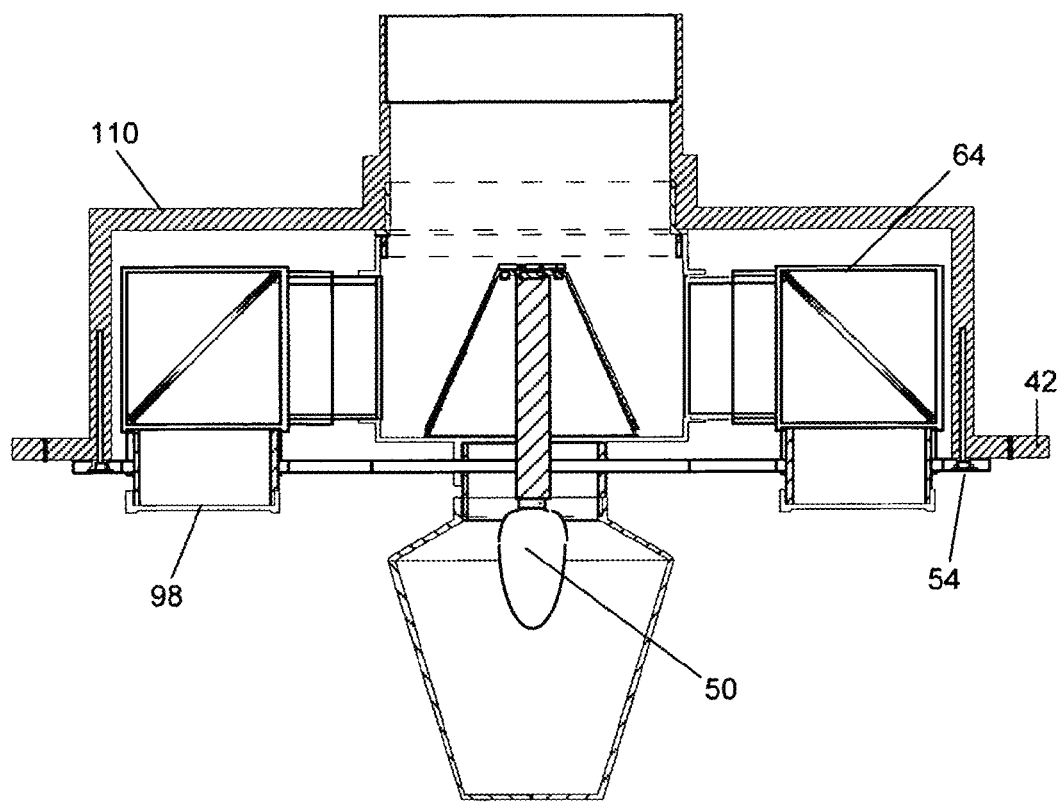
FIG. 68 is a side perspective view illustrating the Sun Electric Luminance Lite System (SELLS), be constructed in accordance with the present invention.

FIG. 68 is a side perspective view illustrating the Sun Electric Luminance Lite System (SELLS) (110), be constructed in accordance with the present invention. The SELLS unit has a main line connector that is a PVC tube, one Light-Emitting Diode (LED) (50) systems, four Small Reflector Elbow Box (64), Secure Mounting Lip (42), four pre-drilled structural mounting holes and metal structural mounting screws, four Screw Connections (54), to secure the light cover that protects the internal components of the SELLS unit. The SELLS is also equipped with a bypass funnel through the open hole. The SELLS unit has four Cover Lens Caps (98) that allows the sun luminance to project through.

Figure 69:
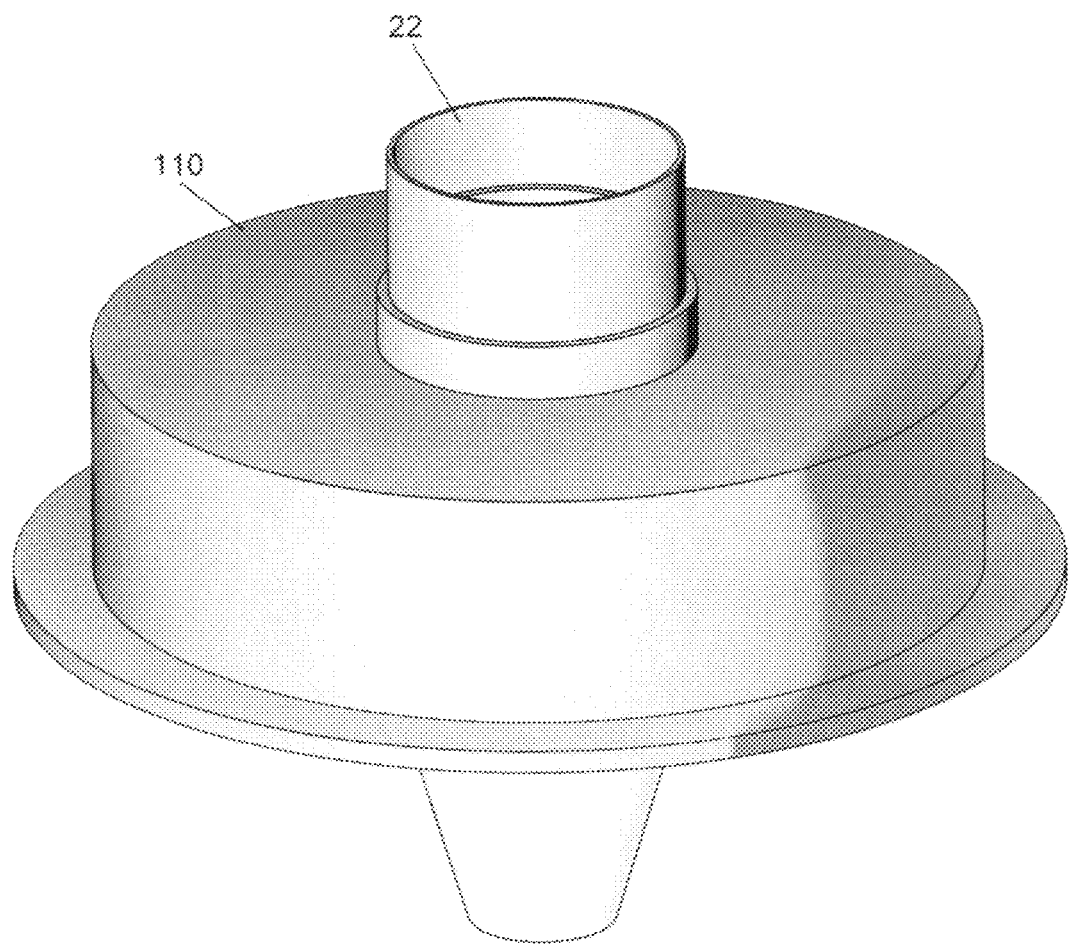
FIG. 69 is a top angle perspective view illustrating the Sun Electric Luminance System Lite System (SELLS) housing, to be constructed in accordance with the present invention.

FIG. 69 is a top angle perspective view illustrating the Sun Electric Luminance System Lite System (SELLS) (110) housing, to be constructed in accordance with the present invention. The SELLS system housing, top view, shows the plastic tube female opening to support the main tube connection with a 6" Plastic Tube with Female Opening (22).

Figure 70:
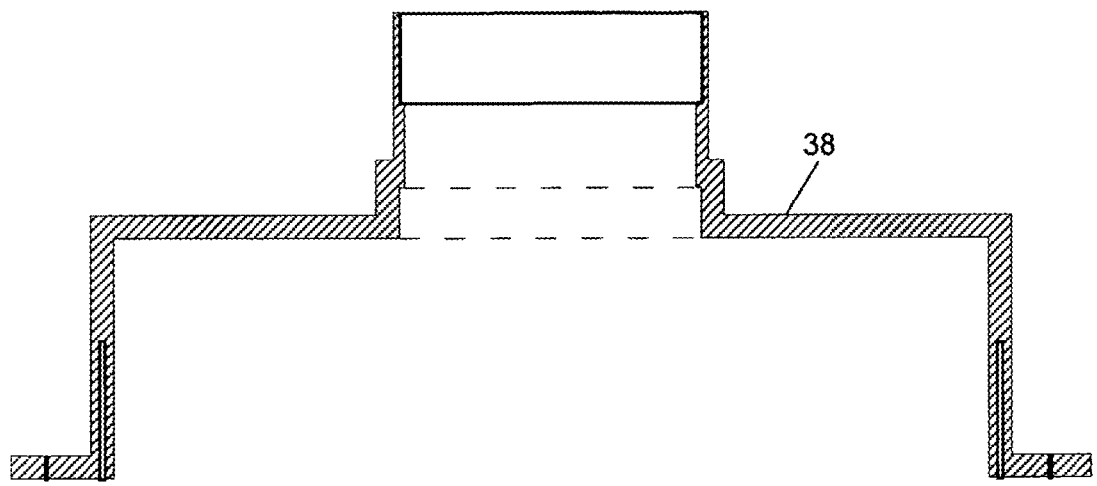
FIG. 70 is a side perspective view illustrating The Sun Electric Luminance System Lite System (SELLS) housing, to be constructed in accordance with the present invention.
Figure 71:
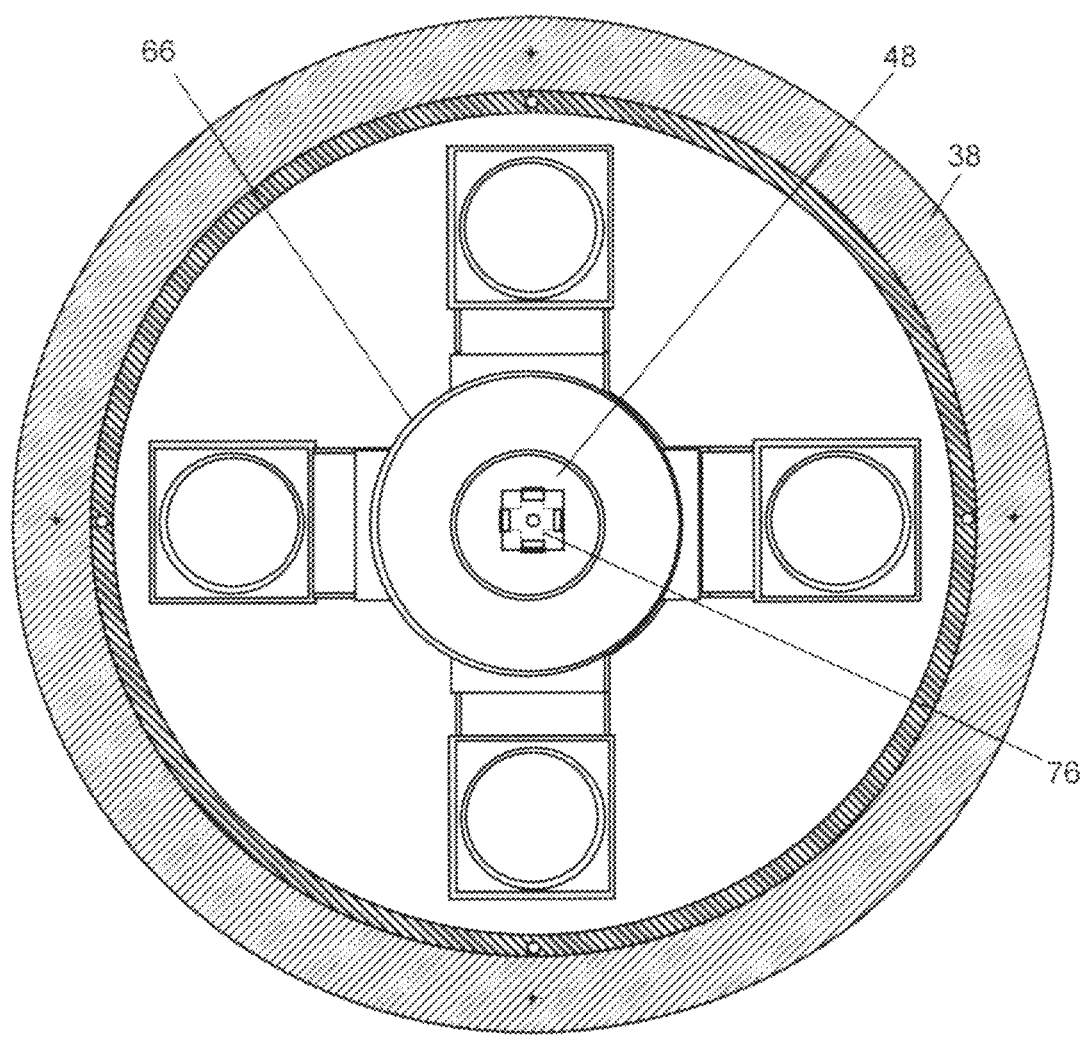
FIG. 71 is a bottom up perspective view illustrating The Sun Electric Luminance System Lite System (SELLS) housing, to be constructed in accordance with the present invention.

FIG. 70 is a side perspective view illustrating The Sun Electric Luminance System Lite System (SELLS) housing, to be constructed in accordance with the present invention. The SELLS Base Housing Body (38) is able to with stand heat from the Light-Emitting Diode (LED) system and will not cause damage or melt FIG. 71 is a bottom up perspective view illustrating The Sun Electric Luminance System Lite System (SELLS) housing, to be constructed in accordance with the present invention. The SELLS Base Housing Body (38) is able to with stand heat from the Light-Emitting Diode (LED) system and will not cause damage or melt. The SELLS has a single Dual Intake Body (66), that is used to connect the SDIS Intake Light Mount (76) through the center Opening (48).

Figure 72:
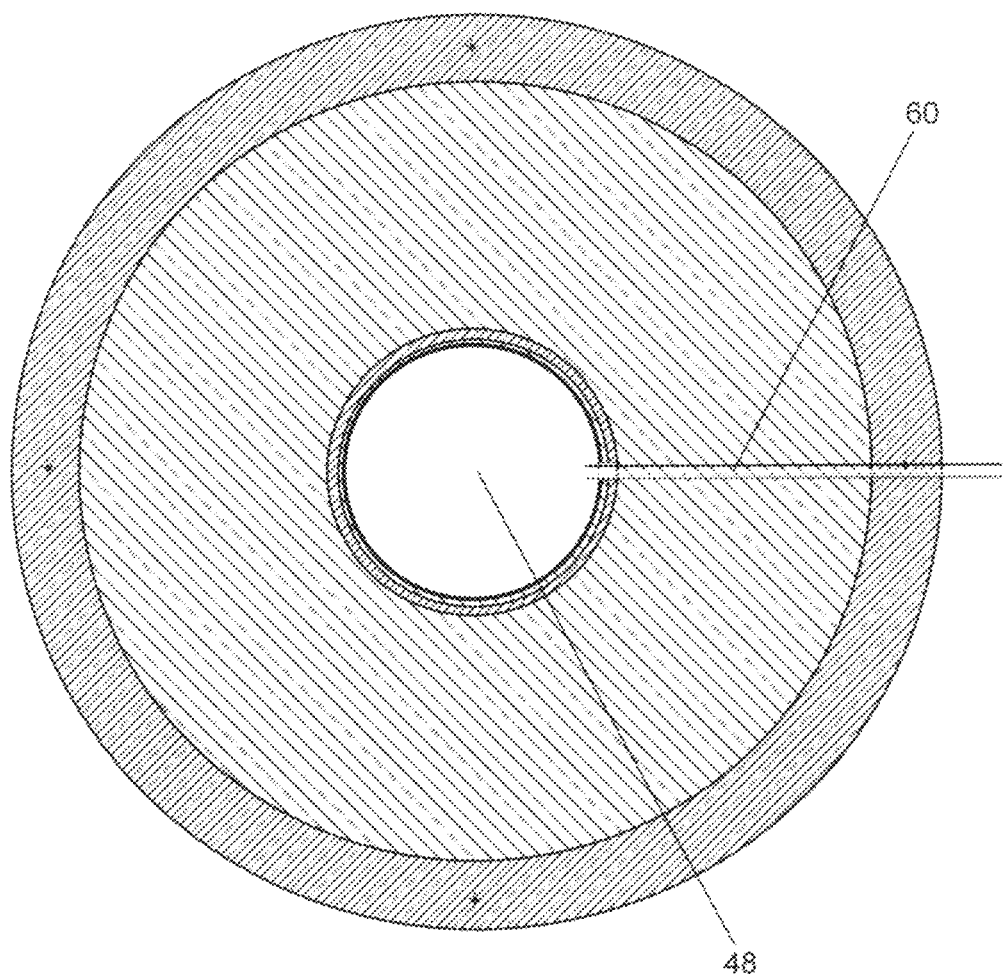
FIG. 72 is a top perspective view of the Sun Electric Luminance System Lite System (SELLS) Basic Electrical Wiring diagram.

FIG. 72 is a top perspective view of the Sun Electric Luminance System Lite System (SELLS) Basic Electrical Wiring (60) diagram. The SELLS will have basic, standard wiring and will be connected through the center Opening (48).

Figure 73:
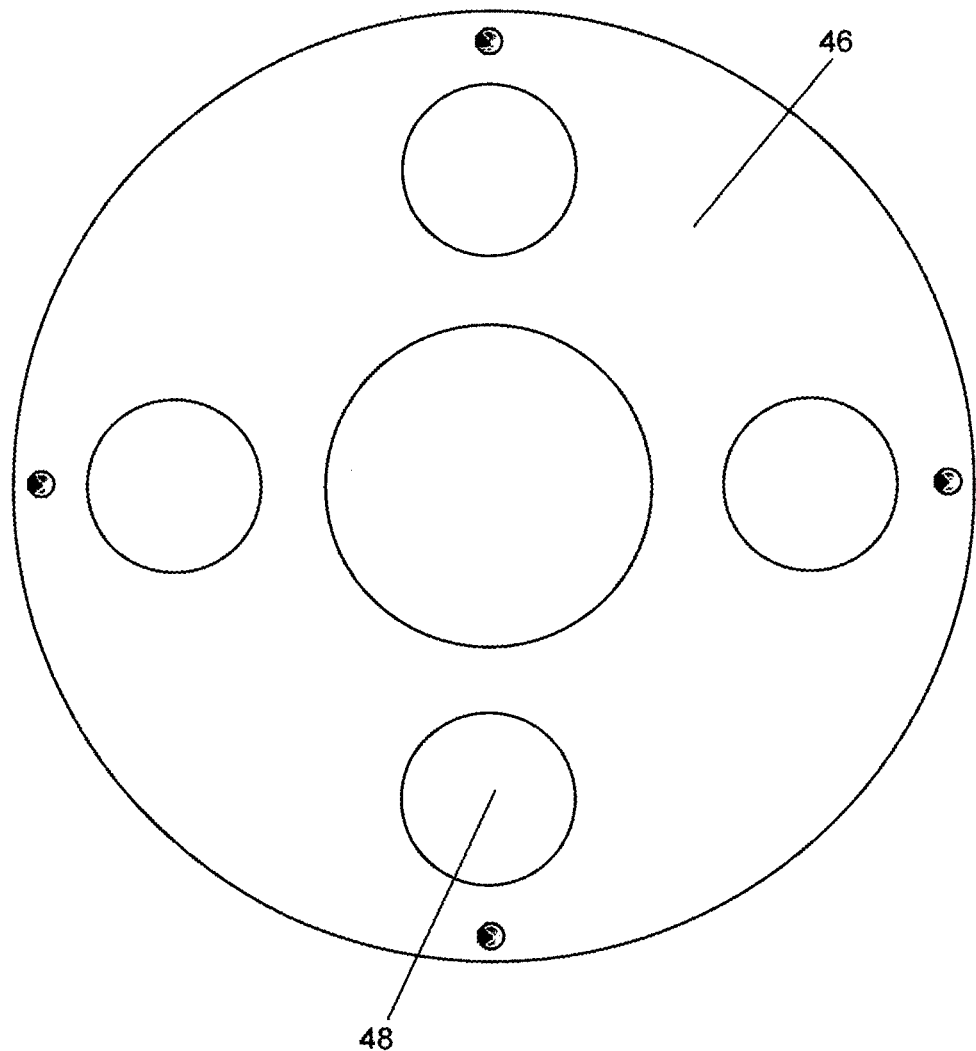
FIG. 73 is a bottom up perspective view illustrating the Sun Electric Luminance System Lite System (SELLS) cover plate, to be constructed in accordance with the present invention.

FIG. 73 is a bottom up perspective view illustrating the Sun Electric Luminance System Lite System (SELLS) cover plate, to be constructed in accordance with the present invention. The SELLS Cover light plate (46) is heat resistant, and made from durable plastic and will have five Openings (48).

Figure 74:
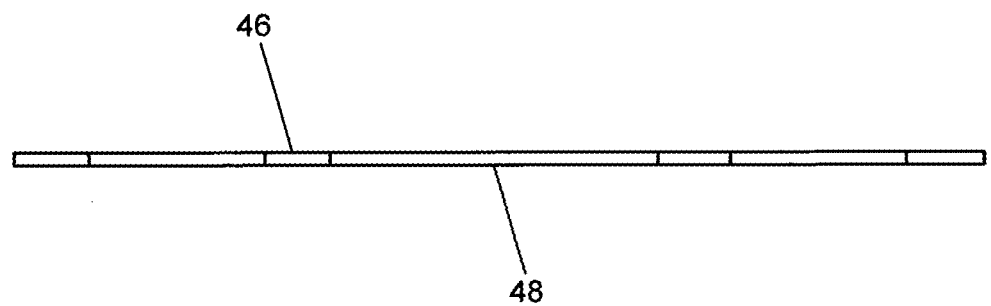
FIG. 74 is a side perspective view illustrating the Sun Electric Luminance System Lite System (SELLS) cover plate, to be constructed in accordance with the present invention.

FIG. 74 is a side perspective view illustrating the Sun Electric Luminance System Lite System (SELLS) cover plate, to be constructed in accordance with the present invention. The SELLS Cover light plate (46) is heat resistant, and made from durable plastic and contains five Openings (48).

Figure 75:
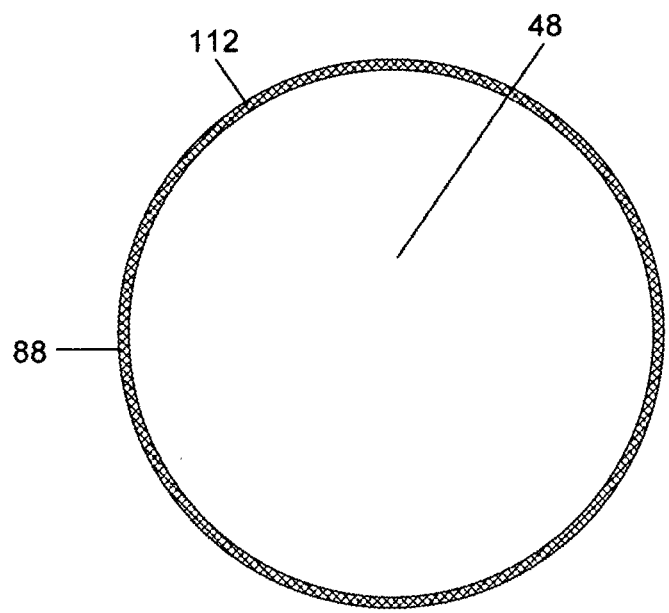
FIG. 75 is a top perspective view illustrating 6" (6⅝") PVC tube (commercial off the shelf) item, constructed in accordance with the present invention.

FIG. 75 is a top perspective view illustrating 6" (6⅝") PVC tube (commercial off the shelf) item, constructed in accordance with the present invention. The PVC tube is called the Sun Lite Luminance Reflective Tube System (SLRTS) (112), and is a commercial off the shelf item that is treated internally with glass reflective paint to aid in providing better sun luminance capability. The SLRTS, after it is internally coated with glass paint will be considered as a component of the 6" Sun Lite Reflective Tube System (88) and will have a reflective center Opening (48).

Figure 76:
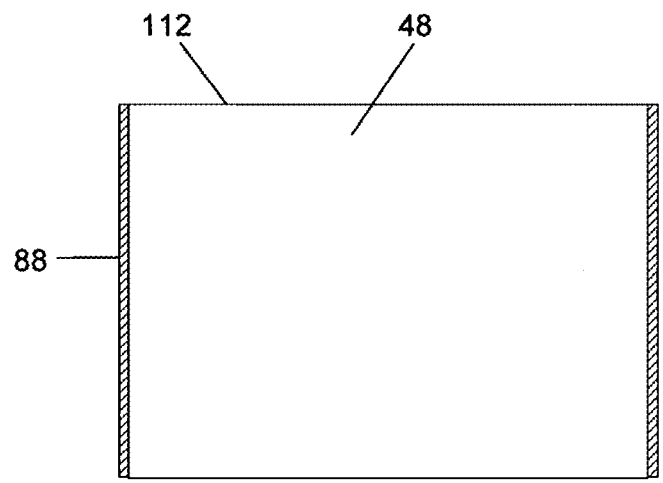
FIG. 76 is a side perspective view of the Sun Lite Luminance Reflective Tube System (SLRTS) illustrating the 6" Sun Lite Reflective tube System (commercial off the shelf) item constructed in accordance with the present invention.

FIG. 76 is a side perspective view of the Sun Lite Luminance Reflective Tube System (SLRTS) (112) illustrating the 6" Sun Lite Reflective tube System (88) (commercial off the shelf) item constructed in accordance with the present invention. The specially treated PVC tube is black to improve the ability of the glass reflective paint. It will adhere to and eliminate any possibility of light leakage through the Opening (48).

Figure 77:
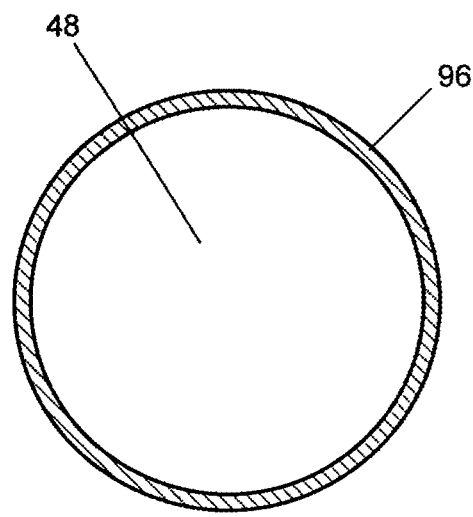
FIG. 77 is a top perspective view illustrating the 3" PVC tube (commercial off the shelf) item constructed in accordance with the present invention.

FIG. 77 is a top perspective view illustrating the 3" PVC tube (96) (commercial off the shelf) item constructed in accordance with the present invention. The PVC tube is internally treated with glass reflective paint to aid in providing better sun luminance capability and will have a reflective center Opening (48).

Figure 78:
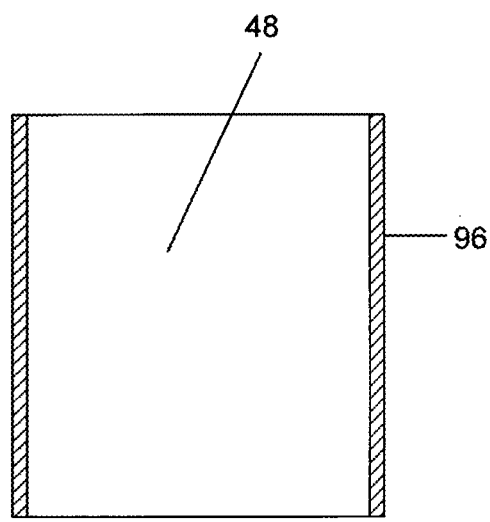
FIG. 78 is a side perspective view illustrating 3" PVC tube (commercial off the shelf) item constructed in accordance with the present invention.

FIG. 78 is a side perspective view illustrating 3" PVC tube (96) (commercial off the shelf) item constructed in accordance with the present invention. The specially treated PVC tube is black to increase the ability for the glass reflective paint (104) will adhere to, and will eliminate any possibility of light leakage through the Opening (48).

FIG. 79 is a perspective view illustrating the Cover Lens Cap (98) constructed in accordance with the present invention. The SELLS unit is the only unit that contains Cover Lens Caps (98) that allows the sun luminance to project through.

FIG. 80 is a perspective view illustrating the Tube Bridge (100) constructed in accordance with the present invention. The tube bridge (100) is designed to provide stability for long-sized 3" sun Lite Reflective Tube System (96) tubes. The mount bridge is glued and secured to the under face of the SEHLS housing units.

Since other modifications and changes varied to fit particular operating requirements and environments, it will be apparent to those skilled in the art, the invention is not considered limited to the example chosen for purposes of disclosure, and covers all changes and modifications which do not constitute departures from the true spirit and scope of this invention. Having thus described the invention, what is desired to be protected by Patent Letters is presented in the subsequently appended claims.

CALL OUT INDEX

10 Collector Cover Dome
11 Sun Luminance Reflector Large Elbow Box System (SLRLEBS) Component
12 Base Mount Cross Bridge Plate
14 Collector Mating Band
16 Front Side Frame Mounting Screws
18 Housing Mounting Grooves
20 Metal Extension Arms
22 6" Plastic Tube with female opening
24 "V" Collector Funnel Body
26 Metal Structural Mounting Screws
28 SLCS Connectors
32 Mounting Bolts
36 Mounting Bracket Band System 38 Base Housing Body
40 8⅝" Plastic Tube—Female Openings
42 Secure Mounting Lip
44 Funnel Light Cover
46 Cover Light Plate
48 Opening
50 Light Emitting Diode (LED) Component
52 Adapter Connector
54 Screw Connections
56 Light Attachment Mounts
58 Internal Bypass Funnel
60 Basic Electrical Wiring
62 SEFLS Fluorescent Light Cover
64 Small Reflector Box Component
66 Dual Intake Body
68 Top Intake Cover Ring
70 3" Plastic Tube, female opening
72 Reflective Glass Mirrors
74 Sun Dual Intake System Intake Mirror Mount
76 SDIS Intake Light Mount
78 Intake Light Mount Lip
82 "I" Mirror Mount Stem
80 Light Stem and Body Component
84 Side Cover Plate
86 Large Reflector Elbow Box Component
88 6" Sun Lite Reflective Tube System
90 Internal Reflector Box Secure Lip
92 Reflector Elbow Box Back Plate
94 Reflector Elbow Face Housing
96 3" Sun Lite Reflective Tube System
98 Cover Lens cap
100 Tube Bridge
102 Sun Lite Luminance Collector System (SLCS) Unit
104 Sun Electric Reflective Lite System (SERLS) Unit
106 Sun Electric Fluorescent Lite System (SEFLS) Unit
108 Sun Electric Chandelier Lite System (SECLS) Unit
110 Sun Electric Luminance Lite System (SELLS) Unit
112 Sun Lite Luminance Reflective Tube System (SLRTS) Component
116 Splitter "T" Reflector Box System (STRBS) Component
118 Sun Lite Luminance Collector System-Over Sized Unit
120 Sun Luminance Reflector Box System-Over Size (SLRBS-OS) Component
122 Sun Luminance Reflector Elbow Box System (SLREBS) Component
124 Sun Dual Intake System (SDIS) Component

What is claimed is:

1. A Sun/Electric Hybrid Lighting System (SEHLS) providing sun driven and low energy light driven luminance, the SEHLS comprising:
    a housing body comprising:
        (i) sidewalls spanning a height and encasing a volume with a first diameter;
        (ii) a first opening located on a top side of the housing body with a second diameter smaller than the first diameter;
        (iii) a second opening exposing a bottom side of the housing body with a diameter about equal to the first diameter;
        (iv) at least one light emitting diode (LED) mounted inside the housing body about the top side of the housing body between the first opening and the sidewalls, said at least one LED directed downwards towards said second opening;
    a cover light plate comprising a transparent circular plastic disc with at least one aperture mounted to the bottom side of the housing body, the cover light plate providing protection for internal components within the housing body;
    a bypass funnel inset and suspended within the housing body, the bypass funnel comprising a narrowing tubular extension extending the height of the sidewalls from the first opening of the housing body through the at least one aperture of the cover light plate, wherein the bypass funnel collects sun rays from atop the SEHLS and funnels the sun rays through the at least one aperture of the cover light plate to project sun light;
    a funnel light cover connected to an end of the tubular extension of the bypass funnel passing through the at least one aperture of the cover light plate, the funnel cover comprising a conical transparent volume, wherein the conical transparent volume of the funnel cover condenses the sun rays collected by the bypass funnel into one stream;
    an adapter connector used to connect said bypass funnel and said funnel light cover together.

2. The Sun/Electric Hybrid Lighting System (SEHLS) of claim 1 further comprising a plexiglas collector cover dome mounted to the bypass funnel at the first opening located on the top side of the housing body.

3. The Sun/Electric Hybrid Lighting System (SEHLS) of claim 2 further comprising a metal band securing the collector cover dome to the bypass funnel.

4. The Sun/Electric Hybrid Lighting System (SEHLS) of claim 1, wherein the narrowing tubular extension of the bypass funnel is a durable plastic "V" collector funnel body.

5. The Sun/Electric Hybrid Lighting System (SEHLS) of claim 1, wherein the sidewalls of the housing body are made of a durable plastic.

6. The Sun/Electric Hybrid Lighting System (SEHLS) of claim 1 further comprising a ring base extending out from and around the housing body with a durable plastic secure mounting lip, the ring base used to secure the housing body to a ceiling.

7. The Sun/Electric Hybrid Lighting System (SEHLS) of claim 1, wherein the funnel light cover is formed from a light blue plastic.

8. The Sun/Electric Hybrid Lighting System (SEHLS) of claim 1, wherein the cover light plate is formed from a clear plastic.

9. The Sun/Electric Hybrid Lighting System (SEHLS) of claim 1, wherein the bypass funnel comprises plastic, coated internally, with glass paint, said glass paint increasing light reflectivity in the bypass funnel.

10. A Sun/Electric Hybrid Lighting System (SEHLS) is a dual functional system that is both sun driven and low energy light driven, and includes:
    a housing body comprising an encasing surrounding an open cavity, the encasing comprising at least a first opening about a top side of the housing body and a second opening exposing a bottom side of the housing body;
    a transparent cover dome mounting atop the first opening about the top side of the housing body, the transparent cover dome providing protection for the internal components of the SEHLS;
    a metal mating band fitting around the cover dome and the first opening and coupling the cover dome to the housing body;
    a durable plastic "V" funnel body, the funnel body comprising tubing with a narrowing diameter extending from the first opening of the encasing inside the housing body;

a Splitter "T" Reflector Box System (STRBS), the STRBS comprising (i) a housing with a hollowed top protrusion connecting to a bottom of the funnel body, (ii) a central cavity permitting light to pass from the hollowed top protrusion into the central cavity, (iii) at least one horizontally aligned opening, and (iv) an angled mirror inset within the central cavity, wherein the angled mirror redirects some of the light passing from the hollowed top protrusion through the horizontally aligned opening;

an elbow connector comprising a horizontal extension redirecting into a vertical extension, the horizontal extension coupling to the horizontally aligned opening of the STRBS and moving light passing through the horizontally aligned opening away from the STRBS, and the vertical extension redirecting light down and out from the second opening of the housing body;

a funnel light cover comprising a conical transparent volume coupling to the vertical extension of the elbow connector, said funnel light cover for condensing light within the vertical extension into one stream;

a clear cover light plate covering the bottom side of the housing body with at least one aperture for the funnel light cover;

at least one light emitting diode (LED) mounted inside the housing body about the top side of the housing body between the first opening and sidewalls of the encasing, said at least one LED generating light down through the clear cover light plate.

* * * * *